(12) United States Patent
Munoz et al.

(10) Patent No.: US 11,429,340 B2
(45) Date of Patent: Aug. 30, 2022

(54) AUDIO CAPTURE AND RENDERING FOR EXTENDED REALITY EXPERIENCES

(71) Applicant: QUALCOMM Incorporated, San Diego, CA (US)

(72) Inventors: Isaac Garcia Munoz, San Diego, CA (US); Siddhartha Goutham Swaminathan, San Diego, CA (US); S M Akramus Salehin, San Diego, CA (US); Nils Günther Peters, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/918,441

(22) Filed: Jul. 1, 2020

(65) Prior Publication Data

US 2021/0004201 A1    Jan. 7, 2021

Related U.S. Application Data

(60) Provisional application No. 62/992,635, filed on Mar. 20, 2020, provisional application No. 62/870,573, filed on Jul. 3, 2019.

(51) Int. Cl.
*G06F 3/16* (2006.01)
*H04R 3/12* (2006.01)

(52) U.S. Cl.
CPC .............. *G06F 3/165* (2013.01); *H04R 3/12* (2013.01)

(58) Field of Classification Search
CPC ............. H04S 2420/01; H04S 2400/11; H04S 2400/01; H04S 7/303; H04S 3/008;
(Continued)

(56) References Cited

U.S. PATENT DOCUMENTS 9,042,563 B1 * 5/2015 Beaty ..................... H04R 27/00
 381/56
9,445,172 B2 * 9/2016 Pong .................. H04N 5/23203
(Continued)

FOREIGN PATENT DOCUMENTS

DE    WO 2019/072984    *   4/2019
EP         3343348 A1       7/2018
(Continued)

OTHER PUBLICATIONS

International Search Report and Written Opinion—PCT/US2020/040640—ISA/EPO—dated Nov. 20, 2020.
(Continued)

*Primary Examiner* — Norman Yu
(74) *Attorney, Agent, or Firm* — Shumaker & Sieffert, P.A.

(57) ABSTRACT

In some examples, a content consumer device configured to play one or more of a plurality of audio streams includes a memory configured to store the plurality of audio streams and audio location information associated with the plurality of audio streams and representative of audio stream coordinates in an acoustical space where an audio stream was captured or synthesized or both. Each of the audio streams is representative of a soundfield. The content consumer device also includes one or more processors coupled to the memory, and configured to determine device location information representative of device coordinates of the content consumer device in the acoustical space. The one or more processors are configured to select, based on the device location information and the audio location information, a subset of the plurality of audio streams, and output, based on the subset of the plurality of audio streams, one or more speaker feeds.

37 Claims, 23 Drawing Sheets

(58) Field of Classification Search
CPC . H04S 7/305; H04S 7/302; H04S 7/30; H04S 2420/07; H04S 5/005; G06F 3/165; G06F 3/011; G06F 3/0346; G06F 16/444; G06T 19/006; G06T 13/205; H04R 3/12; H04R 2430/20; H04R 1/32; H04R 1/20; H04R 2227/005; H04R 25/505; H04R 5/02
USPC ........ 381/310, 309, 1, 58, 19, 306, 94.2, 80, 381/387; 700/94
See application file for complete search history.

(56) References Cited

U.S. PATENT DOCUMENTS

| | | | |
|---|---|---|---|
| 10,484,811 B1* | 11/2019 | Mindlin | .................. H04S 3/008 |
| 2011/0249821 A1 | 10/2011 | Jaillet et al. | |
| 2016/0295341 A1* | 10/2016 | Mentz | ..................... H04S 7/304 |
| 2018/0088900 A1* | 3/2018 | Glaser | .................. G06F 3/0482 |
| 2018/0302738 A1 | 10/2018 | Di Censo et al. | |
| 2018/0357038 A1 | 12/2018 | Olivieri et al. | |
| 2019/0007781 A1 | 1/2019 | Peters et al. | |
| 2019/0147655 A1* | 5/2019 | Galera | ............... G05B 19/4061 345/419 |
| 2019/0198028 A1 | 6/2019 | Kim et al. | |

FOREIGN PATENT DOCUMENTS

| | | |
|---|---|---|
| EP | 3343349 A1 | 7/2018 |
| WO | 2018064528 A1 | 4/2018 |
| WO | 2019002676 A1 | 1/2019 |
| WO | 2019067445 A1 | 4/2019 |
| WO | 2019072984 A1 | 4/2019 |
| WO | 2019192864 A1 | 10/2019 |
| WO | 2020035143 A1 | 2/2020 |

OTHER PUBLICATIONS

Audio: "Call for Proposals for 3D Audio", International Organisation for Standardisation Organisation Internationale De Normalisation ISO/IEC JTC1/SC29/WG11 Coding of Moving Pictures and Audio, ISO/IEC JTC1/SC29/WG11/N13411, Geneva, Jan. 2013, pp. 1-20.

Bianchi et al., "The Ray Space Transform: A New Framework for Wave Field Processing", IEEE Transactions on Signal Processing, vol. 64, No. 21, Nov. 1, 2016, pp. 5696-5706.

ETSI TS 103 589 V1.1.1, "Higher Order Ambisonics (HOA) Transport Format", Jun. 2018, 33 pages.

Herre, et al., "MPEG-H 3D Audio—The New Standard for Coding of Immersive Spatial Audio," IEEE Journal of Selected Topics in Signal Processing, vol. 9, No. 5, Aug. 2015, 10 pp.

Hollerweger F., "An Introduction to Higher Order Ambisonic," Oct. 2008, pp. 13, Accessed online [Jul. 8, 2013].

"Information technology—High Efficiency Coding and Media Delivery in Heterogeneous Environments—Part 3: 3D Audio," ISO/IEC JTC 1/SC 29, ISO/IEC DIS 23008-3, Jul. 25, 2014, 433 Pages.

"Information technology—High Efficiency Coding and Media Delivery in Heterogeneous Environments—Part 3: 3D Audio", ISO/IEC JTC 1/SC 29/WG11, ISO/IEC 23008-3, 201x(E), Oct. 12, 2016, 797 Pages.

"Information technology—High efficiency coding and media delivery in heterogeneous environments—Part 3: Part 3: 3D Audio, Amendment 3: MPEG-H 3D Audio Phase 2," ISO/IEC JTC 1/SC 29N, ISO/IEC 23008-3:2015/PDAM 3, Jul. 25, 2015, 208 pp.

ISO/IEC/JTC: "ISO/IEC JTC 1/SC 29 N ISO/IEC CD 23008-3 Information technology—High efficiency coding and media delivery in heterogeneous environments—Part 3: 3D audio," Apr. 4, 2014 (Apr. 4, 2014), 337 Pages, XP055206371, Retrieved from the Internet: URL:http://www.iso.org/iso/iso_catalogue/catalogue_tc/catalogue_tc_browse.htm?commid=45316 [retrieved on Aug. 5, 2015].

Markovic et al., "Multiview Soundfield Imaging in the Projective Ray Space", IEEE/ACM Transactions on Audio, Speech, and Language Processing, 2015, 13 Pages.

Patricio et al., "Toward Six Degrees of Freedom Audio Recording and Playback Using Multiple Ambisonics Sound Fields", Audio Engineering Society, Convention Paper 10141, Presented at the 146th Convention Mar. 20-23, 2019, Dublin, Ireland, pp. 1-9.

Peterson J., et al., "Virtual Reality, Augmented Reality, and Mixed Reality Definitions," EMA, version 1.0, Jul. 7, 2017, 4 pp.

Pezzoli et al., "Estimation of the Sound Field at Arbitrary Positions in Distributed Microphone Networks Based on Distributed Ray Space Transform", IEEE, 2018, pp. 186-190.

Plinge et al., "Enhanced Immersion for Binaural Audio Reproduction of Ambisonics in Six-Degrees-of-Freedom: The Effect of Added Distance Information", ICSA Ilmenau, Audio Labs, Sep. 27, 2019, 23 Pages.

Poletti M.A., "Three-Dimensional Surround Sound Systems Based on Spherical Harmonics", The Journal of the Audio Engineering Society, vol. 53, No. 11, Nov. 2005, pp. 1004-1025.

Schonefeld V., "Spherical Harmonics," Jul. 1, 2005, XP002599101, 25 Pages, Accessed online [Jul. 9, 2013] at URL:http://heim.c-otto.de/~volker/prosem_paper.pdf.

Sen D., et al., "RM1-HOA Working Draft Text", 107. MPEG Meeting; Jan. 13, 2014-Jan. 17, 2014; San Jose; (Motion Picture Expert Group or ISO/IEC JTC1/SC29/WG11), No. m31827, Jan. 11, 2014 (Jan. 11, 2014), 83 Pages, XP030060280.

Sen D., et al., "Technical Description of the Qualcomm's HoA Coding Technology for Phase II", 109. MPEG Meeting; Jul. 7, 2014-Jul. 11, 2014; Sapporo; (Motion Picture Expert Group or ISO/IEC JTC1/SC29/WG11), No. m34104, Jul. 2, 2014 (Jul. 2, 2014), 4 Pages, XP030062477, figure 1.

Tylka et al., "Fundamentals of a Parametric Method for Virtual Navigation Within an Array of Ambisonics Microphones", Journal of the Audio Engineering Society, vol. 68, No. 3, Mar. 2020, pp. 120-137.

Tylka et al., "Soundfield Navigation using an Array of Higher-Order Ambisonics Microphones", Audio Engineering Society, Conference Paper, Presented at the Conference on Audio for Virtual and Augmented Reality Sep. 30-Oct. 1, 2016, Los Angeles, CA, USA, pp. 1-10.

Tylka J.G., et al., "Comparison of Techniques for Binaural Navigation of Higher-Order Ambisonic Soundfields", AES Convention 139; Oct. 2015, AES, 60 East 42nd Street, Room 2520, New York 10165-2520, USA, Oct. 23, 2015 (Oct. 23, 2015), 13 Pages, XP040672273, the whole document.

Zheng X., "Soundfield Navigation Separation Compression and Transmission", University of Wollongong, 2013, 254 Pages.

International Preliminary Report On Patentability—PCT/US2020/040640—ISA/EPO—dated Jan. 13, 2022 9 Pages.

* cited by examiner

AUDIO CAPTURE AND RENDERING FOR EXTENDED REALITY EXPERIENCES

CROSS-REFERENCE TO RELATED APPLICATIONS

This application claims priority to U.S. Provisional Patent Application 62/870,573, filed on Jul. 3, 2019, and U.S. Provisional Patent Application 62/992,635, filed on Mar. 20, 2020, the entire content of both of which is incorporated by reference.

TECHNICAL FIELD

This disclosure relates to processing of media data, such as audio data.

BACKGROUND

Computer-mediated reality systems are being developed to allow computing devices to augment or add to, remove or subtract from, or generally modify existing reality experienced by a user. Computer-mediated reality systems (which may also be referred to as "extended reality systems," or "XR systems") may include, as examples, virtual reality (VR) systems, augmented reality (AR) systems, and mixed reality (MR) systems. The perceived success of computer-mediated reality systems are generally related to the ability of such computer-mediated reality systems to provide a realistically immersive experience in terms of both the video and audio experience where the video and audio experience align in ways expected by the user. Although the human visual system is more sensitive than the human auditory systems (e.g., in terms of perceived localization of various objects within the scene), ensuring an adequate auditory experience is an increasingly important factor in ensuring a realistically immersive experience, particularly as the video experience improves to permit better localization of video objects that enable the user to better identify sources of audio content.

SUMMARY

This disclosure relates generally to auditory aspects of the user experience of computer-mediated reality systems, including virtual reality (VR), mixed reality (MR), augmented reality (AR), computer vision, and graphics systems. Various aspects of the techniques may provide for adaptive audio capture and rendering of an acoustical space for extended reality systems. As used herein, an acoustic environment is represented as either an indoor environment or an outdoor environment, or both an indoor environment and an outdoor environment. The acoustic environment may include one or more sub-acoustic spaces that may include various acoustic elements. An example of an outdoor environment could include a car, buildings, walls, a forest, etc. An acoustical space may be an example of an acoustical environment and may be an indoor space or an outdoor space. As used herein, an audio element is either a sound captured by a microphone (e.g., directly captured from near-field sources or reflections from far-field sources whether real or synthetic), or a sound field previously synthesized, or a mono sound synthesized from text to speech, or a reflection of a virtual sound from an object in the acoustic environment. An audio element may also be referred to herein as a receiver.

In one example, various aspects of the techniques are directed to a content consumer device configured to play one or more of a plurality of audio streams, the content consumer device including: a memory configured to store the plurality of audio streams and audio location information associated with the plurality of audio streams and representative of audio stream coordinates in an acoustical space where an audio stream was captured or audio stream coordinates in a virtual acoustical space where an audio stream was synthesized or both, each of the audio streams representative of a soundfield; and one or more processors coupled to the memory, and configured to: determine device location information representative of device coordinates of the content consumer device in the acoustical space; select, based on the device location information and the audio location information, a subset of the plurality of audio streams, the subset of the plurality of audio streams excluding at least one of the plurality of audio streams; and output, based on the subset of the plurality of audio streams, one or more speaker feeds.

In another example, various aspects of the techniques are directed to a method of playing one or more of a plurality of audio streams, the method including: storing, by a memory of a content consumer device, the plurality of audio streams and audio location information associated with the plurality of audio streams and representative of audio stream coordinates in an acoustical space where an audio stream was captured or audio stream coordinates in a virtual acoustical space where an audio stream was synthesized or both, each of the audio streams representative of a soundfield; and determining, by one or more processors of the content consumer device, device location information representative of device coordinates of the content consumer device in the acoustical space; selecting, by the one or more processors and based on the device location information and the audio location information, a subset of the plurality of audio streams, the subset of the plurality of audio streams excluding at least one of the plurality of audio streams; and outputting, by the one or more processors and based on the subset of the plurality of audio streams, one or more speaker feeds.

In another example, various aspects of the techniques are directed to a content consumer device configured to play one or more of a plurality of audio streams, the content consumer device including: means for storing the plurality of audio streams and audio location information associated with the plurality of audio streams and representative of audio stream coordinates in an acoustical space where an audio stream was captured or audio stream coordinates in a virtual acoustical space where an audio stream was synthesized or both, each of the audio streams representative of a soundfield; and means for determining device location information representative of device coordinates of the content consumer device in the acoustical space; means for selecting, based on the device location information and the audio location information, a subset of the plurality of audio streams, the subset of the plurality of audio streams excluding at least one of the plurality of audio streams; and means for outputting, based on the subset of the plurality of audio streams, one or more speaker feeds.

In another example, various aspects of the techniques are directed to a non-transitory computer-readable storage medium having stored thereon instructions that, when executed, cause one or more processors of a content consumer device to: store a plurality of audio streams and audio location information associated with the plurality of audio streams and representative of audio stream coordinates in an acoustical space where an audio stream was captured or audio stream coordinates in a virtual acoustical space where an audio stream was synthesized or both, each of the audio streams representative of a soundfield; and determine device location information representative of device coordinates of the content consumer device in the acoustical space; select, based on the device location information and the audio location information, a subset of the plurality of audio streams, the subset of the plurality of audio streams excluding at least one of the plurality of audio streams; and output, based on the subset of the plurality of audio streams, one or more speaker feeds.

The details of one or more examples of this disclosure are set forth in the accompanying drawings and the description below. Other features, objects, and advantages of various aspects of the techniques will be apparent from the description and drawings, and from the claims.

DETAILED DESCRIPTION

Figure 1A:
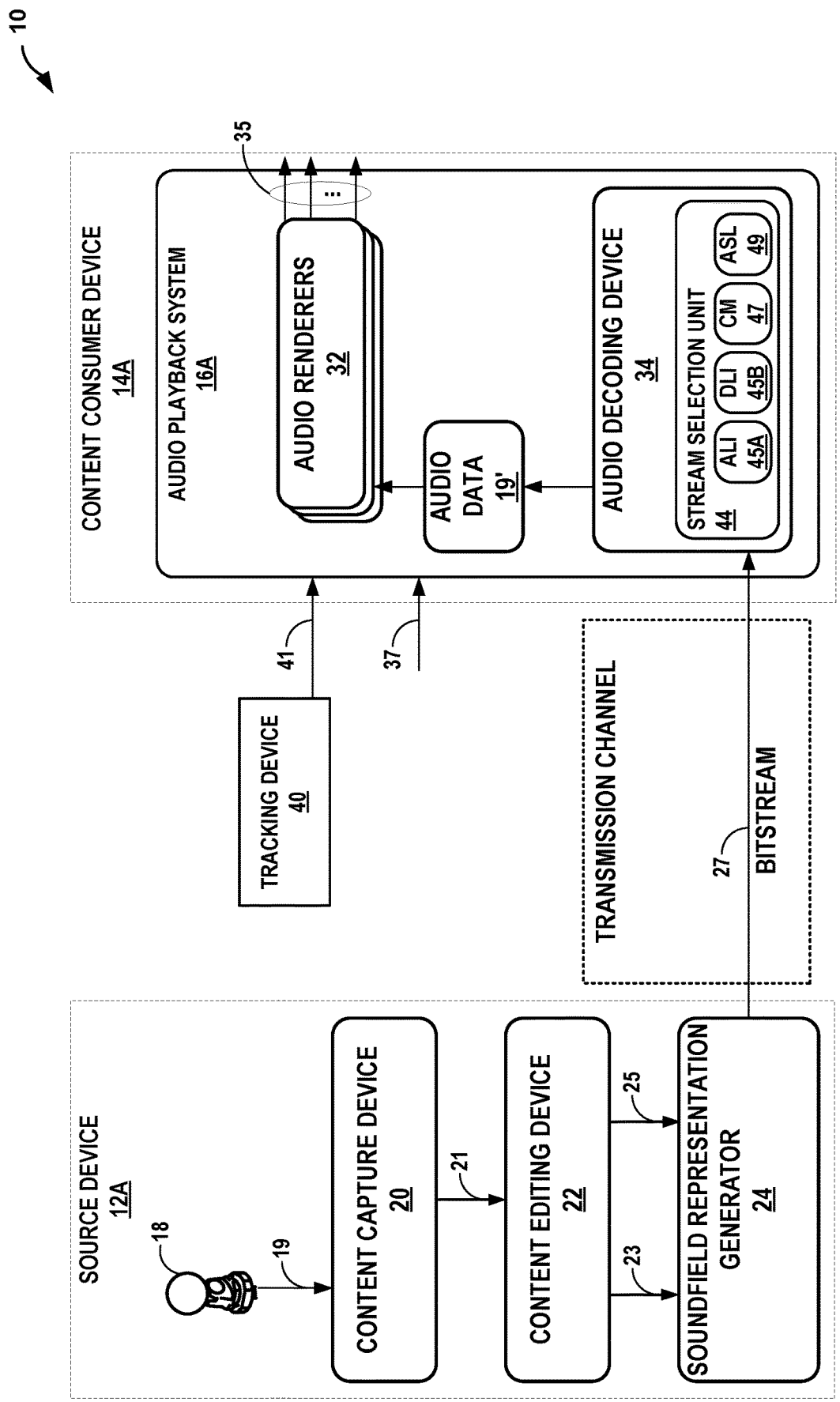
FIGS. 1A-1C are diagrams illustrating systems that may perform various aspects of the techniques described in this disclosure.

When rendering an XR scene, such as a six degrees of freedom (6DoF) scene, with many audio sources which may be obtained from audio capture devices of a live scene or synthesized sources in a virtual or live scene may require a balance between including more or less audio information. This balancing may be performed offline by a mixing engineer, which may be expensive and time consuming. In some cases, the balancing may be performed by a server in communication with the renderer. In these cases, the balancing may not occur in situations where the renderer is off-line and when the renderer is on-line, may lead to latency as the renderer may be repeatedly communicating with the server to provide information relating to the position of the XR device and receive updated audio information.

According to the techniques of this disclosure, a content consumer device (such as an XR device) may determine device location information representative of device coordinates in an acoustical space. The content consumer device may select, based on proximity distance between the device location information and audio location information associated with the plurality of audio streams and representative of audio stream coordinates in an acoustical space where an audio stream was captured or synthesized, a greater number or lesser number of the plurality of audio streams, based on whether the proximity distance less than or greater than, respectively, the proximity distance threshold. The techniques of this disclosure may eliminate the need for balancing by a mixing engineer and repeated communication between the content consumer device and a server.

Furthermore, when a user is in an XR scene, the user may desire to experience audio from a different listening position than where the device location information indicates. According to the techniques of this disclosure, a user may enter a snapping mode. In the snapping mode, the audio experience of the user may snap to an audio stream based on one or more audio source distances and one or more audio source distance thresholds, an audio source distance may be a distance between the device coordinates and audio stream coordinates for an audio stream. In this manner, a user's auditory experience may be improved.

There are a number of different ways to represent a soundfield. Example formats include channel-based audio formats, object-based audio formats, and scene-based audio formats. Channel-based audio formats refer to the 5.1 surround sound format, 7.1 surround sound formats, 22.2 surround sound formats, or any other channel-based format that localizes audio channels to particular locations around the listener in order to recreate a soundfield.

Object-based audio formats may refer to formats in which audio objects, often encoded using pulse-code modulation (PCM) and referred to as PCM audio objects, are specified in order to represent the soundfield. Such audio objects may include metadata identifying a location of the audio object relative to a listener or other point of reference in the soundfield, such that the audio object may be rendered to one or more speaker channels for playback in an effort to recreate the soundfield.

Scene-based audio formats may include a hierarchical set of elements that define the soundfield in three dimensions. One example of a hierarchical set of elements is a set of spherical harmonic coefficients (SHC). The following expression demonstrates a description or representation of a soundfield using SHC:

$$p_i(t, r_r, \theta_r, \varphi_r) = \sum_{\omega=0}^{\infty} \left[ 4\pi \sum_{n=0}^{\infty} j_n(kr_r) \sum_{m=-n}^{n} A_n^m(k) Y_n^m(\theta_r, \varphi_r) \right] e^{j\omega t},$$

The expression shows that the pressure $p_i$ at any point $\{r_r, \theta_r, \varphi_r\}$ of the soundfield, at time t, can be represented uniquely by the SHC, $A_n^m(k)$. Here, $$k = \frac{\omega}{c},$$

c is the speed of sound (~343 m/s), $\{r_r, \theta_r, \varphi_r\}$ is a point of reference (or observation point), $j_n(\cdot)$ is the spherical Bessel function of order n, and $Y_n^m(\theta_r, \varphi_r)$ are the spherical harmonic basis functions (which may also be referred to as a spherical basis function) of order n and suborder m. It can be recognized that the term in square brackets is a frequency-domain representation of the signal (e.g., S(ω, $r_r$, $\theta_r$, φ$_r$)) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

The SHC $A_n^m(k)$ can either be physically acquired (e.g., recorded) by various microphone array configurations or, alternatively, they can be derived from channel-based or object-based descriptions of the soundfield. The SHC (which also may be referred to as ambisonic coefficients) represent scene-based audio, where the SHC may be input to an audio encoder to obtain encoded SHC that may promote more efficient transmission or storage. For example, a fourth-order representation involving $(1+4)^2$ (25, and hence fourth order) coefficients may be used.

As noted above, the SHC may be derived from a microphone recording using a microphone array. Various examples of how SHC may be physically acquired from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

The following equation may illustrate how the SHCs may be derived from an object-based description. The coefficients $A_n^m(k)$ for the soundfield corresponding to an individual audio object may be expressed as:

$$A_n^m(k)=g(\omega)(-4\pi ik)h_n^{(2)}(kr_s)Y_n^{m*}(\theta_s,\varphi_s),$$

where i is, $\sqrt{-1}$, $h_n^{(2)}(\cdot)$ is the spherical Hankel function (of the second kind) of order n, and $\{r_s, \theta_s, \varphi_s\}$ is the location of the object. Knowing the object source energy $g(\omega)$ as a function of frequency (e.g., using time-frequency analysis techniques, such as performing a fast Fourier transform on the pulse code modulated—PCM—stream) may enable conversion of each PCM object and the corresponding location into the SHC $A_n^m(k)$. Further, it can be shown (since the above is a linear and orthogonal decomposition) that the $A_n^m(k)$ coefficients for each object are additive. In this manner, a number of PCM objects can be represented by the $A_n^m(k)$ coefficients (e.g., as a sum of the coefficient vectors for the individual objects). The coefficients may contain information about the soundfield (the pressure as a function of 3D coordinates), and the above represents the transformation from individual objects to a representation of the overall soundfield, in the vicinity of the observation point $\{r_r, \theta_r, \varphi_r\}$.

The techniques described in this disclosure may apply to any of the formats discussed herein, including scene-based audio formats, channel-based audio formats, object-based audio formats, or any combination thereof.

Computer-mediated reality systems (which may also be referred to as "extended reality systems," or "XR systems") are being developed to take advantage of many of the potential benefits provided by ambisonic coefficients. For example, ambisonic coefficients may represent a soundfield in three dimensions in a manner that potentially enables accurate 3D localization of sound sources within the soundfield. As such, XR devices may render the ambisonic coefficients to speaker feeds that, when played via one or more speakers, accurately reproduce the soundfield.

As another example, the ambisonic coefficients may be translated or rotated to account for user movement without overly complex mathematical operations, thereby potentially accommodating the low latency requirements of XR devices. In addition, the ambisonic coefficients are hierarchical and thereby naturally accommodate scalability through order reduction (which may eliminate ambisonic coefficients associated with higher orders), and thereby potentially enable dynamic adaptation of the soundfield to accommodate latency and/or battery requirements of XR devices.

The use of ambisonic coefficients for XR devices may enable development of a number of use cases that rely on the more immersive soundfields provided by the ambisonic coefficients, particularly for computer gaming applications and live video streaming applications. In these highly dynamic use cases that rely on low latency reproduction of the soundfield, the XR devices may prefer ambisonic coefficients over other representations that are more difficult to manipulate or involve complex rendering. More information regarding these use cases is provided below with respect to FIGS. 1A-1C.

While described in this disclosure with respect to the VR device, various aspects of the techniques may be performed in the context of other devices, such as a mobile device. In this instance, the mobile device (such as a so-called smartphone) may present the displayed world via a screen, which may be mounted to the head of the user or viewed as would be done when normally using the mobile device. As such, any information on the screen can be part of the mobile device. The mobile device may be able to provide tracking information and thereby allow for both a VR experience (when head mounted) and a normal experience to view the displayed world, where the normal experience may still allow the user to view the displayed world providing a VR-lite-type experience (e.g., holding up the device and rotating or translating the device to view different portions of the displayed world). Additionally, while a displayed world is mentioned in various examples of the present disclosure, the techniques of this disclosure may also be used with an acoustical space that does not correspond to a displayed world or where there is no displayed world. For example, the displayed world does not need to be displayed on the content consumer device and, in that regard the concept of a displayed world may be a world, presented to a user, having an acoustical space, but not necessarily be visually presented on a display.

Figure 1B:
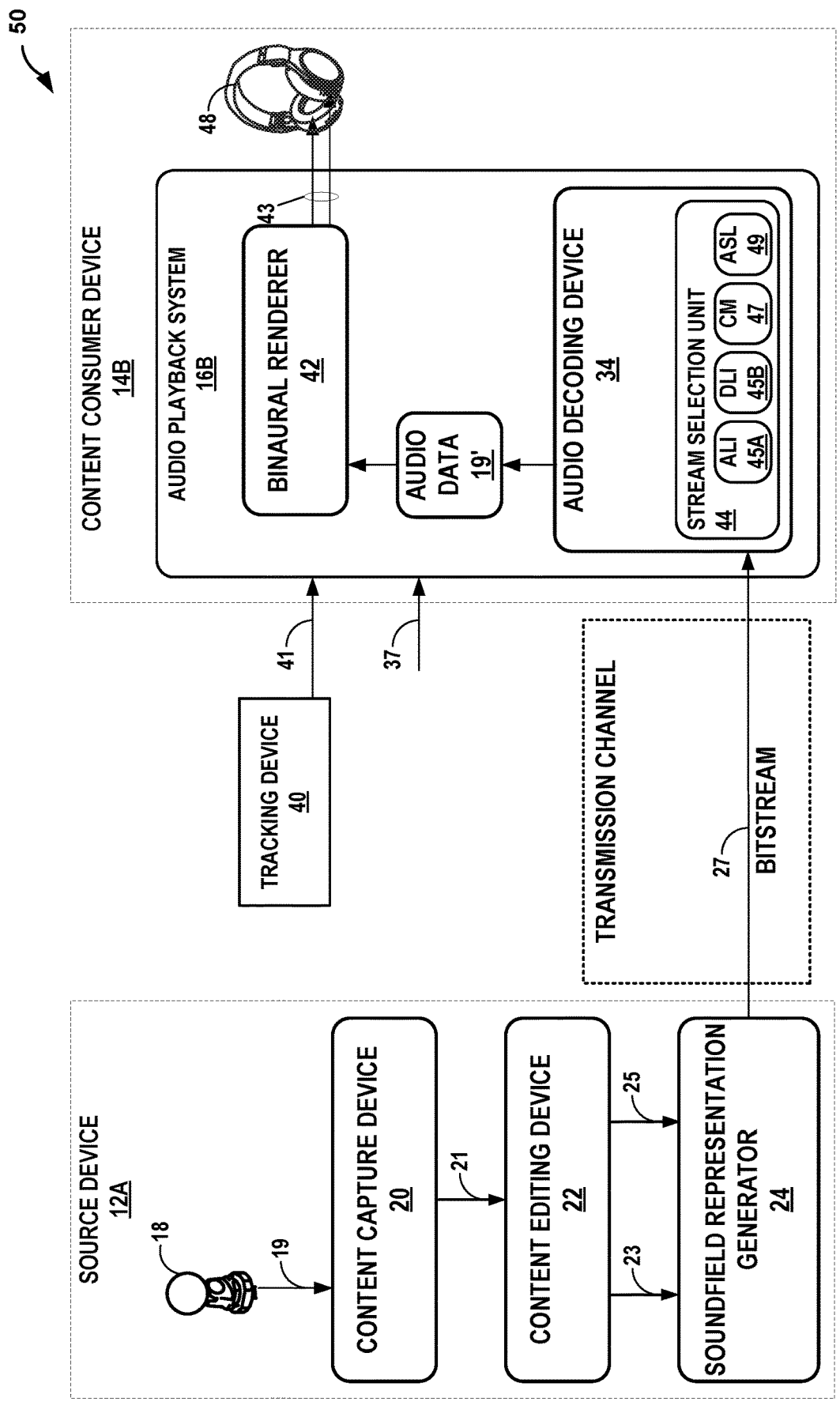
Figure 1C:
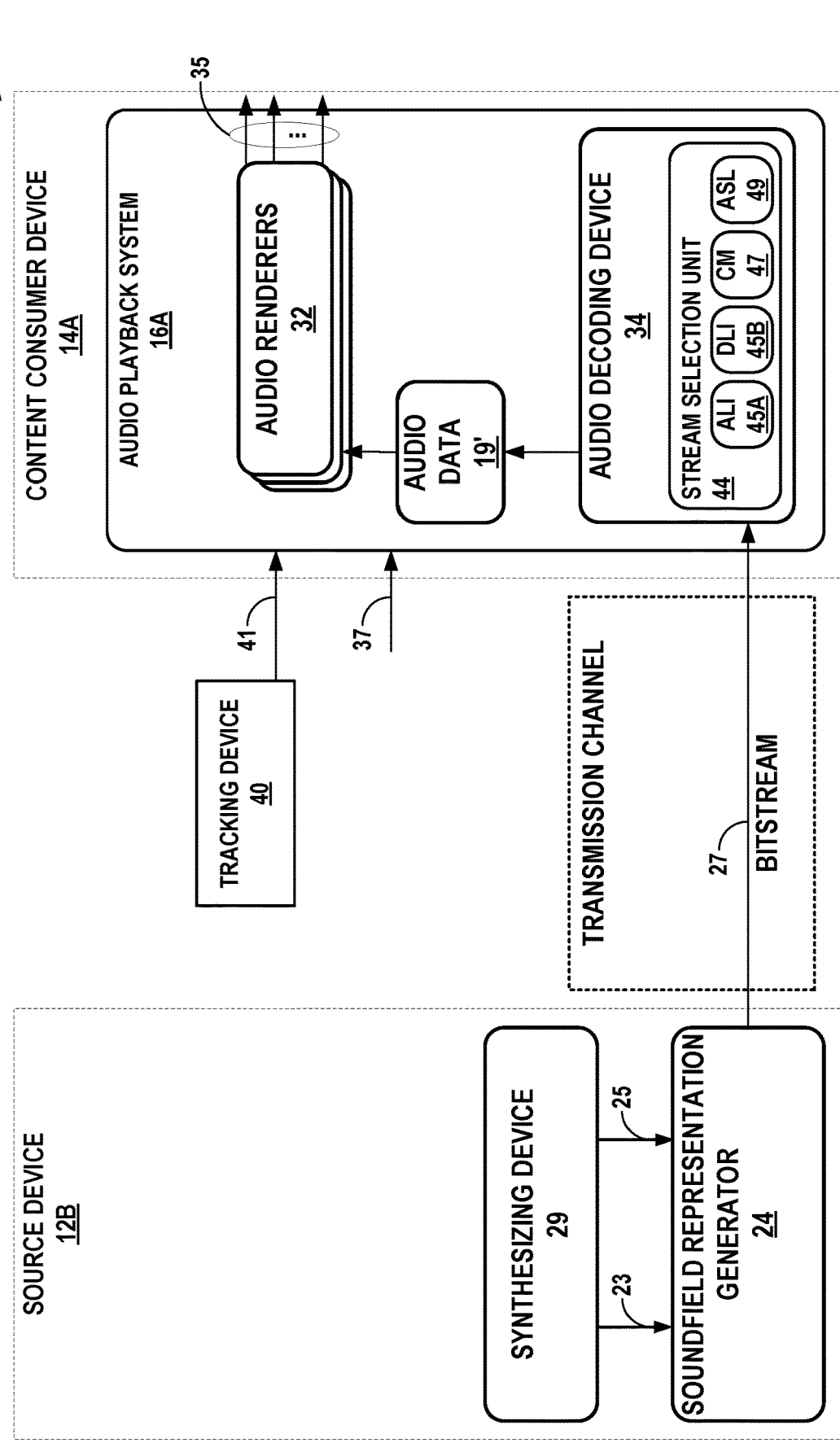

FIGS. 1A-1C are diagrams illustrating systems that may perform various aspects of the techniques described in this disclosure. As shown in the example of FIG. 1A, system 10 includes a source device 12A and a content consumer device 14A. While described in the context of the source device 12A and the content consumer device 14A, the techniques may be implemented in any context in which any representation of a soundfield is encoded to form a bitstream representative of the audio data. Moreover, the source device 12A may represent any form of computing device capable of generating the representation of a soundfield, and is generally described herein in the context of being a VR content creator device. Likewise, the content consumer device 14A may represent any form of computing device capable of implementing rendering metadata techniques described in this disclosure as well as audio playback, and is generally described herein in the context of being a VR client device.

The source device 12A may be operated by an entertainment company or other entity that may generate mono and/or multi-channel audio content for consumption by operators of content consumer devices, such as the content consumer device 14A. In some VR scenarios, the source device 12A generates audio content in conjunction with video content. The source device 12A includes a content capture device 20, a content editing device 22, and a soundfield representation generator 24. The content capture device 20 may be configured to interface or otherwise communicate with a microphone 18.

The microphone 18 may represent an Eigenmike® or other type of 3D audio microphone capable of capturing and representing the soundfield as audio data 19, which may refer to one or more of the above noted scene-based audio data (such as ambisonic coefficients), object-based audio data, and channel-based audio data. Although described as being 3D audio microphones, the microphone 18 may also represent other types of microphones (such as omni-directional microphones, spot microphones, unidirectional microphones, etc.) configured to capture the audio data 19. Audio data 19 may represent an audio stream or include an audio stream.

The content capture device 20 may, in some examples, include an integrated microphone 18 that is integrated into the housing of the content capture device 20. The content capture device 20 may interface wirelessly or via a wired connection with the microphone 18. Rather than capture, or in conjunction with capturing, the audio data 19 via microphone 18, the content capture device 20 may process the audio data 19 after the audio data 19 is input via some type of removable storage, wirelessly and/or via wired input processes. As such, various combinations of the content capture device 20 and the microphone 18 are possible in accordance with this disclosure.

The content capture device 20 may also be configured to interface or otherwise communicate with the content editing device 22. In some instances, the content capture device 20 may include the content editing device 22 (which in some instances may represent software or a combination of software and hardware, including the software executed by the content capture device 20 to configure the content capture device 20 to perform a specific form of content editing). The content editing device 22 may represent a unit configured to edit or otherwise alter content 21 received from content capture device 20, including the audio data 19. The content editing device 22 may output edited content 23 and associated metadata 25 to the soundfield representation generator 24.

The soundfield representation generator 24 may include any type of hardware device capable of interfacing with the content editing device 22 (or the content capture device 20). Although not shown in the example of FIG. 1A, the soundfield representation generator 24 may use the edited content 23, including the audio data 19, and metadata 25 provided by the content editing device 22 to generate one or more bitstreams 27. In the example of FIG. 1A, which focuses on the audio data 19, the soundfield representation generator 24 may generate one or more representations of the same soundfield represented by the audio data 19 to obtain a bitstream 27 that includes the representations of the soundfield and the audio metadata 25.

For instance, to generate the different representations of the soundfield using ambisonic coefficients (which again is one example of the audio data 19), soundfield representation generator 24 may use a coding scheme for ambisonic representations of a soundfield, referred to as Mixed Order Ambisonics (MOA) as discussed in more detail in U.S. application Ser. No. 15/672,058, entitled "MIXED-ORDER AMBISONICS (MOA) AUDIO DATA FOR COMPUTER-MEDIATED REALITY SYSTEMS," filed Aug. 8, 2017, and published as U.S. patent publication no. 20190007781 on Jan. 3, 2019.

To generate a particular MOA representation of the soundfield, the soundfield representation generator 24 may generate a partial subset of the full set of ambisonic coefficients. For instance, each MOA representation generated by the soundfield representation generator 24 may provide precision with respect to some areas of the soundfield, but less precision in other areas. In one example, an MOA representation of the soundfield may include eight (8) uncompressed ambisonic coefficients, while the third order ambisonic representation of the same soundfield may include sixteen (16) uncompressed ambisonic coefficients. As such, each MOA representation of the soundfield that is generated as a partial subset of the ambisonic coefficients may be less storage-intensive and less bandwidth intensive (if and when transmitted as part of the bitstream 27 over the illustrated transmission channel) than the corresponding third order ambisonic representation of the same soundfield generated from the ambisonic coefficients.

Although described with respect to MOA representations, the techniques of this disclosure may also be performed with respect to first-order ambisonic (FOA) representations in which all of the ambisonic coefficients associated with a first order spherical basis function and a zero order spherical basis function are used to represent the soundfield. In other words, rather than represent the soundfield using a partial, non-zero subset of the ambisonic coefficients, the soundfield representation generator 24 may represent the soundfield using all of the ambisonic coefficients for a given order N, resulting in a total of ambisonic coefficients equaling $(N+1)^2$.

In this respect, the ambisonic audio data (which is another way to refer to the ambisonic coefficients in either MOA representations or full order representation, such as the first-order representation noted above) may include ambisonic coefficients associated with spherical basis functions having an order of one or less (which may be referred to as "$1^{st}$ order ambisonic audio data"), ambisonic coefficients associated with spherical basis functions having a mixed order and suborder (which may be referred to as the "MOA representation" discussed above), or ambisonic coefficients associated with spherical basis functions having an order greater than one (which is referred to above as the "full order representation").

The content capture device 20 or the content editing device 22 may, in some examples, be configured to wirelessly communicate with the soundfield representation generator 24. In some examples, the content capture device 20 or the content editing device 22 may communicate, via one or both of a wireless connection or a wired connection, with the soundfield representation generator 24. Via the connection between the content capture device 20 or the content editing device 22 and the soundfield representation generator 24, the content capture device 20 or the content editing device 22 may provide content in various forms of content, which, for purposes of discussion, are described herein as being portions of the audio data 19.

In some examples, the content capture device 20 may leverage various aspects of the soundfield representation generator 24 (in terms of hardware or software capabilities of the soundfield representation generator 24). For example, the soundfield representation generator 24 may include dedicated hardware configured to (or specialized software that when executed causes one or more processors to) perform psychoacoustic audio encoding (such as a unified speech and audio coder denoted as "USAC" set forth by the Moving Picture Experts Group (MPEG), the MPEG-H 3D audio coding standard, the MPEG-I Immersive Audio standard, or proprietary standards, such as AptX™ (including various versions of AptX such as enhanced AptX—E-AptX, AptX live, AptX stereo, and AptX high definition—AptX- HD), advanced audio coding (AAC), Audio Codec 3 (AC-3), Apple Lossless Audio Codec (ALAC), MPEG-4 Audio Lossless Streaming (ALS), enhanced AC-3, Free Lossless Audio Codec (FLAC), Monkey's Audio, MPEG-1 Audio Layer II (MP2), MPEG-1 Audio Layer III (MP3), Opus, and Windows Media Audio (WMA).

The content capture device 20 may not include the psychoacoustic audio encoder dedicated hardware or specialized software and instead may provide audio aspects of the content 21 in a non-psychoacoustic-audio-coded form. The soundfield representation generator 24 may assist in the capture of content 21 by, at least in part, performing psychoacoustic audio encoding with respect to the audio aspects of the content 21.

The soundfield representation generator 24 may also assist in content capture and transmission by generating one or more bitstreams 27 based, at least in part, on the audio content (e.g., MOA representations and/or first order ambisonic representations) generated from the audio data 19 (in the case where the audio data 19 includes scene-based audio data). The bitstream 27 may represent a compressed version of the audio data 19 and any other different types of the content 21 (such as a compressed version of spherical video data, image data, or text data).

The soundfield representation generator 24 may generate the bitstream 27 for transmission, as one example, across a transmission channel, which may be a wired or wireless channel, a data storage device, or the like. The bitstream 27 may represent an encoded version of the audio data 19, and may include a primary bitstream and another side bitstream, which may be referred to as side channel information or metadata. In some instances, the bitstream 27 representing the compressed version of the audio data 19 (which again may represent scene-based audio data, object-based audio data, channel-based audio data, or combinations thereof) may conform to bitstreams produced in accordance with the MPEG-H 3D audio coding standard and/or the MPEG-I Immersive Audio standard.

The content consumer device 14A may be operated by an individual, and may represent a VR client device. Although described with respect to a VR client device, content consumer device 14A may represent other types of devices, such as an augmented reality (AR) client device, a mixed reality (MR) client device (or other XR client device), a standard computer, a headset, headphones, a mobile device (including a so-called smartphone), or any other device capable of tracking head movements and/or general translational movements of the individual operating the content consumer device 14A. As shown in the example of FIG. 1A, the content consumer device 14A includes an audio playback system 16A, which may refer to any form of audio playback system capable of rendering the audio data for playback as mono and/or multi-channel audio content.

While shown in FIG. 1A as being directly transmitted to the content consumer device 14A, the source device 12A may output the bitstream 27 to an intermediate device positioned between the source device 12A and the content consumer device 14A. The intermediate device may store the bitstream 27 for later delivery to the content consumer device 14A, which may request the bitstream 27. The intermediate device may include a file server, a web server, a desktop computer, a laptop computer, a tablet computer, a mobile phone, a smart phone, or any other device capable of storing the bitstream 27 for later retrieval by an audio decoder. The intermediate device may reside in a content delivery network capable of streaming the bitstream 27 (and possibly in conjunction with transmitting a corresponding video data bitstream) to subscribers, such as the content consumer device 14A, requesting the bitstream 27.

Alternatively, the source device 12A may store the bitstream 27 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to the channels by which content (e.g., in the form of one or more bitstreams 27) stored to the mediums are transmitted (and may include retail stores and other store-based delivery mechanism). In any event, the techniques of this disclosure should not therefore be limited in this respect to the example of FIG. 1A.

As noted above, the content consumer device 14A includes the audio playback system 16A. The audio playback system 16A may represent any system capable of playing back mono and/or multi-channel audio data. The audio playback system 16A may include a number of different audio renderers 32. The audio renderers 32 may each provide for a different form of rendering, where the different forms of rendering may include one or more of the various ways of performing vector-base amplitude panning (VBAP), and/or one or more of the various ways of performing soundfield synthesis. As used herein, "A and/or B" means "A or B", or "both A and B".

The audio playback system 16A may further include an audio decoding device 34. The audio decoding device 34 may represent a device configured to decode bitstream 27 to output audio data 19' (where the prime notation may denote that the audio data 19' differs from the audio data 19 due to lossy compression, such as quantization, of the audio data 19). Again, the audio data 19' may include scene-based audio data that, in some examples, may form the full first (or higher) order ambisonic representation or a subset thereof that forms an MOA representation of the same soundfield, decompositions thereof, such as a predominant audio signal, ambient ambisonic coefficients, and the vector based signal described in the MPEG-H 3D Audio Coding Standard, or other forms of scene-based audio data. Audio data 19' may include an audio stream or a representation of an audio stream.

Other forms of scene-based audio data include audio data defined in accordance with an HOA (Higher Order Ambisonic) Transport Format (HTF). More information regarding the HTF can be found in a Technical Specification (TS) by the European Telecommunications Standards Institute (ETSI) entitled "Higher Order Ambisonics (HOA) Transport Format," ETSI TS 103 589 V1.1.1, dated June 2018 (2018-06), and also in U.S. Patent Publication No. 2019/0918028, entitled "PRIORITY INFORMATION FOR HIGHER ORDER AMBISONIC AUDIO DATA," filed Dec. 20, 2018. In any event, the audio data 19' may be similar to a full set or a partial subset of the audio data 19, but may differ due to lossy operations (e.g., quantization) and/or transmission via the transmission channel.

The audio data 19' may include, as an alternative to, or in conjunction with the scene-based audio data, channel-based audio data. The audio data 19' may include, as an alternative to, or in conjunction with the scene-based audio data, object-based audio data, or channel-based audio data. As such, the audio data 19' may include any combination of scene-based audio data, object-based audio data, and channel-based audio data.

The audio renderers 32 of audio playback system 16A may, after audio decoding device 34 has decoded the bitstream 27 to obtain the audio data 19', render the audio data 19' to output speaker feeds 35. The speaker feeds 35 may drive one or more speakers (which are not shown in the example of FIG. 1A for ease of illustration purposes). Various audio representations, including scene-based audio data (and possibly channel-based audio data and/or object-based audio data) of a soundfield may be normalized in a number of ways, including N3D, SN3D, FuMa, N2D, or SN2D.

To select the appropriate renderer or, in some instances, generate an appropriate renderer, the audio playback system 16A may obtain speaker information 37 indicative of a number of speakers (e.g., loudspeakers or headphone speakers) and/or a spatial geometry of the speakers. In some instances, the audio playback system 16A may obtain the speaker information 37 using a reference microphone and may drive the speakers (which may refer to the output of electrical signals to cause the transducer to vibrate) in such a manner as to dynamically determine the speaker information 37. In other instances, or in conjunction with the dynamic determination of the speaker information 37, the audio playback system 16A may prompt a user to interface with the audio playback system 16A and input the speaker information 37.

The audio playback system 16A may select one of the audio renderers 32 based on the speaker information 37. In some instances, the audio playback system 16A may, when none of the audio renderers 32 are within some threshold similarity measure (in terms of the speaker geometry) to the speaker geometry specified in the speaker information 37, generate the one of audio renderers 32 based on the speaker information 37. The audio playback system 16A may, in some instances, generate one of the audio renderers 32 based on the speaker information 37 without first attempting to select an existing one of the audio renderers 32.

When outputting the speaker feeds 35 to headphones, the audio playback system 16A may utilize one of the renderers 32 that provides for binaural rendering using head-related transfer functions (HRTF) or other functions capable of rendering to left and right speaker feeds 35 for headphone speaker playback, such as binaural room impulse response renderers. The terms "speakers" or "transducer" may generally refer to any speaker, including loudspeakers, headphone speakers, bone-conducting speakers, earbud speakers, wireless headphone speakers, etc. One or more speakers may then playback the rendered speaker feeds 35 to reproduce a soundfield.

Although described as rendering the speaker feeds 35 from the audio data 19', reference to rendering of the speaker feeds 35 may refer to other types of rendering, such as rendering incorporated directly into the decoding of the audio data from the bitstream 27. An example of the alternative rendering can be found in Annex G of the MPEG-H 3D Audio standard, where rendering occurs during the predominant signal formulation and the background signal formation prior to composition of the soundfield. As such, reference to rendering of the audio data 19' should be understood to refer to both rendering of the actual audio data 19' or decompositions or representations of the audio data 19' (such as the above noted predominant audio signal, the ambient ambisonic coefficients, and/or the vector-based signal—which may also be referred to as a V-vector or as a multi-dimensional ambisonic spatial vector).

The audio playback system 16A may also adapt the audio renderers 32 based on tracking information 41. That is, the audio playback system 16A may interface with a tracking device 40 configured to track head movements and possibly translational movements of a user of the VR device. The tracking device 40 may represent one or more sensors (e.g., a camera—including a depth camera, a gyroscope, a magnetometer, an accelerometer, light emitting diodes—LEDs, etc.) configured to track the head movements and possibly translational movements of a user of the VR device. The audio playback system 16A may adapt, based on the tracking information 41, the audio renderers 32 such that the speaker feeds 35 reflect changes in the head and possibly translational movements of the user to correct reproduce the soundfield that is responsive to such movements.

FIG. 1B is a block diagram illustrating another example system 50 configured to perform various aspects of the techniques described in this disclosure. The system 50 is similar to the system 10 shown in FIG. 1A, except that the audio renderers 32 shown in FIG. 1A are replaced with a binaural renderer 42 (in audio playback system 16B of content consumer device 14B) capable of performing binaural rendering using one or more head-related transfer functions (HRTFs) or the other functions capable of rendering to left and right speaker feeds 43.

The audio playback system 16B may output the left and right speaker feeds 43 to headphones 48, which may represent another example of a wearable device and which may be coupled to additional wearable devices to facilitate reproduction of the soundfield, such as a watch, the VR headset noted above, smart glasses, smart clothing, smart rings, smart bracelets or any other types of smart jewelry (including smart necklaces), and the like. The headphones 48 may couple wirelessly or via wired connection to the additional wearable devices.

Additionally, the headphones 48 may couple to the audio playback system 16B via a wired connection (such as a standard 3.5 mm audio jack, a universal system bus (USB) connection, an optical audio jack, or other forms of wired connection) or wirelessly (such as by way of a Bluetooth™ connection, a wireless network connection, and the like). The headphones 48 may recreate, based on the left and right speaker feeds 43, the soundfield represented by the audio data 19'. The headphones 48 may include a left headphone speaker and a right headphone speaker which are powered (or, in other words, driven) by the corresponding left and right speaker feeds 43.

FIG. 1C is a block diagram illustrating another example system 60. The example system 60 is similar to the example system 10 of FIG. 1A, but source device 12B of system 60 does not include a content capture device. Source device 12B contains synthesizing device 29. Synthesizing device 29 may be used by a content developer to generate synthesized audio sources. The synthesized audio sources may have location information associated therewith that may identifying a location of the audio source relative to a listener or other point of reference in the soundfield, such that the audio source may be rendered to one or more speaker channels for playback in an effort to recreate the soundfield. In some examples, synthesizing device 29 may also synthesize visual or video data.

For example, a content developer may generate synthesized audio streams for a video game. While the example of FIG. 1C is shown with the content consumer device 14A of the example of FIG. 1A, the source device 12B of the example of FIG. 1C may be used with the content consumer device 14B of FIG. 1B. In some examples, the source device 12B of FIG. 1C may also include a content capture device, such that bitstream 27 may contain both captured audio stream(s) and synthesized audio stream(s).

Figure 2:
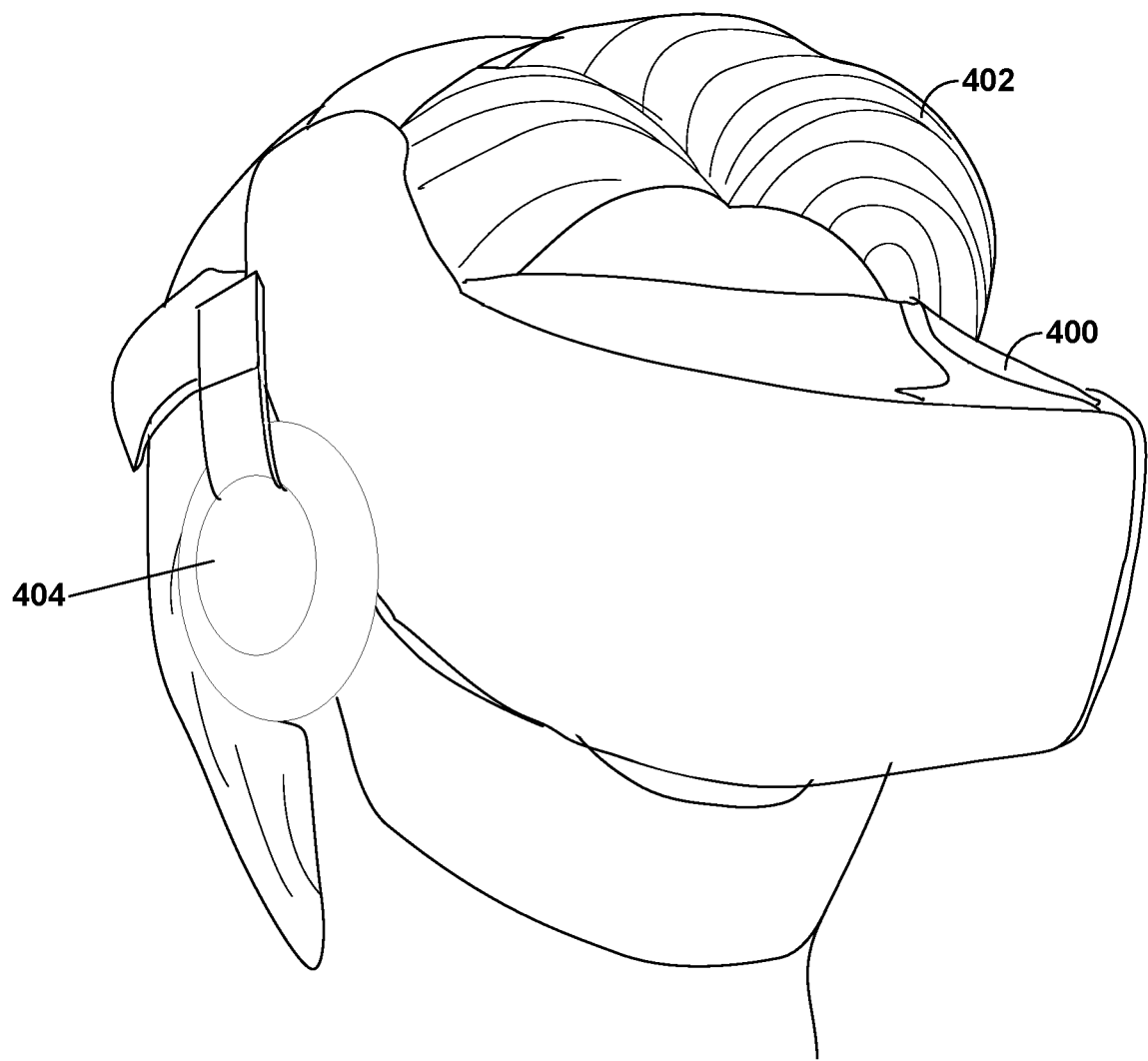
FIG. 2 is a diagram illustrating an example of a VR device worn by a user.

As described above, the content consumer device 14A or 14B (hereinafter referred to as content consumer device 14) may represent a VR device in which a human wearable display (which may also be referred to a "head mounted display") is mounted in front of the eyes of the user operating the VR device. FIG. 2 is a diagram illustrating an example of a VR device 400 worn by a user 402. The VR device 400 is coupled to, or otherwise includes, headphones 404, which may reproduce a soundfield represented by the audio data 19' through playback of the speaker feeds 35. The speaker feeds 35 may represent an analog or digital signal capable of causing a membrane within the transducers of headphones 404 to vibrate at various frequencies, where such process is commonly referred to as driving the headphones 404.

Video, audio, and other sensory data may play important roles in the VR experience. To participate in a VR experience, the user 402 may wear the VR device 400 (which may also be referred to as a VR client device 400) or other wearable electronic device. The VR client device (such as the VR device 400) may include a tracking device (e.g., the tracking device 40) that is configured to track head movement of the user 402, and adapt the video data shown via the VR device 400 to account for the head movements, providing an immersive experience in which the user 402 may experience a displayed world shown in the video data in visual three dimensions. The displayed world may refer to a virtual world (in which all of the world is simulated), an augmented world (in which portions of the world are augmented by virtual objects), or a physical world (in which a real world image is virtually navigated).

While VR (and other forms of AR and/or MR) may allow the user 402 to reside in the virtual world visually, often the VR device 400 may lack the capability to place the user in the displayed world audibly. In other words, the VR system (which may include a computer responsible for rendering the video data and audio data—that is not shown in the example of FIG. 2 for ease of illustration purposes, and the VR device 400) may be unable to support full three-dimension immersion audibly (and in some instances realistically in a manner that reflects the displayed scene presented to the user via the VR device 400).

While described in this disclosure with respect to the VR device, various aspects of the techniques may be performed in the context of other devices, such as a mobile device. In this instance, the mobile device (such as a so-called smartphone) may present the displayed world via a screen, which may be mounted to the head of the user 402 or viewed as would be done when normally using the mobile device. As such, any information on the screen can be part of the mobile device. The mobile device may be able to provide tracking information 41 and thereby allow for both a VR experience (when head mounted) and a normal experience to view the displayed world, where the normal experience may still allow the user to view the displayed world providing a VR-lite-type experience (e.g., holding up the device and rotating or translating the device to view different portions of the displayed world).

In any event, returning to the VR device context, the audio aspects of VR have been classified into three separate categories of immersion. The first category provides the lowest level of immersion, and is referred to as three degrees of freedom (3DOF). 3DOF refers to audio rendering that accounts for movement of the head in the three degrees of freedom (yaw, pitch, and roll), thereby allowing the user to freely look around in any direction. 3DOF, however, cannot account for translational head movements in which the head is not centered on the optical and acoustical center of the soundfield.

The second category, referred to 3DOF plus (3DOF+), provides for the three degrees of freedom (yaw, pitch, and roll) in addition to limited spatial translational movements due to the head movements away from the optical center and acoustical center within the soundfield. 3DOF+ may provide support for perceptual effects such as motion parallax, which may strengthen the sense of immersion.

The third category, referred to as six degrees of freedom (6DOF), renders audio data in a manner that accounts for the three degrees of freedom in term of head movements (yaw, pitch, and roll) but also accounts for translation of the user in space (x, y, and z translations). The spatial translations may be induced by sensors tracking the location of the user in the physical world or by way of an input controller.

3DOF rendering is the current state of the art for the audio aspects of VR. As such, the audio aspects of VR are less immersive than the video aspects, thereby potentially reducing the overall immersion experienced by the user. However, VR is rapidly transitioning and may develop quickly to supporting both 3DOF+ and 6DOF that may expose opportunities for additional use cases.

For example, interactive gaming application may utilize 6DOF to facilitate fully immersive gaming in which the users themselves move within the VR world and may interact with virtual objects by walking over to the virtual objects. Furthermore, an interactive live streaming application may utilize 6DOF to allow VR client devices to experience a live stream of a concert or sporting event as if present at the concert themselves, allowing the users to move within the concert or sporting event.

There are a number of difficulties associated with these use cases. In the instance of fully immersive gaming, latency may need to remain low to enable gameplay that does not result in nausea or motion sickness. Moreover, from an audio perspective, latency in audio playback that results in loss of synchronization with video data may reduce the immersion. Furthermore, for certain types of gaming applications, spatial accuracy may be important to allow for accurate responses, including with respect to how sound is perceived by the users as that allows users to anticipate actions that are not currently in view.

In the context of live streaming applications, a large number of source devices 12A or 12B (hereinafter referred to as source device 12) may stream content 21, where the source devices 12 may have widely different capabilities. For example, one source device may be a smartphone with a digital fixed-lens camera and one or more microphones, while another source device may be production level television equipment capable of obtaining video of a much higher resolution and quality than the smartphone. However, all of the source devices, in the context of the live streaming applications, may offer streams of varying quality from which the VR device may attempt to select an appropriate one to provide an intended experience.

Moreover, similar to the gaming applications, latency in audio data such that loss of synchronization occurs with the video data may result in less immersion. Moreover, spatial accuracy may also be important such that the users may better understand the context or location of different audio sources. Further, when users are live streaming using cameras and microphones, privacy may become an issue, as users may not want to live streams fully available to the public.

In the context of streaming application (live or recorded), there may be a large number of audio streams associated with varying levels of quality and/or content. The audio streams may represent any type of audio data, including scene-based audio data (e.g., ambisonic audio data, including FOA audio data, MOA audio data and/or HOA audio data), channel-based audio data, and object-based audio data. Selecting only one of a potentially large number of audio streams from which to recreate a soundfield may not provide an experience that ensures an adequate level of immersion. However, selecting multiple audio streams may create distractions due to different spatial localization between the multiple audio streams, thereby potentially reducing immersion.

In accordance with the techniques described in this disclosure, the audio decoding device 34 may adaptively select between audio streams available via the bitstream 27 (which are represented by the bitstream 27 and hence the bitstream 27 may be referred to as "audio streams 27"). The audio decoding device 34 may select between different audio streams of the audio streams 27 based on audio location information (ALI) (e.g., 45A in FIGS. 1A-1C), such as capture location information or location information relating to a synthesized audio source included as metadata accompanying the audio streams 27, where the audio location information may define coordinates in the displayed world for the microphones that capture the respective audio streams 27 or coordinates in an acoustical space. The ALI 45A may be representative of a capture location (or synthesize location) in a displayed world (or an acoustical space) at which the corresponding one of the audio streams 27 was captured or synthesized. The audio decoding device 34 may select, based on the ALI 45A, a subset of the audio streams 27, where the subset of the audio streams 27 excludes at least one of the audio streams 27. The audio decoding device 34 may output the subset of audio streams 27 as audio data 19' (which may also be referred to as "audio streams 19'"). In some examples, the audio decoding device 34 may only decode the subset of the audio streams in response to the selection.

In addition, the audio decoding device 34 may obtain the tracking information 41, which the content consumer device 14 may translate into device location information (DLI) 45B. In some examples, the DLI 45B may represent a virtual location of the content consumer device 14 in the displayed world, which may be defined as one or more device coordinates in the displayed world. In some examples, the DLI 45B may represent location device coordinates in an acoustical space. While sometimes discussed herein as representing a virtual location of the content consumer device in a displayed world, DLI 45B may be device information representative of the physical location of the content consumer device 14. For example, content consumer device 14 may not provide a user with a displayed world. The content consumer device 14 may provide the DLI 45B to the audio decoding device 34. The audio decoding device 34 may then select, based on the ALI 45A and the DLI 45B, the audio streams 19' from the audio streams 27. The audio playback system 16A or 16B may then reproduce, based on the audio streams 19', the corresponding soundfields.

In this respect, the audio decoding device 34 may adaptively select a subset of the audio streams 27 to obtain the audio streams 19' that may result in a more immersive experience (compared to selecting a single audio stream or all of the audio streams 19'). As such, various aspects of the techniques described in this disclosure may improve operation of the audio decoding device 34 (and the audio playback system 16A and the content consumer device 14) itself by possibly enabling the audio decoding device 34 to better spatialize sound sources within the soundfield and thereby improve immersion.

In operation, the audio decoding device 34 may interface with one or more source devices 12 to determine the ALI 45A for each of the audio streams 27. As shown in the example of FIG. 1A, the audio decoding device 34 may include a stream selection unit 44, which may represent a unit configured to perform various aspects of the audio stream selection techniques described in this disclosure.

The stream selection unit 44 may generate, based on the ALI 45A, a constellation map (CM) 47. The CM 47 may define the ALI 45A for each of the audio streams 27. The stream selection unit 44 may also perform an energy analysis with respect to each of the audio streams 27 to determine an energy map for each of the audio streams 27, storing the energy map along with the ALI 45A in the CM 47. The energy maps may jointly define an energy of a common soundfield represented by the audio streams 27.

The stream selection unit 44 may next determine a distance between the virtual location represented by the DLI 45B and the capture location (or synthesize location) represented by the ALI 45A associated with at least one (and possibly each) of the audio streams 27. The stream selection unit 44 may then select, based on the distance(s), the audio streams 19' from the audio streams 27 as discussed in more detail below with respect to FIGS. 3A-3D.

Further, in some examples, the stream selection unit 44 may also select, based on the energy maps stored to the CM 47, the ALI 45A, and the DLI 45B (jointly where the ALI 45A and the DLI 45B are presented in the form of the above noted distances, which may also be referred to as "relative distances"), the audio streams 19' from the audio streams 27. For example, the stream selection unit 44 may analyze the energy maps presented in the CM 47 to determine an audio source location (ASL) 49 of an audio source in the common soundfield emitting sound that is captured by microphones (such as the microphone 18) and represented by the audio streams 27. The stream selection unit 44 may then determine, based on ALI 45A, the DLI 45B, and the ASL 49, the audio streams 19' from the audio streams 27. More information regarding how the stream selection unit 44 may select the streams is discussed below with respect to FIGS. 3A-3D.

Figure 3A:
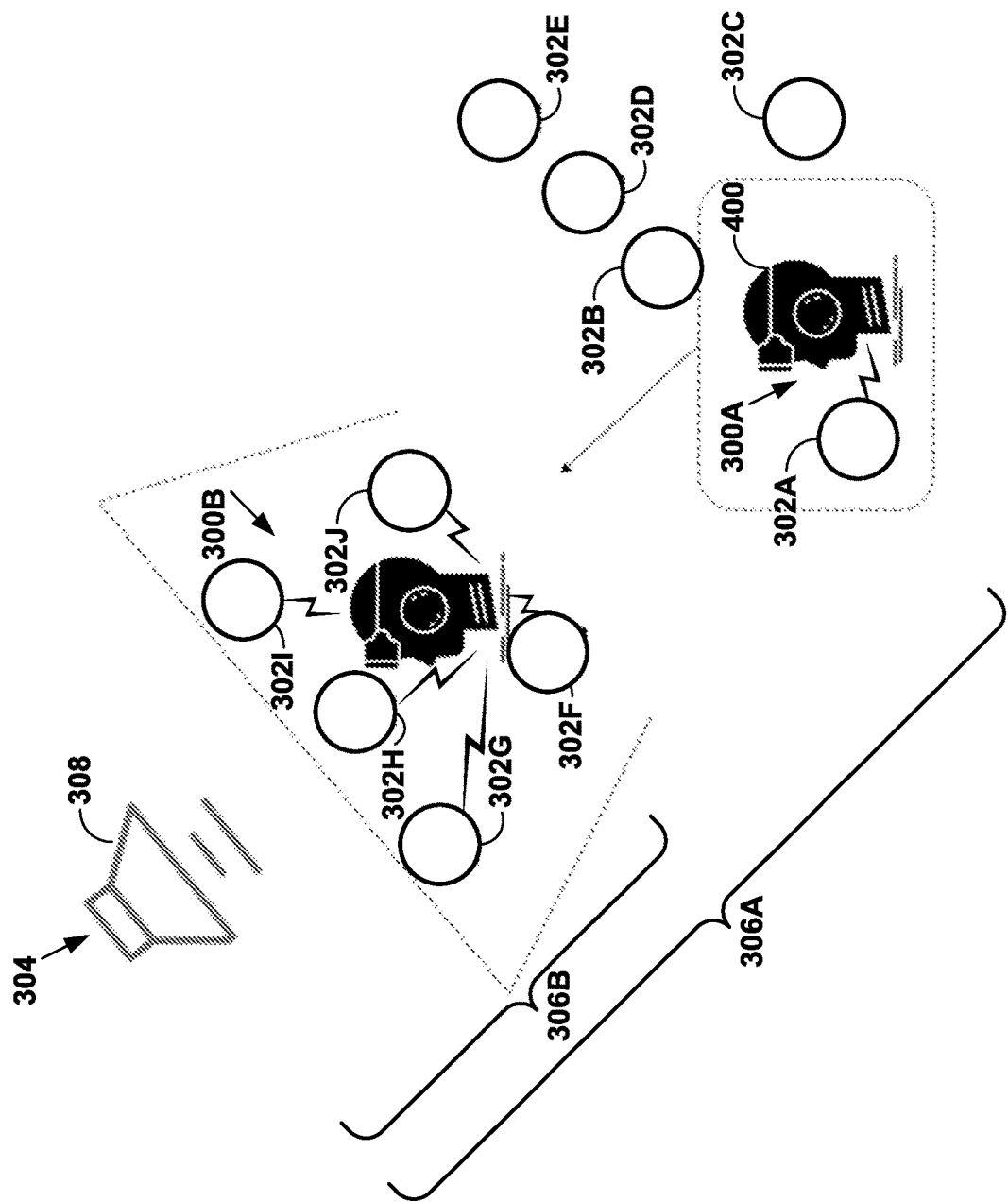
FIGS. 3A-3E are diagrams illustrating, in more detail, example operations of the stream selection unit shown in the examples of FIGS. 1A-1C.

FIGS. 3A-3D are diagrams illustrating, in more detail, example operation of the stream selection unit 44 shown in the example of FIG. 1A. As shown in the example of FIG. 3A, the stream selection unit 44 may determine that the DLI 45B indicates that the content consumer device 14 (shown as the VR device 400) is at virtual location 300A. The stream selection unit 44 may next determine the ALI 45A for one or more of audio elements 302A-302J (collectively referred to as audio elements 302) which may represent microphones, such as the microphone 18 shown in FIG. 1A, other types of capture devices, including other XR devices, mobile phones—including so-called smartphones—and the like, or synthesized sound field, etc.

As described above, the stream selection unit 44 may obtain the audio streams 27. The stream selection unit 44 may interface with audio elements 302A-302J to obtain the audio streams 27. In some examples, the stream selection unit 44 may interact with an interface (such as a receiver, a transmitter and/or a transceiver) to obtain the audio streams 27 in accordance with a fifth generation (5G) cellular standard, a personal area network (PAN), such as Bluetooth™, or some other open-source, proprietary or standardized communication protocol. Wireless communication of the audio streams is denoted as a lightning bolt in the examples of FIGS. 3A-3D, where the selected audio data 19' is shown as being communicated from the selected one or more of the audio elements 302 to the VR device 400.

In any event, the stream selection unit 44 may next obtain energy maps in the manner described above, analyzing the energy maps to determine the audio source location 304, which may represent one example of the ASL 49 shown in the example of FIG. 1A. The energy maps may denote audio source location 304 as the energy at the audio source location 304 may be higher than the surrounding area. Given that each of the energy maps may denote this higher energy, the stream selection unit 44 may triangulate, based on the higher energy in the energy maps, the audio source location 304.

The stream selection unit 44 may determine an audio source distance 306A. In some examples, stream selection unit 44 may determine the audio source distance 306A as a distance between an audio source location in the acoustical space or virtual acoustical space and the device coordinates. In some examples, stream selection unit 44 may determine the audio source distance as a distance between the audio stream coordinates and the device coordinates. In some examples, stream selection unit 44 may determine the audio source distance as the distance between an audio source location, e.g., audio source location 304 and the device coordinates, (e.g., virtual location 300A of the VR device 400). The stream selection unit 44 may compare the audio source distance 306A to an audio source distance threshold. The stream selection unit 44 may, in some examples, derive the audio source distance threshold based on the energy of the audio source 308. That is, when the audio source 308 has a higher energy (or, in other words, when the audio source 308 is louder), the stream selection unit 44 may increase the audio source distance threshold. When the audio source 308 has a lower energy (or, in other words, when the audio source 308 is quieter), the stream selection unit 44 may decrease the audio source distance threshold. In other examples, the stream selection unit 44 may obtain a statically defined audio source distance threshold, which may be statically defined or specified by the user 402.

In any event, the stream selection unit 44 may select, when the audio source distance 306A is greater than the audio source distance threshold (which is assumed in this example for purposes of illustration), a single audio stream of the audio streams 27 of the audio elements 302A-302J ("audio elements 302"). For example, the stream selection unit 44 may select the audio stream of the audio element (e.g., audio element 302A) having the shortest distance to virtual location 300A. The stream selection unit 44 may output the corresponding one of the audio streams 27, which the audio decoding device 34 may decode and output as the audio data 19'.

Assuming that the user 402 moves from the virtual location 300A to the virtual location 300B, the stream selection unit 44 may determine an audio source distance 306B as a distance between the audio source location 304 and the virtual location 300B. In some examples, the stream selection unit 44 may only update after some configurable release time, which may refer to a time after the listener stops moving.

In any event, the stream selection unit 44 may again compare the audio source distance 306B to the audio source distance threshold. The stream selection unit 44 may select, when the audio source distance 306B is less than or equal to the audio source distance threshold (which is assumed in this example for purposes of illustration), multiple audio streams of the audio streams 27 of audio elements 302A-302J ("audio elements 302"). The stream selection unit 44 may output the corresponding one of the audio streams 27, which the audio decoding device 34 may decode and output as the audio data 19'.

The stream selection unit 44 may also determine one or more proximity distances between the virtual location 300A and one or more (and possibly each) of the capture locations (or synthesize locations) represented by the ALI 45A to obtain one or more proximity distances. The stream selection unit 44 may then compare the one or more proximity distances to a threshold proximity distance. The stream selection unit 44 may select, when the one or more proximity distances are greater than the threshold proximity distance, a smaller number of the audio streams 27 compared to when the one or more proximity distances are less than or equal to the threshold proximity distance to obtain the audio streams 19'. However, the stream selection unit 44 may select, when the one or more of the proximity distances are less than or equal to the threshold proximity distance, a larger number of the audio streams 27 compared to when the one or more proximity distances are greater than the threshold proximity distance to obtain the audio streams 19'.

In other words, the stream selection unit 44 may attempt to select those of the audio streams 27 such that the audio streams 19' are most closely aligned to the virtual location 300B and surround the virtual location 300B. The proximity distance threshold may define such a threshold, which the user 402 may set or the stream selection unit 44 may again determine dynamically based on a quality of the audio elements 302F-302J, the gain or loudness of the audio source 308, tracking information 41 (e.g., to determine whether the user 402 is facing the audio source 308), or any other factors.

In this respect, the stream selection unit 44 may increase audio spatialization accuracy when the listener is at the location 300B. Furthermore, when the listener is at the location 300A, the stream selection unit 44 may reduce a bitrate, as only the audio stream of audio element 302A is used to reproduce the soundfield rather than multiple audio streams of audio elements 302B-302J.

Figure 3B:
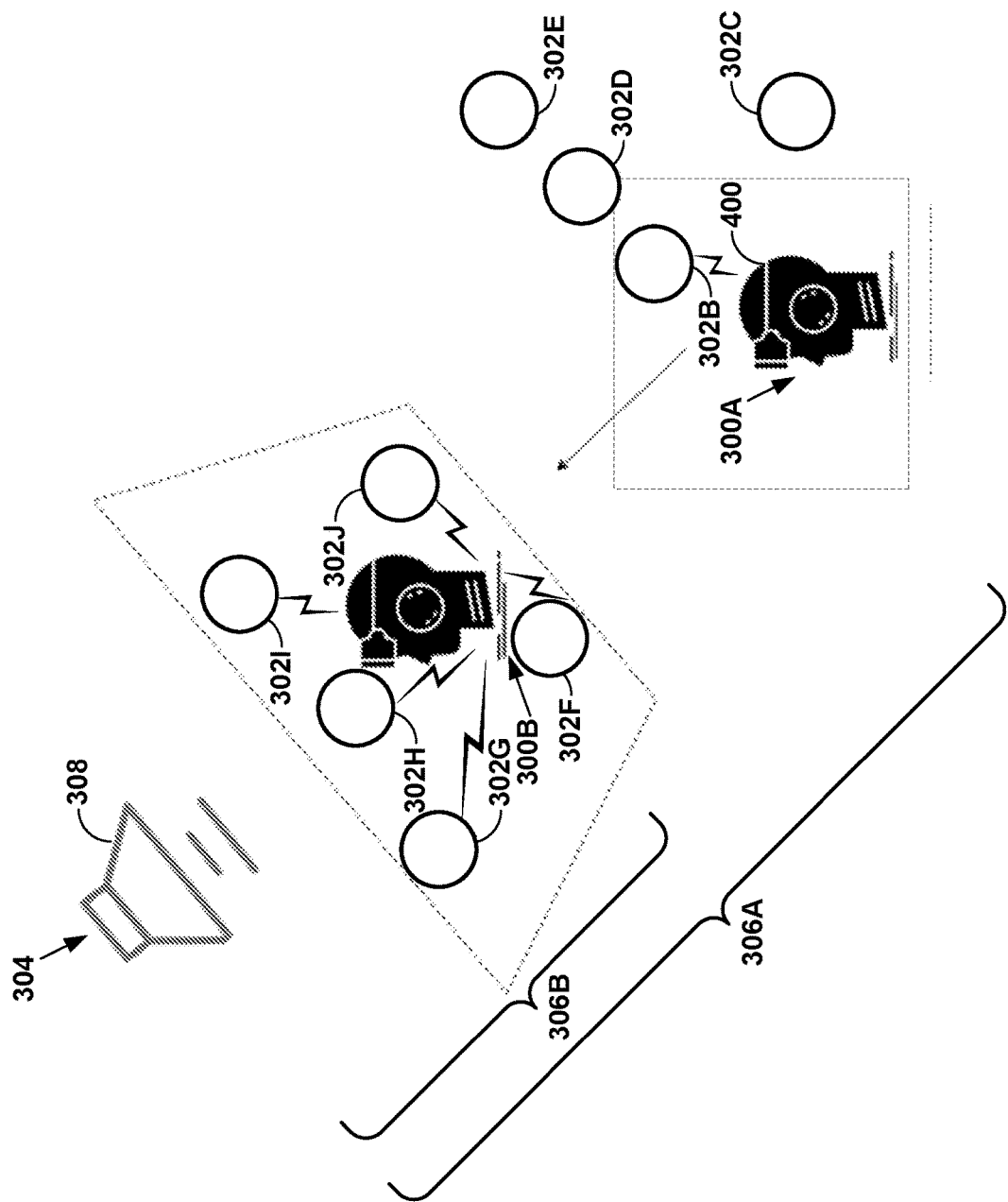

Referring next to the example of FIG. 3B, the stream selection unit 44 may determine that the audio stream of audio element 302A is corrupted, noisy, or unavailable. The stream selection unit 44 may remove the audio stream from the CM 47 and reiterate through the audio streams 27 in accordance with the techniques described in more detail above to select a single one of the audio streams 27 (e.g., the audio stream of audio element 302B in the example of FIG. 3B) given that the audio source distance 306A is greater than the audio source distance threshold.

Figure 3C:
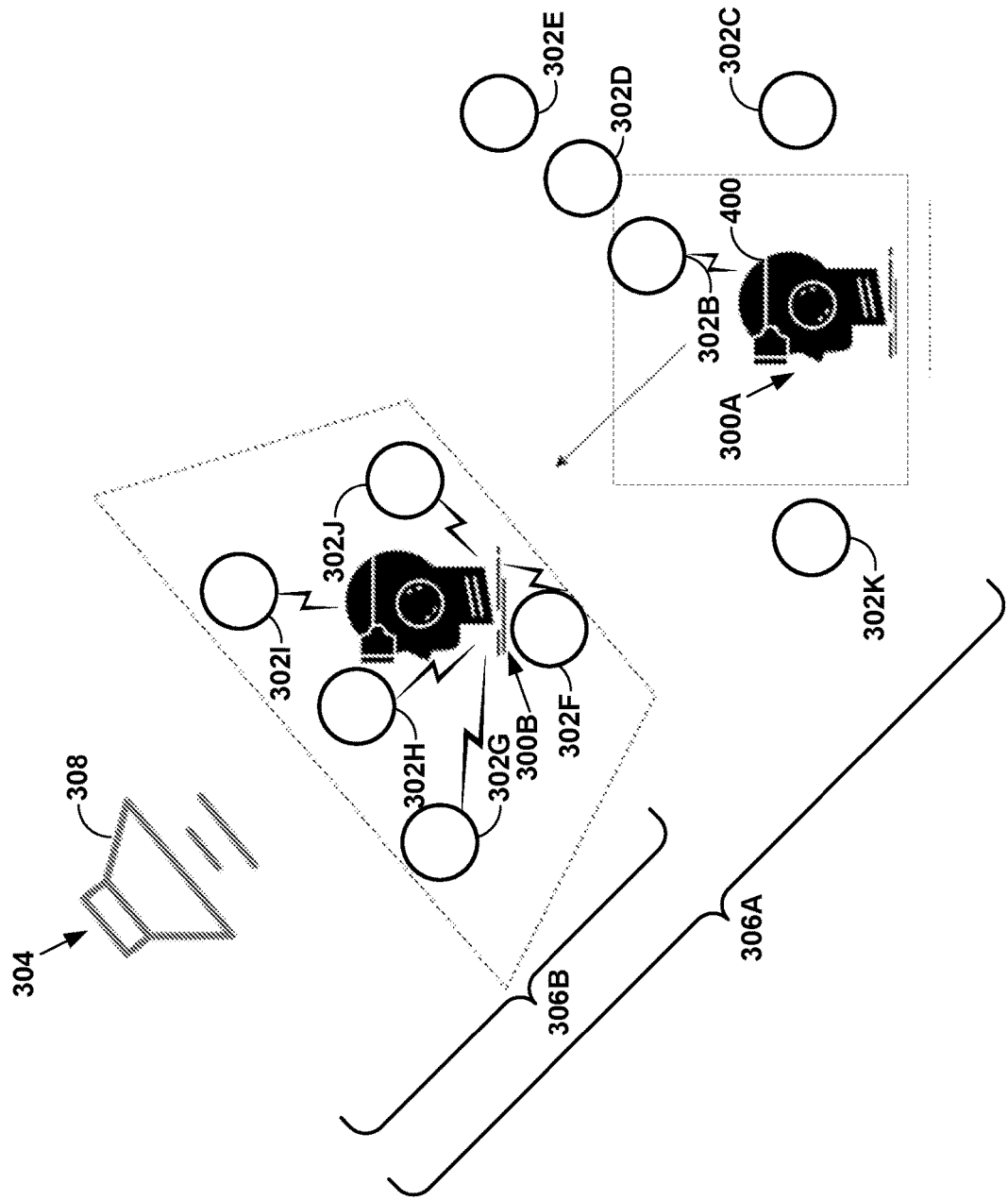

Referring next to the example of FIG. 3C, the stream selection unit 44 may obtain a new audio stream (the audio stream of audio element 302K) and corresponding new audio information, such as metadata, that includes ALI 45A. The stream selection unit 44 may add the new audio stream to the CM 47 representative of the audio streams 27. The stream selection unit 44 may then reiterate through the audio streams 27 in accordance with the techniques described in more detail above to select a single one of the audio streams 27 (e.g., the audio stream of audio element 302B in the example of FIG. 3C) given that the audio source distance 306A is greater than the audio source distance threshold.

Figure 3D:
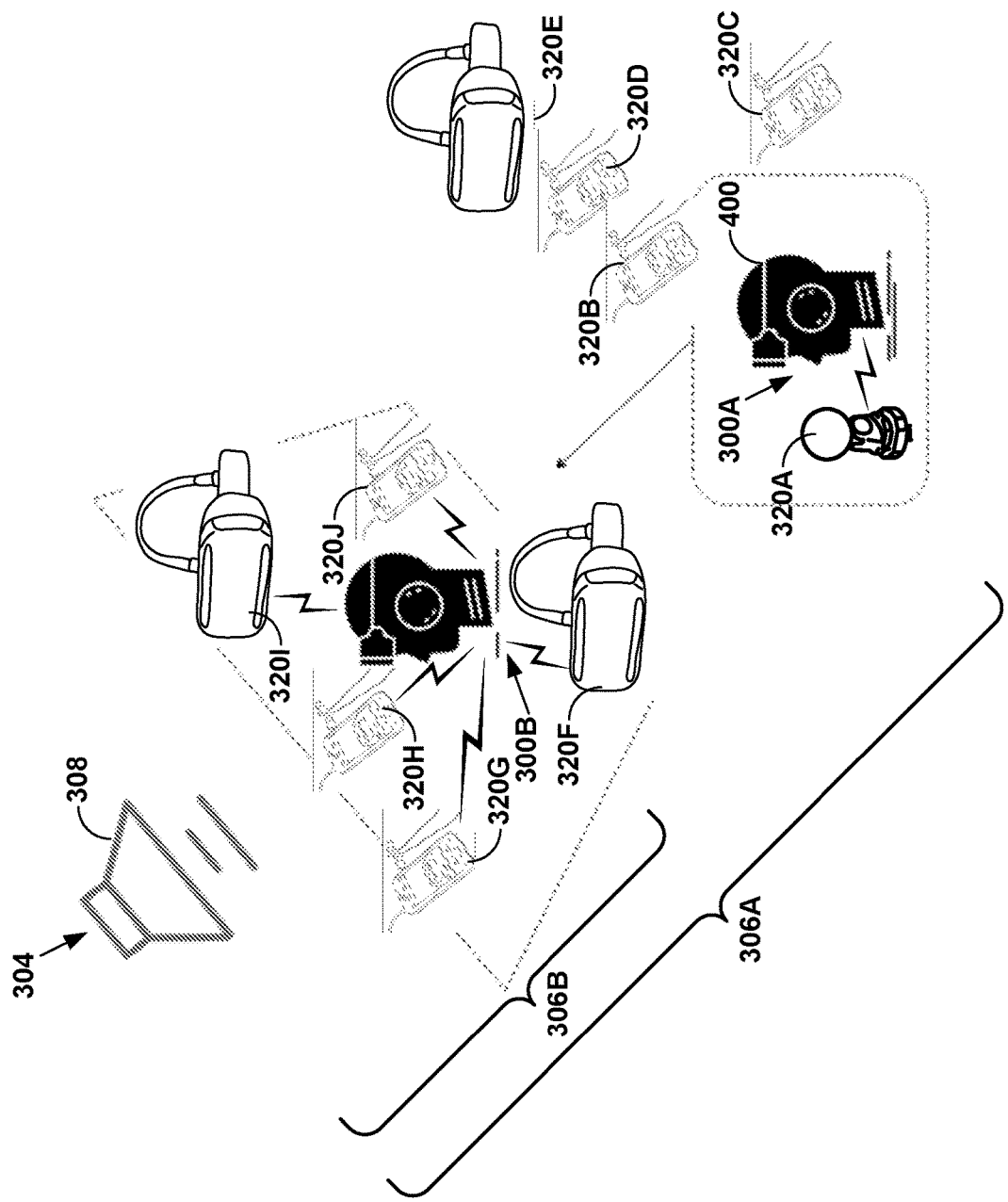

In the example of FIG. 3D, the audio elements 302 are replaced with specific example devices 320A-320J ("devices 320"), where device 320A represents a dedicated microphone 320A, while devices 320B, 320C, 320D, 320G, 320H, and 320J represent smartphones. The devices 320E, 320F, and 320I may represent VR devices. Each of devices 320 may include the audio elements 302, which may represent captured or synthesized audio streams 27 that are to be selected in accordance with various aspects of the stream selection techniques described in this disclosure.

Figure 3E:
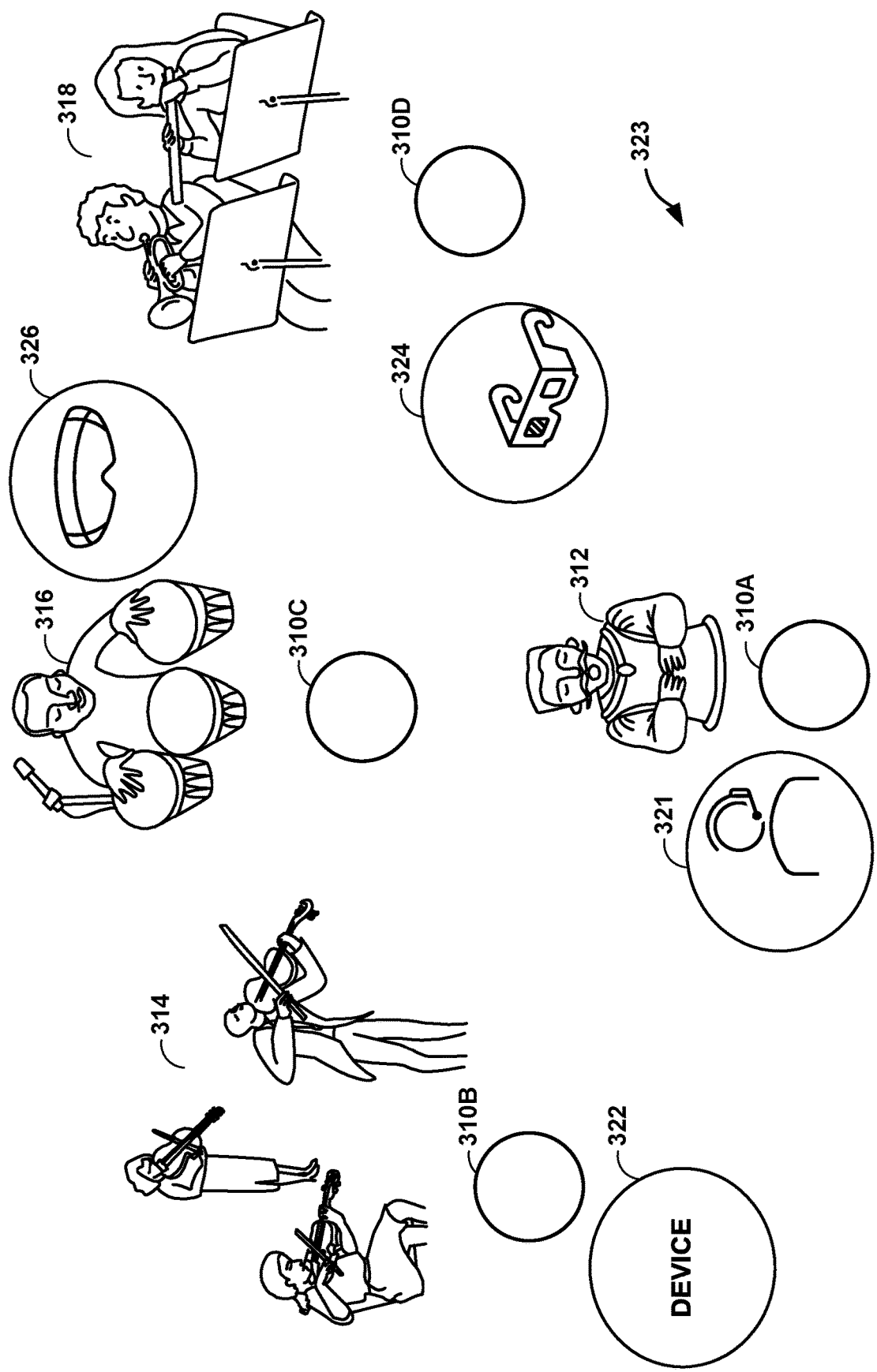

FIG. 3E is a conceptual diagram illustrating an example concert with three or more audio elements. In the example of FIG. 3E, a number of musicians are depicted on stage 323. Singer 312 is positioned behind audio element 310A. A string section 314 is depicted behind audio element 310B. Drummer 316 is depicted behind audio element 310C. Other musicians 318 are depicted behind audio element 310D. Audio elements 310A-301D may represent captured audio streams that correspond to the sounds received by microphones. In some examples, audio elements 310A-310D may represent synthesized audio streams. For example, audio element 310A may represent a captured audio stream(s) primarily associated with singer 312, but the audio stream(s) may also include sounds produced by other band members, such as the string section 314, the drummer 316 or the other musicians 318, while the audio element 310B may represent a captured audio stream(s) primarily associated with string section 314, but include sounds produced by other band members. In this manner, each of audio elements 310A-310D, may represent a different audio stream(s).

Also, a number of devices are depicted. These devices represent user devices located at a number of different listening positions. Headphones 321 are positioned near audio element 310A, but between audio element 310A and audio element 310B. As such, according to the techniques of this disclosure, stream selection unit 44 may select at least one of the audio streams to produce an audio experience for the user of the headphones 321 similar to the user being located where the headphones 321 are located in FIG. 3E. Similarly, VR goggles 326 are shown located behind the audio element 310C and between the drummer 316 and the other musicians 318. The stream selection unit 44 may select at least one audio stream to produce an audio experience for the user of the VR goggles 326 similar to the user being located where the VR goggles 326 are located in FIG. 3E.

Smart glasses 324 are shown located fairly centrally between the audio elements 310A, 310C and 310D. The stream selection unit 44 may select at least one audio stream to produce an audio experience for the user of the smart glasses 324 similar to the user being located where the smart glasses 324 are located in FIG. 3E. Additionally, device 322 (which may represent any device capable of implementing the techniques of this disclosure, such as a mobile handset, a speaker array, headphones, VR goggles, smart glasses, etc.) is shown located in front of audio element 310B. Stream selection unit 44 may select at least one audio stream to produce an audio experience for the user of the device 322 similar to the user being located where the device 322 is located in FIG. 3E. While specific devices where discussed with respect to particular locations, any of the devices depicted may provide an indication of a desired listening position that is different than depicted in FIG. 3E.

FIGS. 4A-4E are flowcharts illustrating example operation of the stream selection unit 44 shown in the examples of FIGS. 1A and 1B in performing various aspects of the stream selection techniques. Referring first to the example of FIG. 4A, the stream selection unit 44 may obtain audio stream 27 from all enabled audio elements, where the audio streams 27 may include corresponding audio metadata, such as the ALI 45A (800). The stream selection unit 44 may perform the energy analysis with respect to each of the audio streams 27 to calculate a respective energy map (802).

Figure 4A:
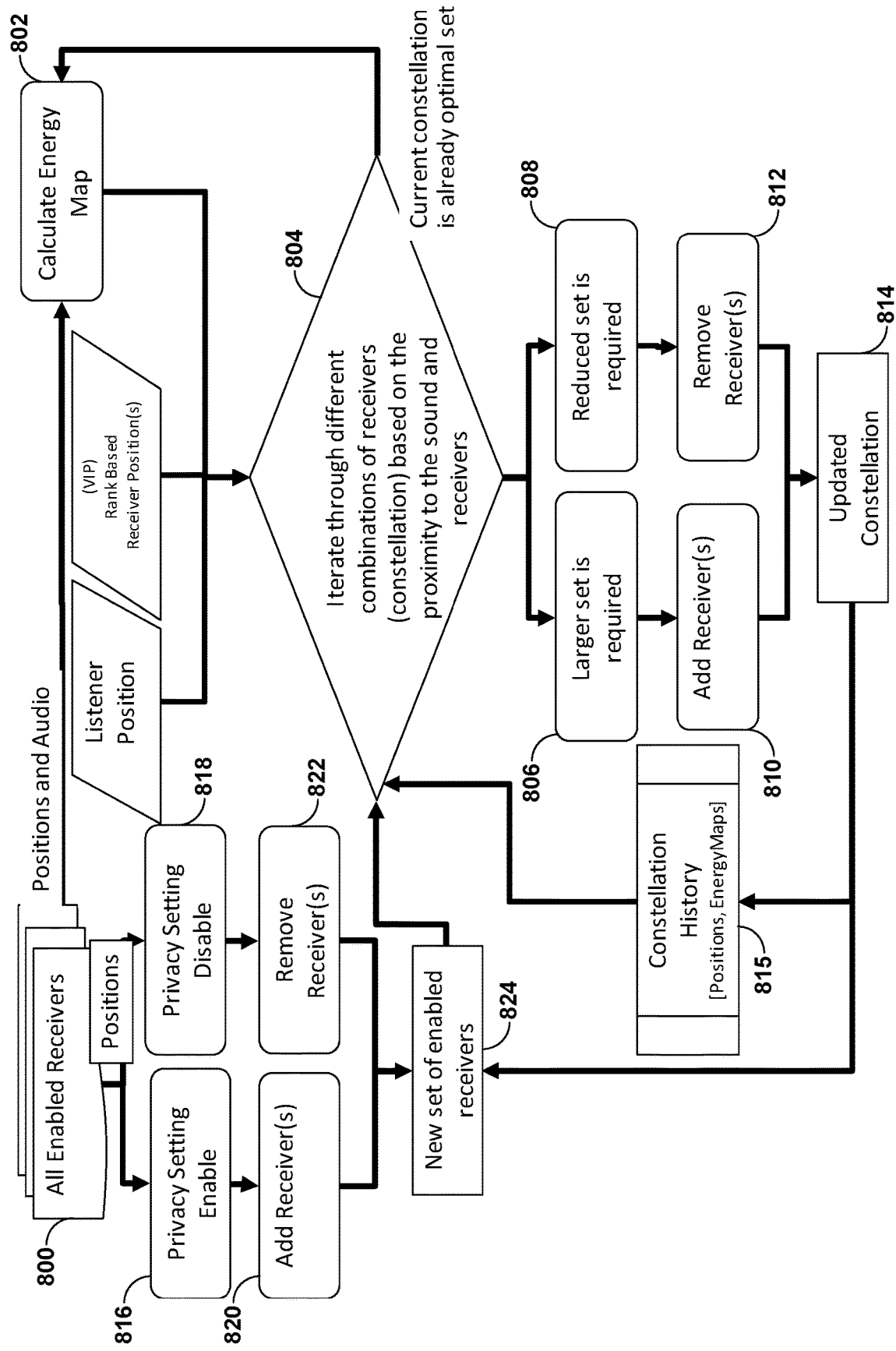
FIGS. 4A-4E are flowcharts illustrating example operation of the stream selection unit shown in the examples of FIGS. 1A-1C in performing various aspects of the stream selection techniques.

The stream selection unit 44 may next iterate through different combinations of the audio elements (defined in the CM 47) based on proximity to the audio source 308 (as defined by audio source distance 306A and/or 306B) and the audio elements (as defined by the proximity distances discussed above) (804). As shown in FIG. 4A, the audio elements may be ranked or otherwise associated with different access rights. The stream selection unit 44 may iterate, based on the listener position (which is another way to refer to the "virtual location") represented by the DLI 45B, and the audio element positions represented by the ALI 45A, in the manner described above to identify whether a larger subset of the audio streams 27 or a reduced subset of the audio streams 27 is required (806, 808).

When a larger subset of the audio streams 27 is required, the stream selection unit 44 may add audio element(s), or in other words, additional audio stream(s) to the audio streams 19' (such as when the user is closer to the audio source in the example of FIG. 3A) (810). When a reduced subset of the audio streams 27 is required, the stream selection unit 44 may remove audio element(s) or in other words, existing audio stream(s) from the audio streams 19' (such as when the user is farther from the audio source in the example of FIG. 3A) (812).

In some examples, the stream selection unit 44 may determine that the current constellation of audio elements is an optimal set (or, in other words, that the existing audio streams 19' is to remain the same as the selection process described herein results in the same audio streams 19') (804) and the process may return to 802. However, when audio streams are added or removed from the audio streams 19', the stream selection unit 44 may update the CM 47 (814), generating a constellation history (815) (including positions, energy maps, etc.).

In addition, the stream selection unit 44 may determine whether privacy settings enable or disable addition of the audio elements (where the privacy settings may refer to digital access rights that limit access to one or more of the audio streams 27, e.g., by way of a password, an authorization level or rank, a time, etc.) (816, 818). When privacy settings enable addition of an audio element, the stream selection unit 44 may add audio element(s) to the updated CM 47 (which refers to addition of audio stream(s) to the audio streams 19') (820). When privacy settings disable addition of an audio element, the stream selection unit 44 may remove audio element(s) from the updated CM 47 (which refers to removal of audio stream(s) from the audio streams 19') (822). In this manner, the stream selection unit 44 may identify a new set of enabled audio elements (824).

The stream selection unit 44 may iterate in this fashion and update various inputs according to any given frequency. For example, the stream selection unit 44 may update privacy settings at a user interface rate (meaning that updates are driven by way of updates entered via the user interface). The stream selection unit 44, as another example, may update positions at sensor rate (meaning that positions are changed through movement of the audio element). The stream selection unit 44 may further update the energy maps at an audio frame rate (meaning that the energy maps are updated each frame).

Figure 4B:
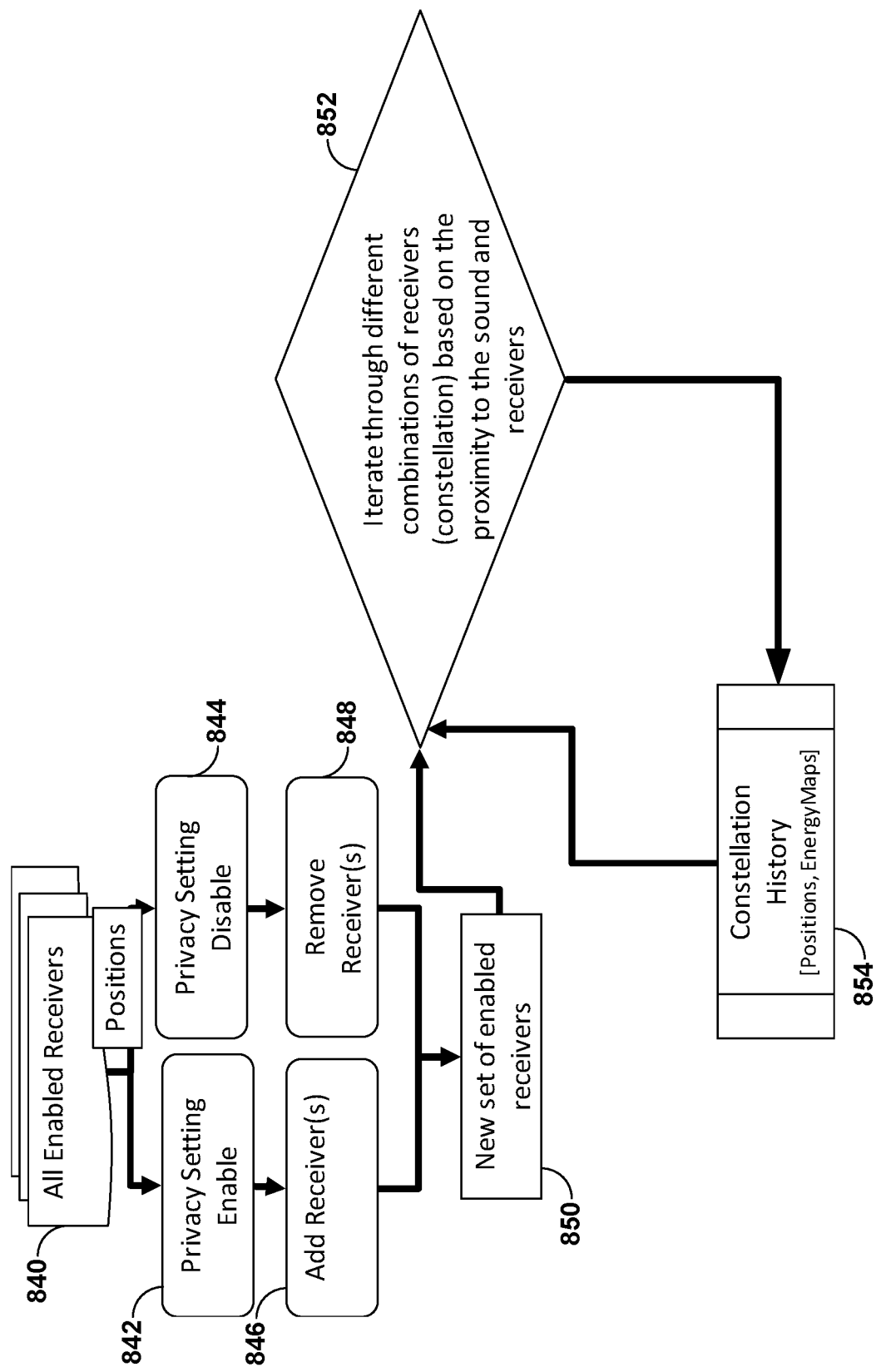

Referring next to the example of FIG. 4B, the stream selection unit 44 may operate in the manner described above with respect to FIG. 4A, except that the stream selection unit 44 may not base the determination of the CM 47 on energy maps. As such, the stream selection unit 44 may obtain audio stream 27 from all enabled audio elements, where the audio streams 27 may include corresponding audio metadata, such as the ALI 45A (840). The stream selection unit 44 may determine whether privacy settings enable or disable addition of the audio elements (where the privacy settings may refer to digital access rights that limit access to one or more of the audio streams 27, e.g., by way of a password, an authorization level or rank, a time, etc.) (842, 844).

When privacy settings enable addition of an audio element, the stream selection unit 44 may add audio element(s) to the updated CM 47 (which refers to addition of audio stream(s) to the audio streams 19') (846). When privacy settings disable addition of an audio element, the stream selection unit 44 may remove audio element(s) from the updated CM 47 (which refers to removal of audio streams from the audio streams 19') (848). In this manner, the stream selection unit 44 may identify a new set of enabled audio elements (850). The stream selection unit 44 may iterate (852) through the different combinations of audio elements in the CM 47 to determine the constellation history (854), which is representative of the audio streams 19'.

The stream selection unit 44 may iterate in this fashion and update various inputs according to any given frequency. For example, the stream selection unit 44 may update privacy settings at a user interface rate (meaning that updates are driven by way of updates entered via the user interface). The stream selection unit 44, as another example, may update positions at sensor rate (meaning that positions are changed through movement of the audio element).

Figure 4C:
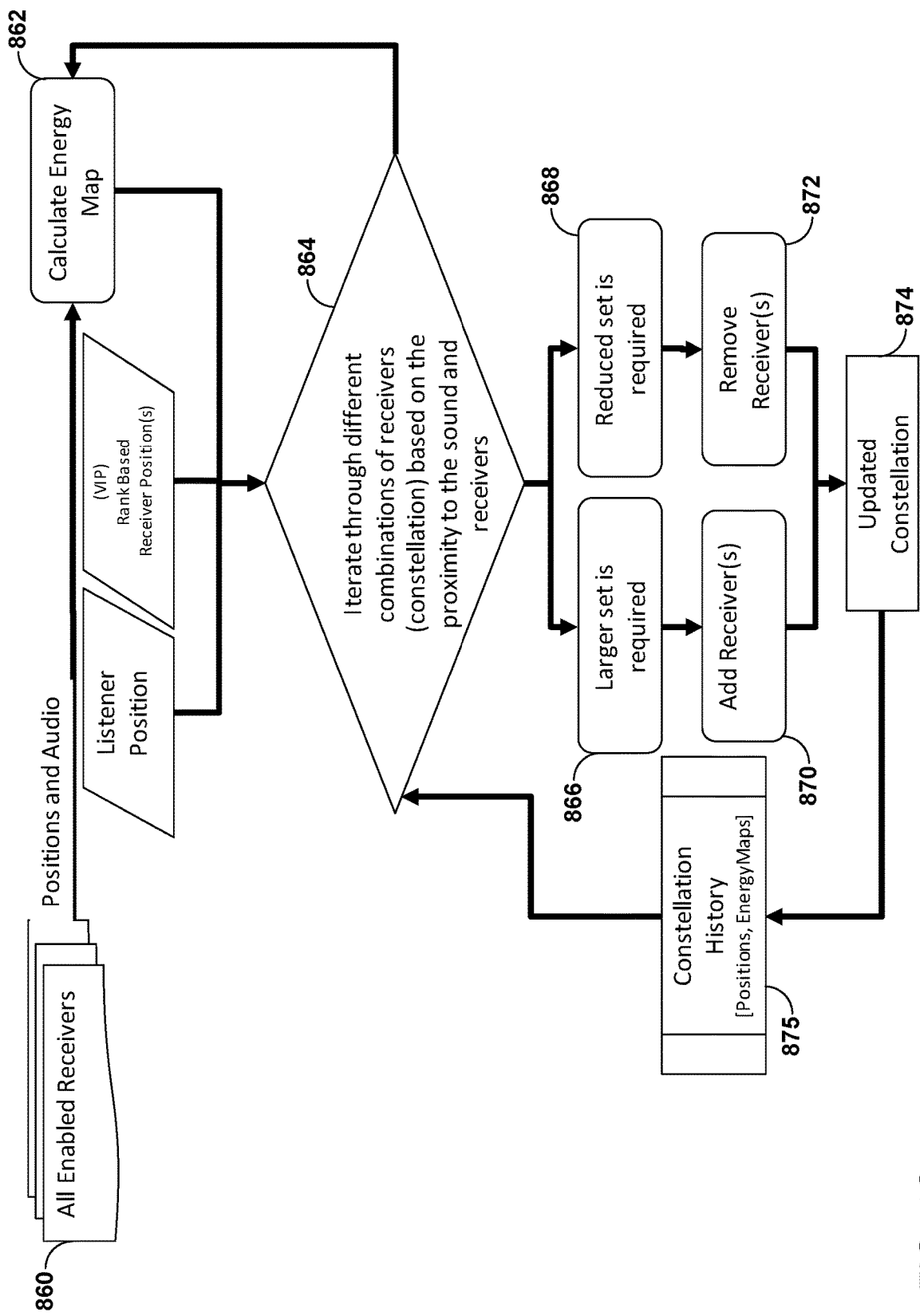

Referring next to the example of FIG. 4C, the stream selection unit 44 may operate in the manner described above with respect to FIG. 4A, except that the stream selection unit 44 may not base the determination of the CM 47 on privacy setting enabled audio elements. As such, the stream selection unit 44 may obtain audio stream 27 from all enabled audio elements, where the audio streams 27 may include corresponding audio metadata, such as the ALI 45A (860). The stream selection unit 44 may perform the energy analysis with respect to each of the audio streams 27 to calculate a respective energy map (862).

The stream selection unit 44 may next iterate through different combinations of the audio elements (defined in the CM 47) based on proximity to the audio source 308 (as defined by audio source distance 306A and/or 306B) and the audio elements (as defined by the proximity distances discussed above) (864). As shown in FIG. 4C, the audio elements may be ranked or otherwise associated with different access rights. The stream selection unit 44 may iterate, based on the listener position (which again is another way to refer to the "virtual location" discussed above) represented by the DLI 45B, and the audio element positions represented by the ALI 45A, in the manner described above to identify whether a larger subset of the audio streams 27 or a reduced subset of the audio streams 27 is required (866, 868).

When a larger subset of the audio streams 27 is required, the stream selection unit 44 may add audio element(s), or in other words, additional audio stream(s) to the audio streams 19' (such as when the user is closer to the audio source in the example of FIG. 3A) (870). When a reduced subset of the audio streams 27 is required, the stream selection unit 44 may remove audio element(s) or in other words existing audio stream(s) from the audio streams 19' (such as when the user is farther from the audio source in the example of FIG. 3A) (872).

In some examples, the stream selection unit 44 may determine that the current constellation of audio elements is an optimal set (or, in other words, that the existing audio streams 19' is to remain the same as the selection process described herein results in the same audio streams 19') (864) and the process may return to 862. However, when audio streams are added or removed from the audio streams 19', the stream selection unit 44 may update the CM 47 (874), generating a constellation history (875).

The stream selection unit 44 may iterate in this fashion and update various inputs according to any given frequency. For example, the stream selection unit 44 may update positions at sensor rate (meaning that positions are changed through movement of the audio element). The stream selection unit 44 may further update the energy maps at an audio frame rate (meaning that the energy maps are updated each frame).

Figure 4D:
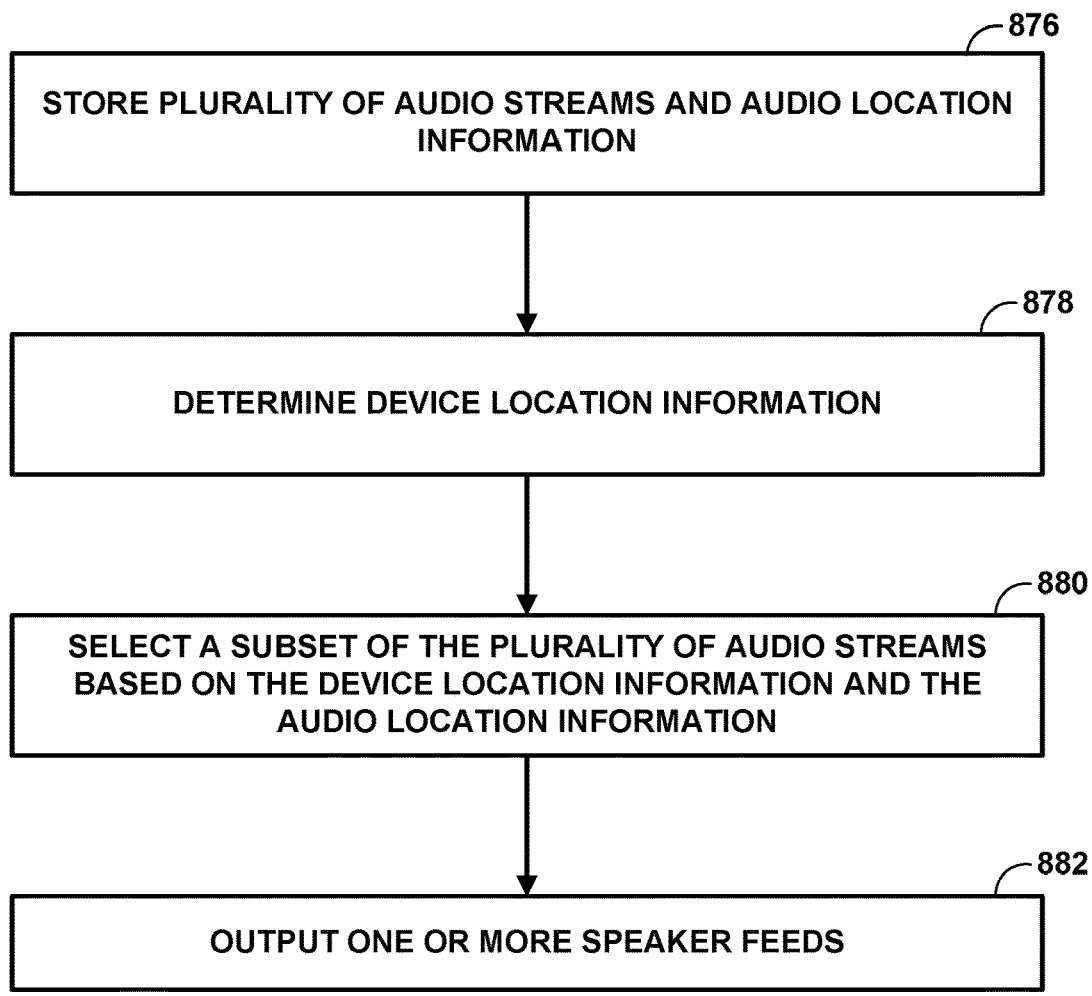

Referring now to the example of FIG. 4D, one or more processors of the content consumer device 14 may store a plurality of audio streams and audio location information (876). The audio location information may be associated with the plurality of audio steams and be representative of audio stream coordinates in an acoustical space where an audio stream was captured or synthesized. In some examples, the acoustical space may be a virtual acoustical space in which an audio stream may be synthesized. The one or more processors of the content consumer device 14 may determine device location information (878). For example, the device location information may be representative of device coordinates of the device in the acoustical space.

The one or more processors of the content consumer device may select a subset of the plurality of audio streams based on the device location information and the audio location information (880). For example, the one or more processors of the content consumer device 14 may determine a proximity distance based on the device location information and the audio location information for at least one of the plurality of audio streams and select, based on the proximity distance, the subset of the plurality of audio streams. In another example, the one or more processors of the content consumer device 14 may compare the proximity distance to a threshold proximity distance and select, when the proximity distance is less than or equal to a threshold proximity distance, a larger number of the plurality of audio streams compared to when the proximity distance is greater than the threshold proximity distance to obtain the subset of the plurality of audio streams. In another example, the one or more processors of the content consumer device 14 may compare the proximity distance to a threshold proximity distance and select, when the proximity distance is greater than the threshold proximity distance, a smaller number of the plurality of audio streams compared to when the proximity distance is less than or equal to the threshold proximity distance to obtain the subset of the plurality of audio streams.

The one or more processors of the content consumer device 14 may output one or more speaker feeds based on the subset of the plurality of audio streams (882). In some examples, the one or more processors of the content consumer device 14 may obtain a new audio stream and corresponding new audio location information and update the subset of the plurality of audio streams to include the new audio stream. For example, user 402 may move towards a new audio stream and the one or more processors of the content consumer device 14 may obtain the new audio stream and update the subset of the plurality of audio streams to include the new audio stream.

Snapping or a snapping mode, in the context of 6DoF audio, may defined as a transform of spatial coordinates for audio rendering. In some examples, this transform of spatial coordinates may be in real-time or substantially in real-time with latency of less than 2 seconds. In this manner, snapping may break the relationship between the listener's coordinates (e.g., a virtual location of a device or listener in a displayed world) used for rendering a visual scene (or audio scene in the case where there is no visual content) and the coordinates used for audio rendering. There may be two snapping modes—hard snapping and soft snapping.

Figure 4E:
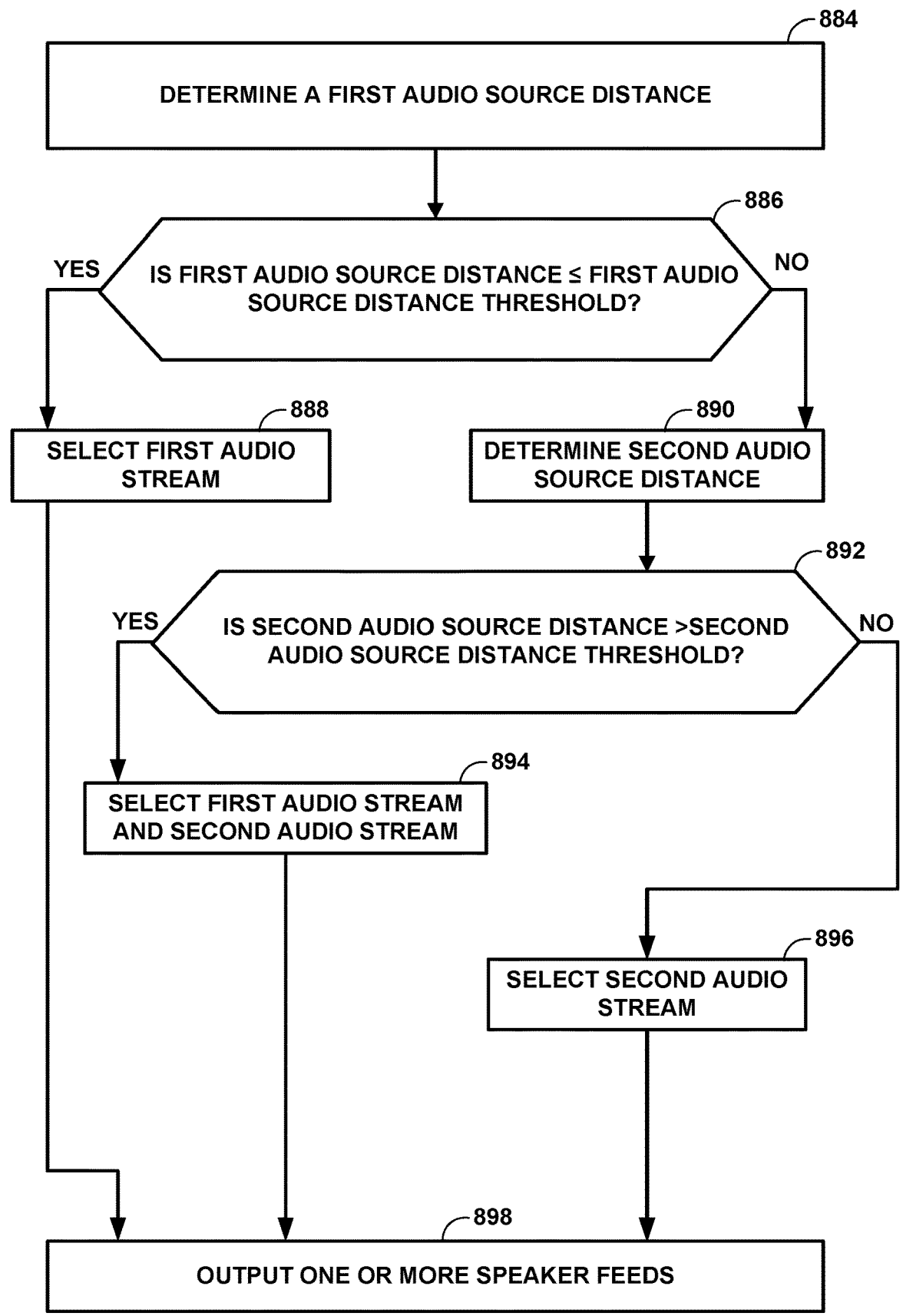

FIG. 4E is a flowchart illustrating an example of snapping according to the techniques of this disclosure. The example of FIG. 4E may be used with the example of FIG. 4D or separately. One or more processors of content consumer device 14 may determine a first audio source distance (884). For example, the one or more processors of content consumer device 14 may determine a distance between audio stream coordinates for the first audio stream in an acoustical space and device coordinates in the acoustical space. The one or more processors of content consumer device 14 may compare the first audio source distance to a first audio source distance threshold (886) to determine whether the first audio source distance is less than or equal to the first audio source distance threshold. When the first audio source distance is less than or equal to the first audio source distance threshold (the "YES" path from box 886), then the one or more processors of content consumer device 14 select the first audio stream (888). In some examples, the first audio stream is the only audio stream selected. The one or more processors of content consumer device 14 may output one or more speaker feeds based on the first audio stream (898). For example, the one or more processors of content consumer device 14 snap the audio experience of a user to the first audio stream.

When the first audio source distance is greater than the first audio source distance threshold (the "NO" path from box 886), in some examples (such as in soft snapping), the one or more processors of content consumer device 14 may determine a second audio source distance (890). For example, the one or more processors of content consumer device 14 may determine a distance between audio stream coordinates for a second audio stream in the acoustical space and device coordinates in the acoustical space. The one or more processors of content consumer device 14 may compare a second audio source distance to the second audio source distance threshold (892) to determine whether the second audio source distance is greater than the second audio source distance threshold. When the second audio source distance is greater than the second audio source distance threshold (the "YES" path from box 892), the one or more processors of content consumer device 14 selects the first audio stream and the second audio stream (894) because the first audio source distance is greater than the first audio source distance threshold and the second audio source distance is greater than the second audio source distance threshold. For example, the one or more processors of content consumer device may combine the first audio stream and the second audio stream by at least one of adaptive mixing the first audio stream and the second audio stream or interpolating a third audio stream based on the first audio stream and the second audio stream. In some examples, the one or more processors of the content consumer device 14 may combine the first audio stream and the second audio stream by applying a function F(x) to the first audio stream and the second audio stream, described in more detail during the discussion of FIGS. 5A-5C. The one or more processors of content consumer device 14 may output one or more speaker feeds based on the first audio stream and the second audio stream (898).

When the second audio source distance is less than or equal to the second audio source distance threshold (the "NO" path from box 892), the one or more processors select the second audio source (896). In some examples, the second audio stream is the only audio stream selected. The one or more processors of content consumer device 14 may output one or more speaker feeds based on the second audio stream (898).

In some examples, the one or more processors of the content consumer device 14 may not select the first audio stream and/or the second audio stream immediately. For example, the one or more processors of the content consumer device 14 may determine whether the device coordinates have been steady relative to the first audio source distance threshold and the second audio source distance threshold for a predetermined period of time. For example, remaining steady means the first audio source distance has not changed with respect to the first audio source distance threshold (e.g., not gone from being less than or equal to being greater than or vice versa) and the second audio source distance has not changed with respect to the second audio source distance threshold (e.g., not gone from being less than or equal to being greater than or vice versa) for the predetermined period of time. Based on the device coordinates being steady relative to the first audio source distance threshold and the second audio source distance threshold for a predetermined period of time, the one or more processors of content consumer device 14 may select, the first audio stream, or the first audio stream and the second audio stream, or second audio stream. It may be desirable to utilize this technique, as a user may be moving along a border of the first audio source distance threshold or the second audio source distance threshold and may otherwise be receiving an audio experience that may be undesirable as the one or more processors of content consumer device 14 may change the selected steam(s) repeatedly.

In some examples, such as when a user is moving, the one or more processors of the content consumer device 14 may select a different audio stream based on the device coordinates changing. For example, a user may move away from one audio source and towards another audio source. In this case, the one or more processors of the content consumer device 14 may select the audio source the user is moving towards. In some examples, the one or more processors of the content consumer device 14 may provide an alert to the user based on the first audio source distance equaling the audio source distance threshold, as this may indicate that the audio experience the user is having is changing. In some examples, the alert may be at least one of a visual alert, an auditory alert, or a haptic alert.

Figure 5A:
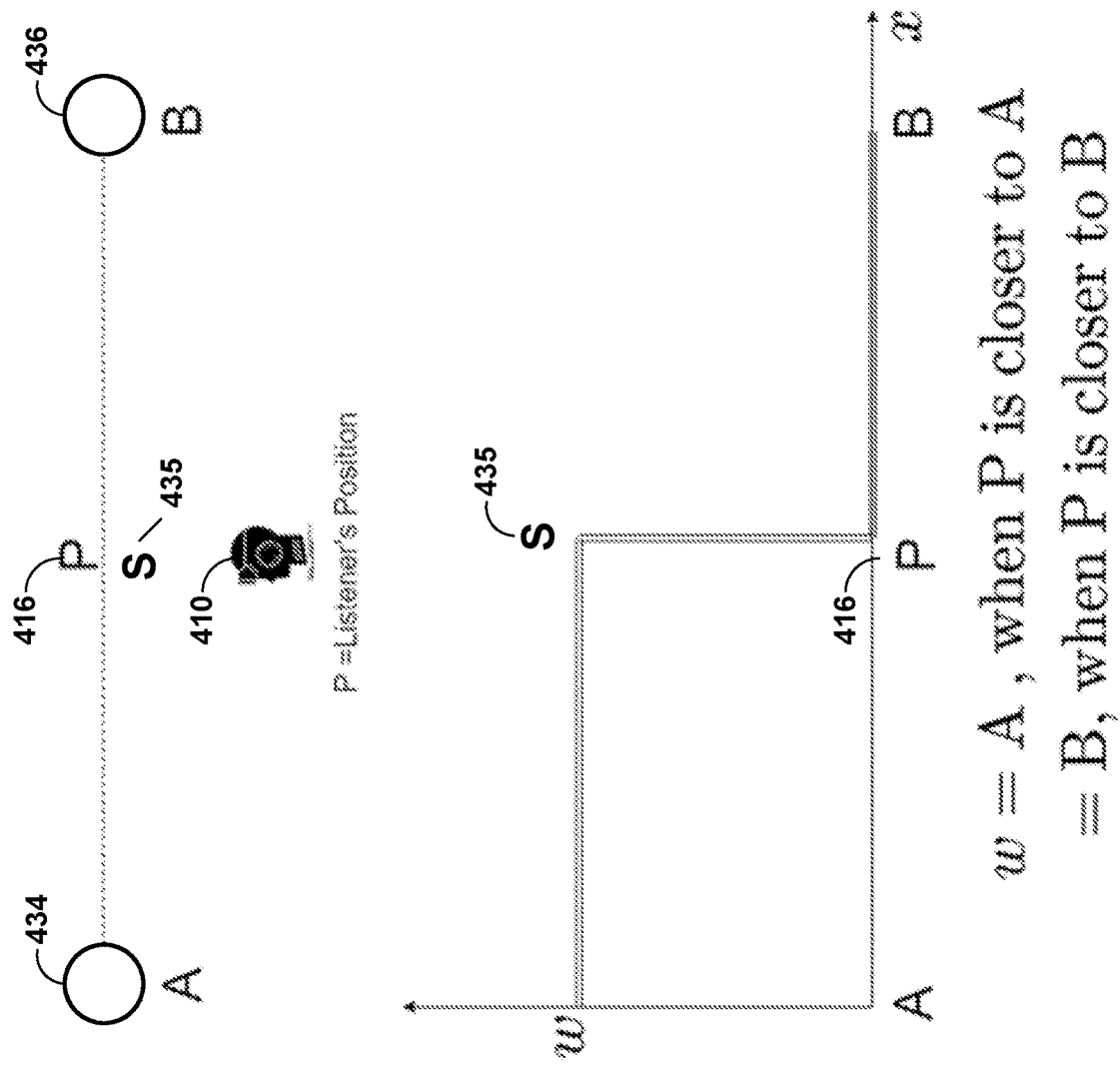
FIGS. 5A-5D are conceptual diagrams illustrating examples of snapping in accordance with aspects of the present disclosure.

Snapping is now discussed in more detail. FIG. 5A is a conceptual diagram illustrating an example of hard snapping. In hard snapping, the threshold for weighting (w) the audio streams may be the distance of the position 416 of listener 410 (also referred to as the virtual location of the device or user) to the closest capture or synthesis location A or B. Audio element 434 at location A and audio element 436 at location B may represent audio signals, such as from audio captures devices, or pre-defined listening positions.

A first audio source distance threshold, such as snap position S 435, may be set anywhere between locations A and B. In some examples, listener 410 may set or move snap position S 435, for example, through a user interface such as the user interface disclosed herein. In some examples, snap position S 435 may be preset, provided in bitstream 27 by source device 12 or generated by content consumer device 14. The snap position S 435 may represent an example of the first audio source distance threshold discussed with respect to FIG. 4E.

When audio elements 434 and 436 at locations A and B, respectively, are the same type of audio capture device, the midpoint of A and B may be set as a default location for position S 435. In the case where the midpoint is the default location for position S 435 (as shown in FIG. 5A), the audio source w is at location A (e.g., audio element 434) when position 416 of listener 410 is closer to location A (w=A) and the audio source w is at location B (e.g., audio element 436) when position 416 of listener 410 is closer to location B. In some examples, listener 410 may over-ride the choice of position S 435 to bias the snapping towards an audio element or sets of audio elements. For example, listener 410 may move position S 435 closer to location A. When listener 410 moves position S 435 closer to location A, listener 410 may hear the audio signal represented by audio element 436 when listener 410 is at the midpoint between locations A and B. When position 416 of listener 410 changes to be closer to location A than position S 435, the audio provided to listener 410 may snap to location A so that the audio signal presented to listener 416 is that represented by audio element 434. When position 416 of listener 410 were to move closer to location B than position S 435, the audio provided to listener 410 may snap to location B and the audio provided to listener 410 may be the audio signal represented by audio element 436.

For example, a device, such as VR device 400 may determine virtual location information representative of a virtual location of the device in the displayed world (e.g., position 416 of listener 410). VR device 400 may compare the virtual location information to a first audio source distance threshold (e.g., position S 435) and select, based on the comparison, at least one audio stream (e.g., audio element 434 or 436) which may be provided to the user (e.g., listener audio element).

Visual or auditory feedback may be provided to alert listener 410 that they have snapped to a listening position (e.g., position A or position B). For example, VR device 400 may provide a visual alert, such as a fade to black, a flash of light and/or a visual marker at the new snapped to position (e.g., position A or position B). In the case where the snapped to location may be out of the field of view of listener 410 (e.g., behind the listener), the visual alert may be indicative of the snapped to location being out of the field of view, for example, fade to black, flash of light, or some other technique that may be associated with the snapped to location being out of listener's 410 field of view.

In some examples, listener 410 may hear a fade in/out during the snap or some other audio alert that is indicative of snapping occurring. For example, headphones 404 may provide listener 410 with a fade in/out, a tone, a jingle, a snapping sound, a word (such as "snap") or some other indication that snapping has occurred.

In some examples, listener 410 may feel a haptic alert, such as a vibration, during the snap or some other haptic alert that is indicative of snapping occurring. For example, the content consumer device 14 may vibrate to inform the listener 410 that snapping has occurred.

Figure 5B:
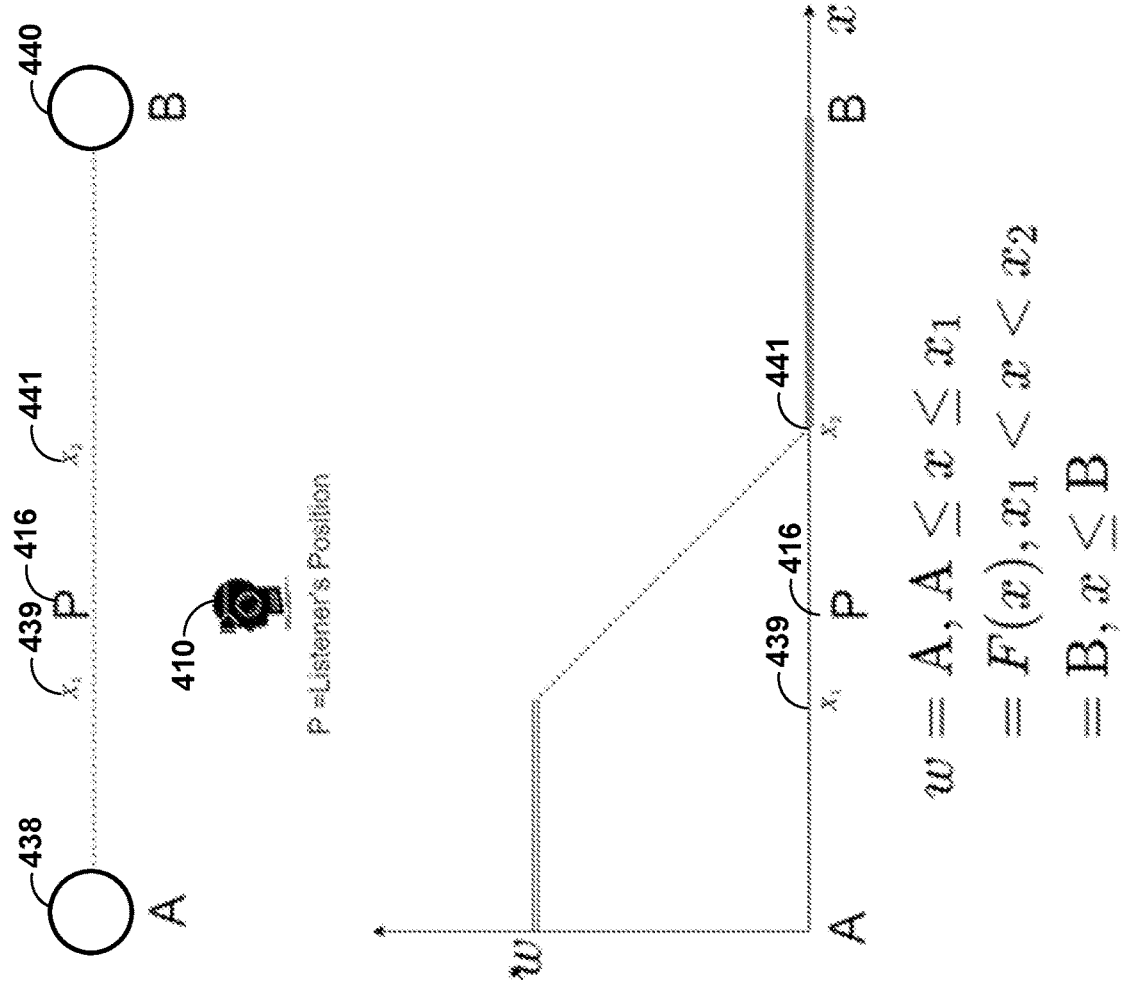

FIG. 5B is a conceptual diagram illustrating an example of soft snapping. Soft snapping may occur when the snapping is softened by a function F(x) when listener 410 is between a first audio source distance threshold (e.g., snap position $x_1$) and a second audio source distance threshold (e.g., snap position $x_2$) (the soft-snap area) as seen in FIG. 5B. While F(x) is shown in FIG. 5B as being a linear function, F(x) may be any function.

In this manner, preference can be given to audio rendering of audio element 438 at location A or audio element 440 at location B by a device such as headphones 404. In some examples, the region may be an asymmetric region and include hysteresis behavior. For example, a device, such as VR device 400, may determine whether position 416 of listener 410 has remained steady relative to a first audio source distance threshold (e.g., snap position $x_1$ 439) and a second audio source distance threshold (e.g., snap position $x_2$ 441) for a predetermined period of time. Based on the device determining that position 416 of listener 410 has been steady for the predetermined period of time, the snap or the transition of the audio being presented to listener 410 may occur. For example, a device may determine that a virtual location of the user has moved from between snap position $x_1$ 439 and snap position $x_2$ 441 to between position $x_2$ 441 and location B (e.g., the second audio source distance is less than the second audio source distance threshold). Once the predetermined time has passed, the audio presented to listener 410 may snap to audio element 440 at location B.

In other respects, soft snapping may function similarly to hard snapping. Listener 410 may snap to location A and hear audio represented by audio element 438 at location A when position 416 of listener 410 is between snap position $x_1$ 439 and location A (w=A when A≤x≤$x_1$, e.g., the first audio source distance is less than or equal to the first audio source distance threshold). Listener 410 may hear audio represented by both audio element 438 and audio element 440 according to a function F(x) when position 416 of listener 410 is between snap position $x_1$ 439 and snap position $x_2$ 441 (w=F(x) when $x_1$<x<$x_2$, e.g., both the first audio source distance is greater than the first audio source distance threshold and the second audio source distance is greater than the second audio source distance threshold). For example, a device may adaptively mix audio represented by both audio element 438 and audio element 440 according to F(x) or interpolate a third audio stream based on the audio represented by audio element 438 and audio element 440 and F(x) when position 416 of listener 410 is between snap position $x_1$ 439 and snap position $x_2$ 441 (in the soft snapping region). Listener 410 may snap to location B and hear audio represented by audio element 440 at location B when position 416 of listener 410 is between location B and snap position $x_2$ 441 (w=B when $x_2$≤x≤B, e.g., the second audio source distance is less than or equal to the second audio source distance threshold). As with hard snapping, visual or auditory alerts may be presented to listener 410. In some examples, visual or auditory alerts may be presented when snapping occurs and when position 416 of listener 410 enters the area between snap position $x_1$ and snap position $x_2$. For example, the audio source w is at location A (e.g., audio element 438) when position 416 of listener 410 is between location A and snap position $x_1$. In some examples, crossfading may be presented and be dependent on both time and the listener's motion.

Figure 5C:
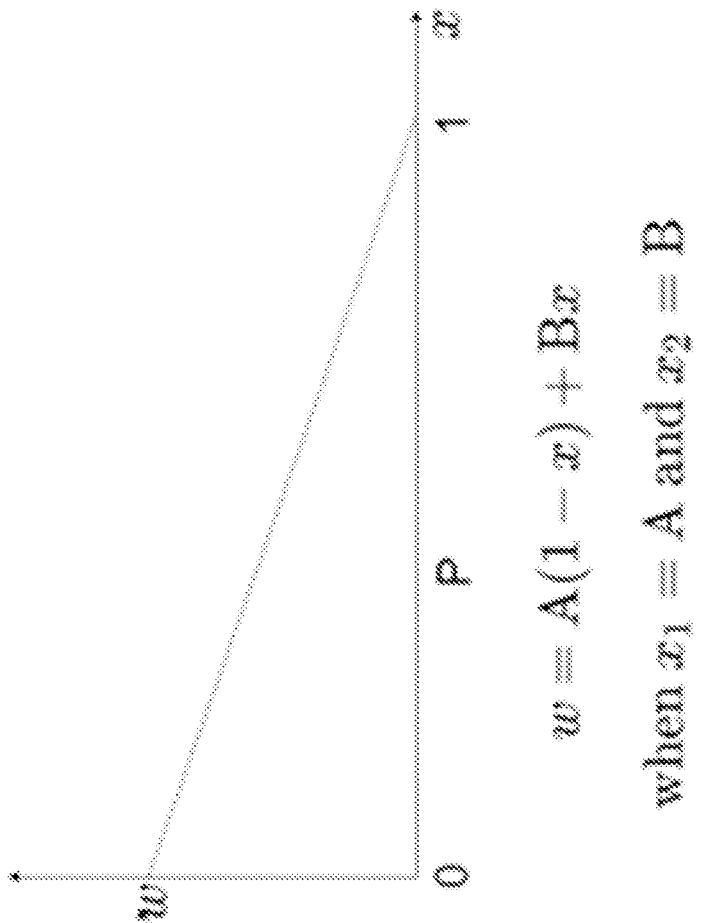

FIG. 5C is a conceptual diagram of another example of soft snapping. In the example of FIG. 5C, the threshold region between position $x_1$ and position $x_2$ is extended to the entire region between location A and location B. In this example, listener 410 may hear only audio from location A when position 416 of listener 410 is at location A, may hear a mix of audio from location A and location B when position 416 of listener 410 is between location A and location B, and hear audio only from location B when position 416 of listener 410 is at position B.

The above-mentioned examples (FIGS. 5A-5C) may be position dependent snapping. In other examples, snapping may not be position dependent. For example, listener 410 may snap to a location through a user interface (such as that of FIG. 4C), rather than through moving position 416 of listener 410.

Figure 5D:
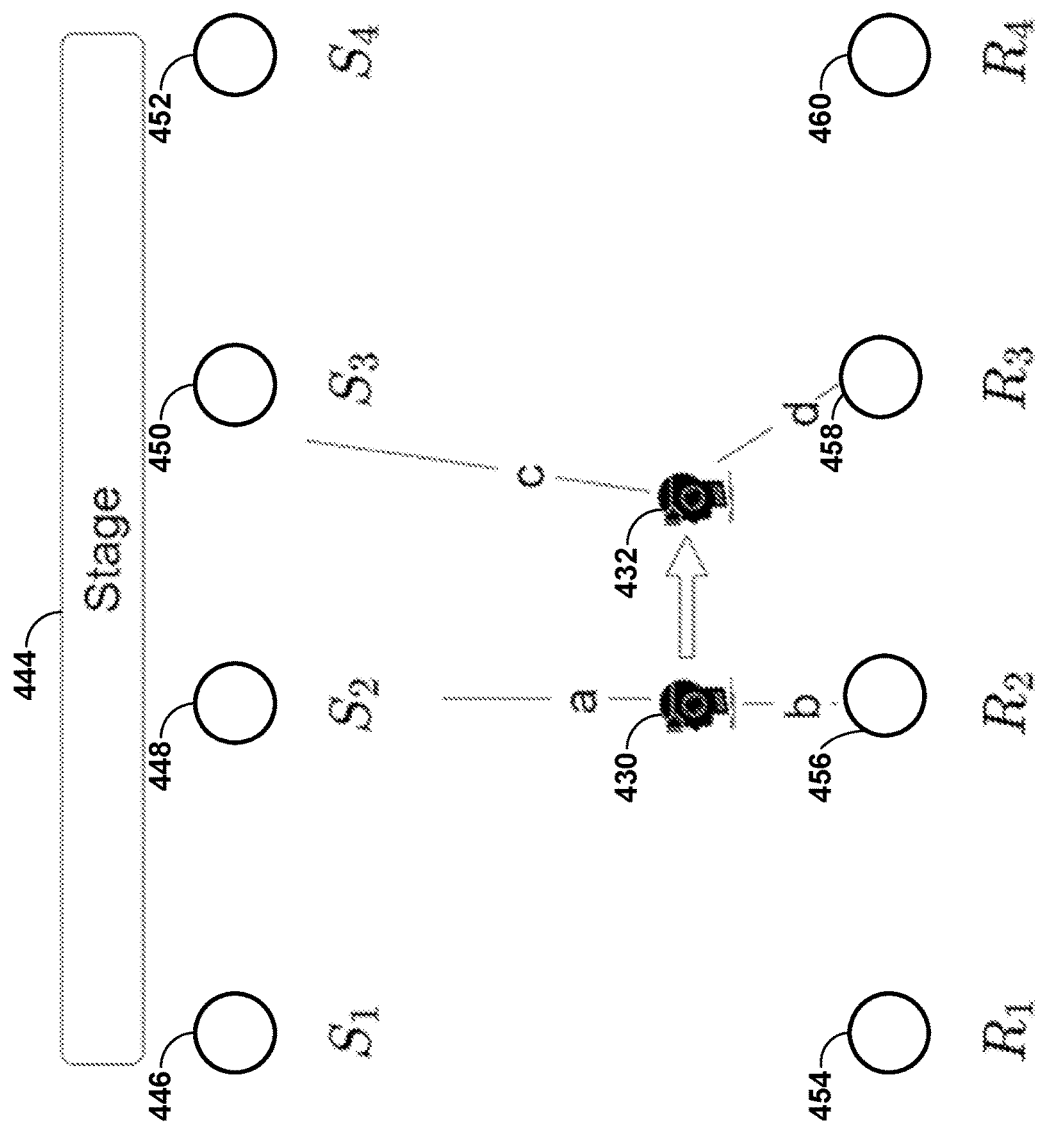

FIG. 5D is a conceptual diagram illustrating an example with three or more audio elements. FIG. 5D depicts a concert layout. In this example, a listener may want to snap to audio elements which are farther away from a position of the listener as they move between multiple audio elements ($S_1$ 446, $S_2$ 448, $S_3$ 450, $S_4$ 452) near the stage and audio elements ($R_1$ 454, $R_2$ 456, $R_3$ 458, $R_4$ 460) away from the stage.

For example, if listener wants to hear the performers close up (e.g., near stage 444), but wants to see more of the stage (e.g., a wider view than a location closer to the stage) such that position 430 of the listener which is further away from the stage, then the listener may bias the audio source distance threshold of the snapping towards stage audio element $S_2$ 448 instead of closest audio element $R_2$ 456 (distance a>distance b). In some examples, with this bias towards the stage audio elements, the listener stays snapped to $S_2$ 448 as they move towards position 432. At position 432 the listener may snap to audio element $S_3$ 450 because the listener's distance (c) to audio element $S_3$ 450 is less than the listener's distance (d) to audio element $S_2$ 448. Without the bias, the listener would have snapped to audio elements $R_2$ 456 and $R_3$ 458 as the listener moved from position 430 to position 432.

Figure 6:
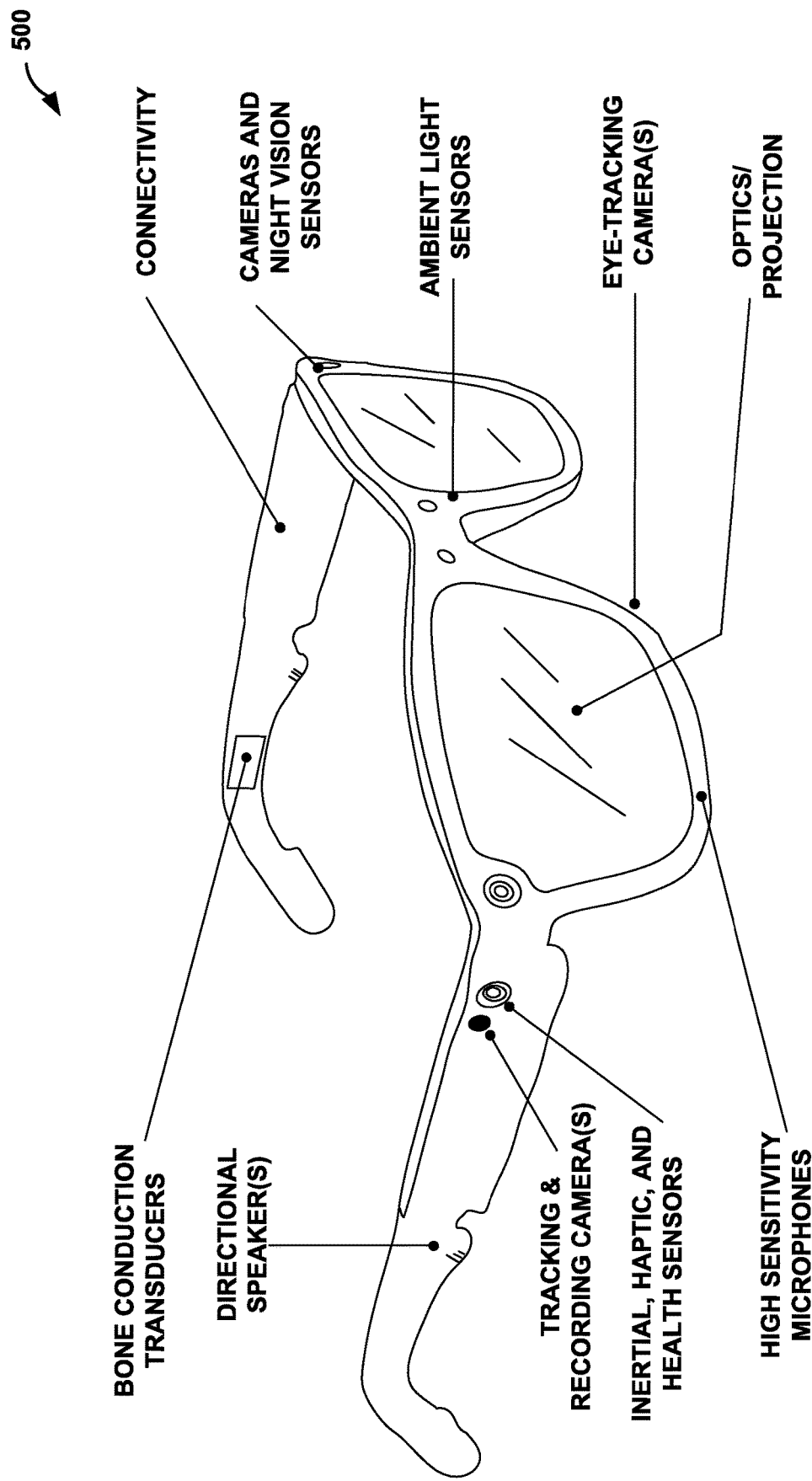
FIG. 6 is a diagram illustrating an example of a wearable device that may operate in accordance with various aspect of the techniques described in this disclosure.

FIG. 6 is a diagram illustrating an example of a wearable device 500 that may operate in accordance with various aspect of the techniques described in this disclosure. In various examples, the wearable device 500 may represent a VR headset (such as the VR device 400 described above), an AR headset, an MR headset, or any other type of extended reality (XR) headset. Augmented Reality "AR" may refer to computer rendered image or data that is overlaid over the real world where the user is actually located. Mixed Reality "MR" may refer to computer rendered image or data that is world locked to a particular location in the real world, or may refer to a variant on VR in which part computer rendered 3D elements and part photographed real elements are combined into an immersive experience that simulates the user's physical presence in the environment. Extended Reality "XR" may represent a catchall term for VR, AR, and MR. More information regarding terminology for XR can be found in a document by Jason Peterson, entitled "Virtual Reality, Augmented Reality, and Mixed Reality Definitions," and dated Jul. 7, 2017.

The wearable device 500 may represent other types of devices, such as a watch (including so-called "smart watches"), glasses (including so-called "smart glasses"), headphones (including so-called "wireless headphones" and "smart headphones"), smart clothing, smart jewelry, and the like. Whether representative of a VR device, a watch, glasses, and/or headphones, the wearable device 500 may communicate with the computing device supporting the wearable device 500 via a wired connection or a wireless connection.

In some instances, the computing device supporting the wearable device 500 may be integrated within the wearable device 500 and as such, the wearable device 500 may be considered as the same device as the computing device supporting the wearable device 500. In other instances, the wearable device 500 may communicate with a separate computing device that may support the wearable device 500. In this respect, the term "supporting" should not be understood to require a separate dedicated device but that one or more processors configured to perform various aspects of the techniques described in this disclosure may be integrated within the wearable device 500 or integrated within a computing device separate from the wearable device 500.

For example, when the wearable device 500 represents the VR device 400, a separate dedicated computing device (such as a personal computer including the one or more processors) may render the audio and visual content, while the wearable device 500 may determine the translational head movement upon which the dedicated computing device may render, based on the translational head movement, the audio content (as the speaker feeds) in accordance with various aspects of the techniques described in this disclosure. As another example, when the wearable device 500 represents smart glasses, the wearable device 500 may include the one or more processors that both determine the translational head movement (by interfacing within one or more sensors of the wearable device 500) and render, based on the determined translational head movement, the speaker feeds.

As shown, the wearable device 500 includes one or more directional speakers, and one or more tracking and/or recording cameras. In addition, the wearable device 500 includes one or more inertial, haptic, and/or health sensors, one or more eye-tracking cameras, one or more high sensitivity audio microphones, and optics/projection hardware. The optics/projection hardware of the wearable device 500 may include durable semi-transparent display technology and hardware.

The wearable device 500 also includes connectivity hardware, which may represent one or more network interfaces that support multimode connectivity, such as 4G communications, 5G communications, Bluetooth, Wi-Fi, etc. The wearable device 500 also includes one or more ambient light sensors, one or more cameras and night vision sensors, and one or more bone conduction transducers. In some instances, the wearable device 500 may also include one or more passive and/or active cameras with fisheye lenses and/or telephoto lenses. Although not shown in FIG. 6, the wearable device 500 also may include one or more light emitting diode (LED) lights. In some examples, the LED light(s) may be referred to as "ultra bright" LED light(s). The wearable device 500 also may include one or more rear cameras in some implementations. It will be appreciated that the wearable device 500 may exhibit a variety of different form factors.

Furthermore, the tracking and recording cameras and other sensors may facilitate the determination of translational distance. Although not shown in the example of FIG. 6, wearable device 500 may include other types of sensors for detecting translational distance.

Although described with respect to particular examples of wearable devices, such as the VR device 400 discussed above with respect to the examples of FIG. 6 and other devices set forth in the examples of FIGS. 1A and 1B, a person of ordinary skill in the art would appreciate that descriptions related to FIGS. 1A, 1B, and 2 may apply to other examples of wearable devices. For example, other wearable devices, such as smart glasses, may include sensors by which to obtain translational head movements. As another example, other wearable devices, such as a smart watch, may include sensors by which to obtain translational movements. As such, the techniques described in this disclosure should not be limited to a particular type of wearable device, but any wearable device may be configured to perform the techniques described in this disclosure.

Figure 7A:
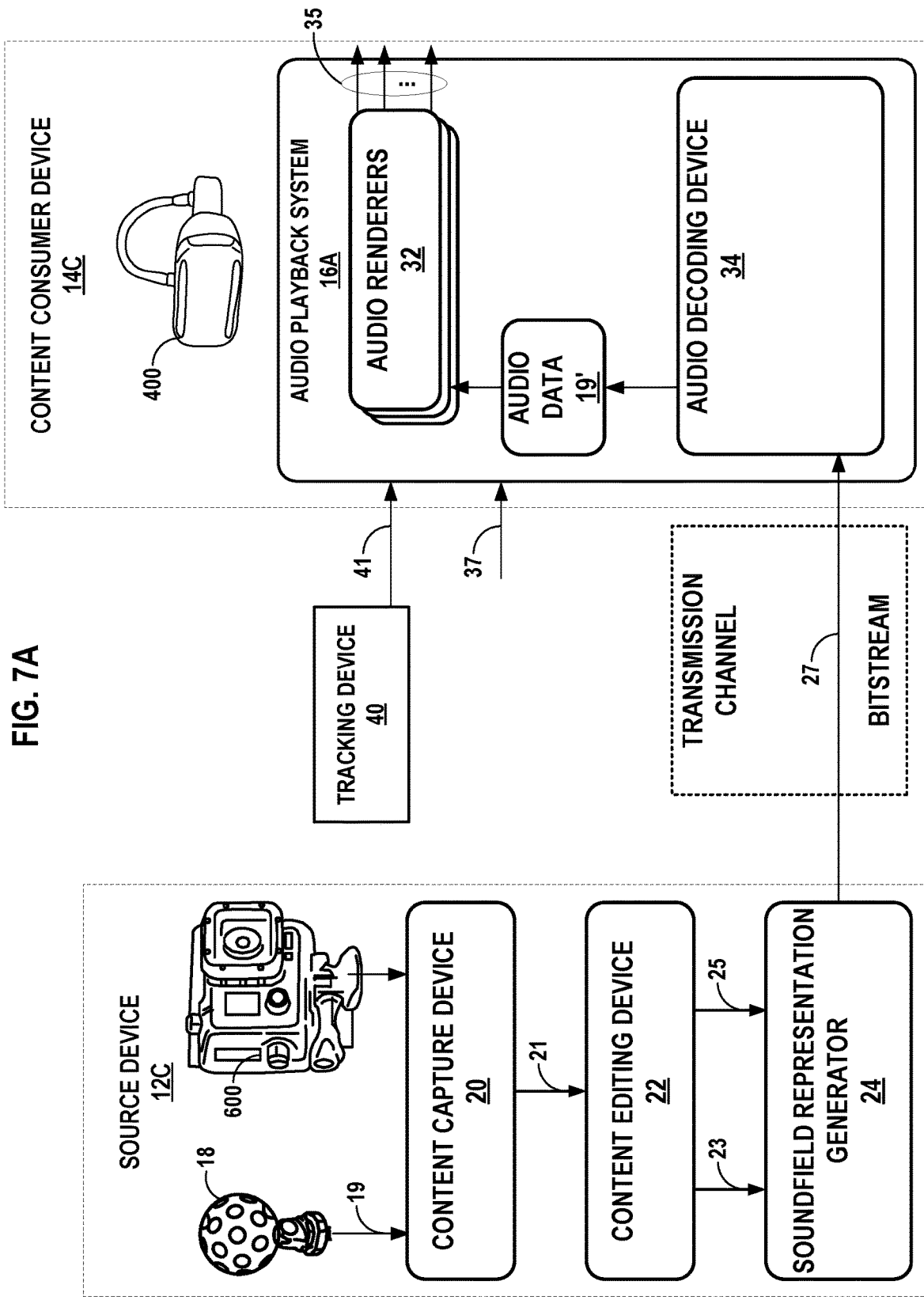
FIGS. 7A and 7B are diagrams illustrating other example systems that may perform various aspects of the techniques described in this disclosure.
Figure 7B:
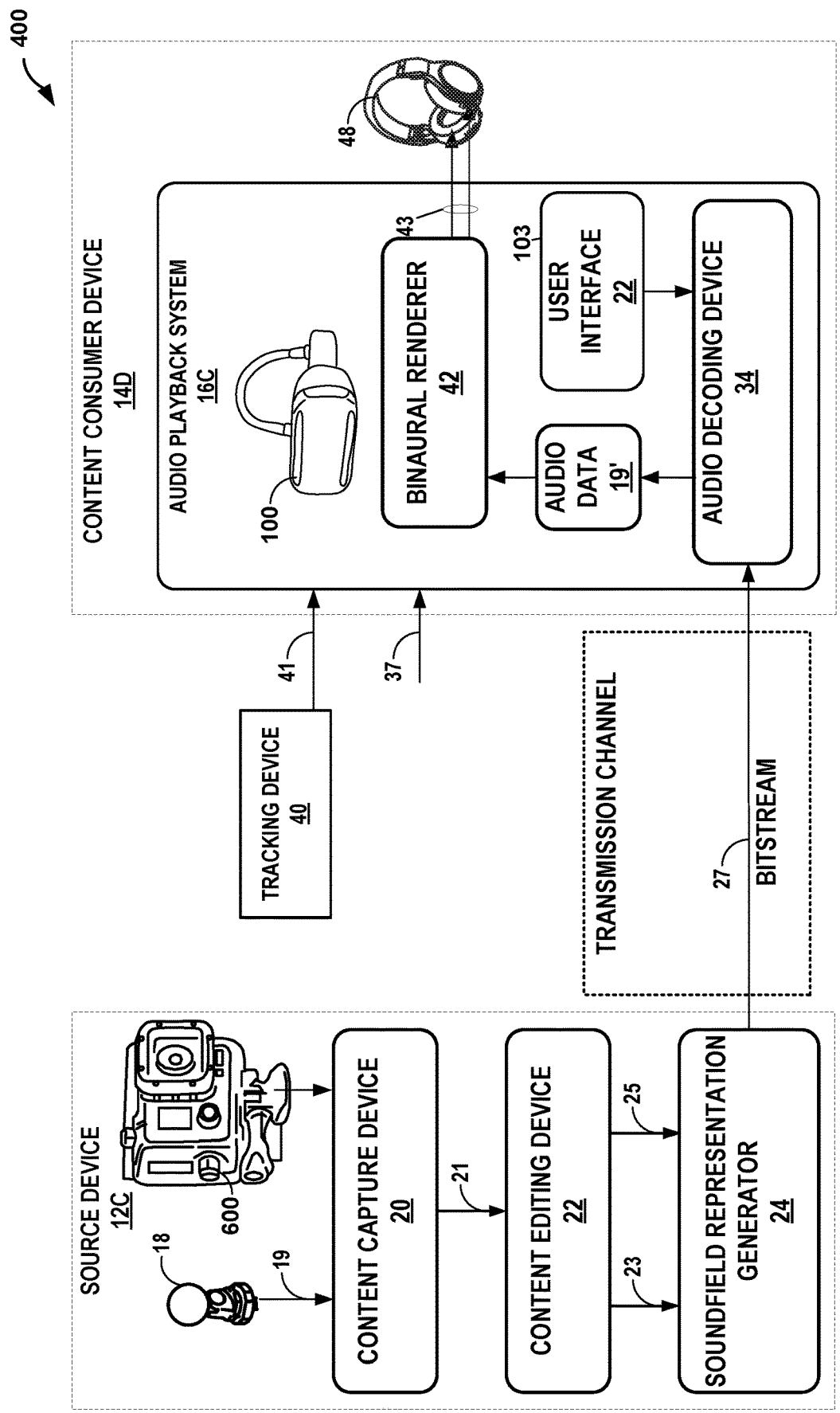

FIGS. 7A and 7B are diagrams illustrating example systems that may perform various aspects of the techniques described in this disclosure. FIG. 7A illustrates an example in which the source device 12C further includes a camera 600. The camera 600 may be configured to capture video data, and provide the captured raw video data to the content capture device 20. The content capture device 20 may provide the video data to another component of the source device 12C, for further processing into viewport-divided portions.

In the example of FIG. 7A, the content consumer device 14C also includes the VR device 400. It will be understood that, in various implementations, the VR device 400 may be included in, or externally coupled to, the content consumer device 14C. The VR device 400 includes display hardware and speaker hardware for outputting video data (e.g., as associated with various viewports) and for rendering audio data.

FIG. 7B illustrates an example in which the audio renderers 32 shown in FIG. 7A are replaced with a binaural renderer 42 capable of performing binaural rendering using one or more HRTFs or the other functions capable of rendering to left and right speaker feeds 43. The audio playback system 16C of content consumer device 14D may output the left and right speaker feeds 43 to headphones 48.

The headphones 48 may couple to the audio playback system 16C via a wired connection (such as a standard 3.5 mm audio jack, a universal system bus (USB) connection, an optical audio jack, or other forms of wired connection) or wirelessly (such as by way of a Bluetooth™ connection, a wireless network connection, and the like). The headphones 48 may recreate, based on the left and right speaker feeds 43, the soundfield represented by the audio data 19'. The headphones 48 may include a left headphone speaker and a right headphone speaker which are powered (or, in other words, driven) by the corresponding left and right speaker feeds 43.

Figure 8:
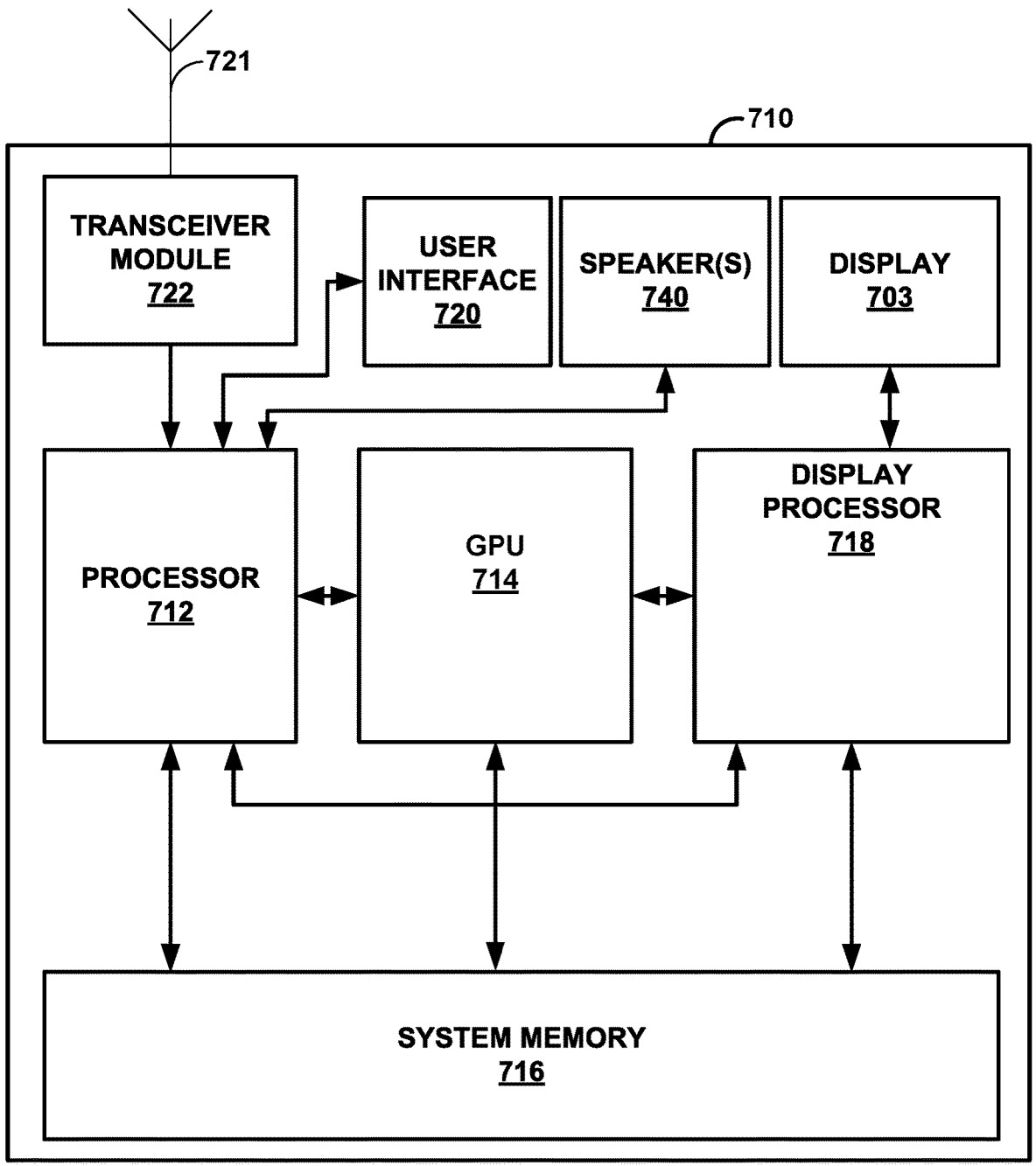
FIG. 8 is a block diagram illustrating example components of one or more of the source device and the content consumer device shown in the example of FIG. 1.

FIG. 8 is a block diagram illustrating example components of one or more of the source device and the content consumer device shown in the examples of FIGS. 1A-1C. In the example of FIG. 8, the device 710 includes a processor 712 (which may be referred to as "one or more processors" or "processor(s)"), a graphics processing unit (GPU) 714, system memory 716, a display processor 718, one or more integrated speakers 740, a display 703, a user interface 720, antenna 721, and a transceiver module 722. In examples where the device 710 is a mobile device, the display processor 718 is a mobile display processor (MDP). In some examples, such as examples where the device 710 is a mobile device, the processor 712, the GPU 714, and the display processor 718 may be formed as an integrated circuit (IC).

For example, the IC may be considered as a processing chip within a chip package and may be a system-on-chip (SoC). In some examples, two of the processors 712, the GPU 714, and the display processor 718 may be housed together in the same IC and the other in a different integrated circuit (e.g., different chip packages) or all three may be housed in different ICs or on the same IC. However, it may be possible that the processor 712, the GPU 714, and the display processor 718 are all housed in different integrated circuits in examples where the device 710 is a mobile device.

Examples of the processor 712, the GPU 714, and the display processor 718 include, but are not limited to, one or more digital signal processors (DSPs), general purpose microprocessors, application specific integrated circuits (ASICs), field programmable logic arrays (FPGAs), or other equivalent integrated or discrete logic circuitry. The processor 712 may be the central processing unit (CPU) of the device 710. In some examples, the GPU 714 may be specialized hardware that includes integrated and/or discrete logic circuitry that provides the GPU 714 with massive parallel processing capabilities suitable for graphics processing. In some instances, GPU 714 may also include general purpose processing capabilities, and may be referred to as a general-purpose GPU (GPGPU) when implementing general purpose processing tasks (e.g., non-graphics related tasks). The display processor 718 may also be specialized integrated circuit hardware that is designed to retrieve image content from the system memory 716, compose the image content into an image frame, and output the image frame to the display 703.

The processor 712 may execute various types of the applications. Examples of the applications include web browsers, e-mail applications, spreadsheets, video games, other applications that generate viewable objects for display, or any of the application types listed in more detail above. The system memory 716 may store instructions for execution of the applications. The execution of one of the applications on the processor 712 causes the processor 712 to produce graphics data for image content that is to be displayed and the audio data 19 that is to be played (possibly via integrated speaker 740). The processor 712 may transmit graphics data of the image content to the GPU 714 for further processing based on and instructions or commands that the processor 712 transmits to the GPU 714.

The processor 712 may communicate with the GPU 714 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and the processor 712 and the GPU 714 may utilize any process for communication.

The system memory 716 may be the memory for the device 710. The system memory 716 may include one or more computer-readable storage media. Examples of the system memory 716 include, but are not limited to, a random-access memory (RAM), an electrically erasable programmable read-only memory (EEPROM), flash memory, or other medium that can be used to carry or store desired program code in the form of instructions and/or data structures and that can be accessed by a computer or a processor.

In some examples, the system memory 716 may include instructions that cause the processor 712, the GPU 714, and/or the display processor 718 to perform the functions ascribed in this disclosure to the processor 712, the GPU 714, and/or the display processor 718. Accordingly, the system memory 716 may be a computer-readable storage medium having instructions stored thereon that, when executed, cause one or more processors (e.g., the processor 712, the GPU 714, and/or the display processor 718) to perform various functions.

The system memory 716 may include a non-transitory storage medium. The term "non-transitory" indicates that the storage medium is not embodied in a carrier wave or a propagated signal. However, the term "non-transitory" should not be interpreted to mean that the system memory 716 is non-movable or that its contents are static. As one example, the system memory 716 may be removed from the device 710 and moved to another device. As another example, memory, substantially similar to the system memory 716, may be inserted into the device 710. In certain examples, a non-transitory storage medium may store data that can, over time, change (e.g., in RAM).

The user interface 720 may represent one or more hardware or virtual (meaning a combination of hardware and software) user interfaces by which a user may interface with the device 710. The user interface 720 may include physical buttons, switches, toggles, lights or virtual versions thereof. The user interface 720 may also include physical or virtual keyboards, touch interfaces—such as a touchscreen, haptic feedback, and the like.

The processor 712 may include one or more hardware units (including so-called "processing cores") configured to perform all or some portion of the operations discussed above with respect to one or more of any of the modules, units or other functional components of the content creator device and/or the content consumer device. The antenna 721 and the transceiver module 722 may represent a unit configured to establish and maintain the connection between the source device 12 and the content consumer device 14. The antenna 721 and the transceiver module 722 may represent one or more receivers and/or one or more transmitters capable of wireless communication in accordance with one or more wireless communication protocols, such as a fifth generation (5G) cellular standard, a person area network (PAN) protocol, such as Bluetooth™, a local area network standard, such as Wi-Fi, or other open-source, proprietary, or other communication standard. For example, the transceiver module 722 may receive and/or transmit a wireless signal. The transceiver module 722 may represent a separate transmitter, a separate receiver, both a separate transmitter and a separate receiver, or a combined transmitter and receiver. The antenna 721 and the transceiver module 722 may be configured to receive encoded audio data. Likewise, the antenna 721 and the transceiver module 722 may be configured to transmit encoded audio data.

Figure 9:
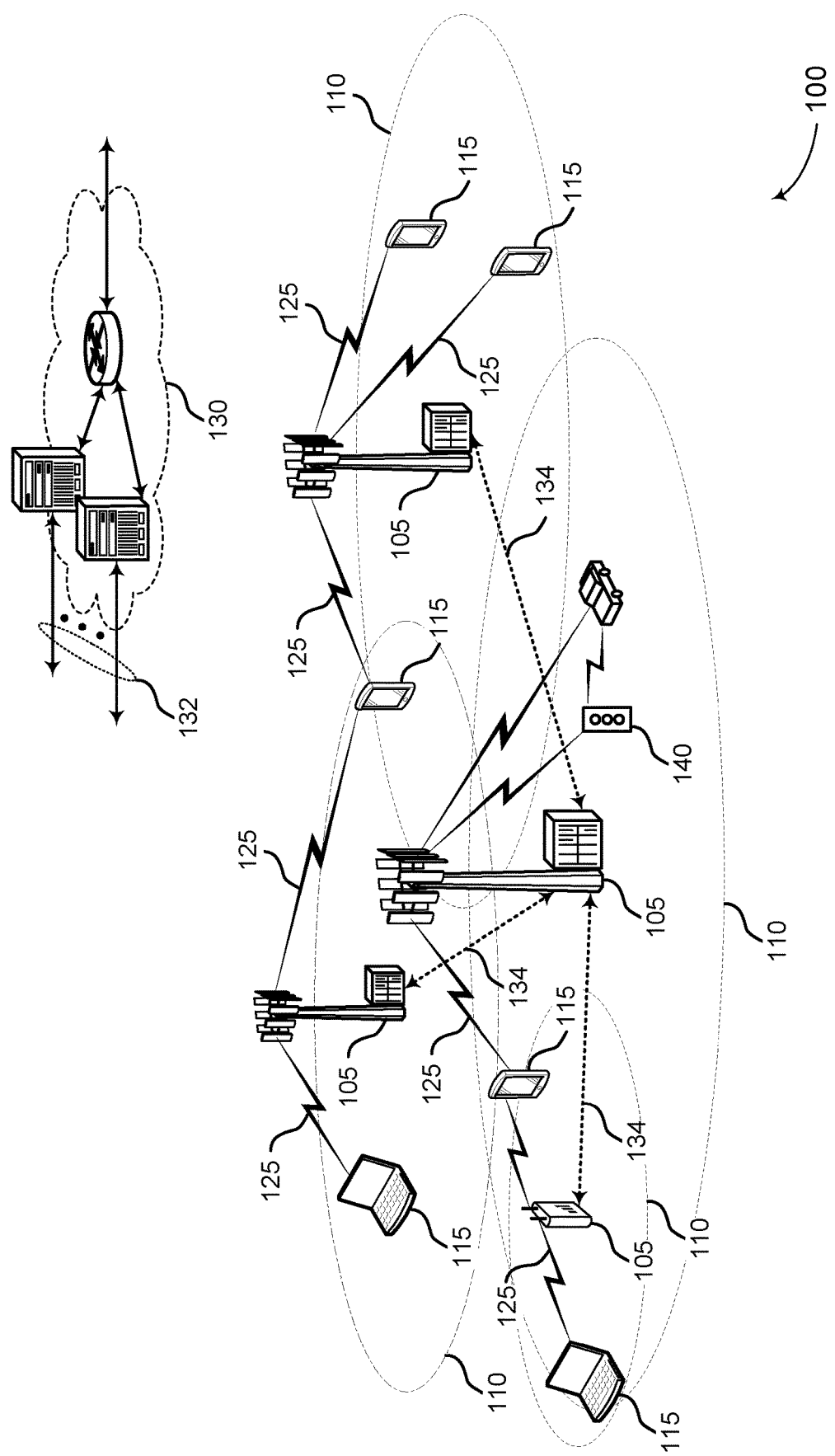
FIG. 9 illustrates an example of a wireless communications system in accordance with aspects of the present disclosure.

FIG. 9 illustrates an example of a wireless communications system 100 in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 are supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In examples of this disclosure, a UE 115 may be any of the audio sources described in this disclosure, including a VR headset, an XR headset, an AR headset, a vehicle, a smartphone, a microphone, an array of microphones, or any other device including a microphone or is able to transmit a captured and/or synthesized audio stream. In some examples, an synthesized audio stream may be an audio stream that was stored in memory or was previously created or synthesized. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that exchange and/or use audio metadata indicating privacy restrictions and/or password-based privacy data to toggle, mask, and/or null various audio streams and/or audio sources.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz Industrial, Scientific, Medical (ISM) band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

The present disclosure includes the following examples.

Example 1A. A device configured to play one or more of a plurality of audio streams, the device comprising: a memory configured to store the plurality of audio streams and corresponding audio metadata, each of the audio streams representative of a soundfield, and the audio metadata includes capture location information representative of capture coordinates in a displayed world at which the corresponding one of the plurality of audio streams was captured; and one or more processors coupled to the memory, and configured to: determine location information representative of a device coordinates of the device in the displayed world; select, based on the location information and the capture location information, a subset of the plurality of audio streams, the subset of the plurality of audio streams excluding at least one of the plurality of audio streams; and output, based on the subset of the plurality of audio streams, one or more speaker feeds.

Example 2A. The device of example 1A, wherein the one or more processors are configured to: determine a proximity distance based on the location information and the capture location information included in the metadata for at least one of the plurality of audio streams; and select, based on the proximity distance, the subset of the plurality of audio streams.

Example 3A. The device of any combination of examples 1A and 2A, wherein the one or more processors are configured to: determine a proximity distance between the device coordinates of the device in the displayed world represented by the location information and each of the capture coordinates represented by the capture location information to obtain a plurality of proximity distances; and select, based on the plurality of proximity distances, the subset of the plurality of audio streams.

Example 4A. The device of any combination of examples 2A and 3A, wherein the one or more processors are configured to: compare the proximity distance to a threshold proximity distance; and select, when the proximity distance is less than or equal to a threshold proximity distance, a larger number of the plurality of audio streams compared to when the proximity distance is greater than the threshold proximity distance to obtain the subset of the plurality of audio streams.

Example 5A. The device of any combination of examples 2A and 3A, wherein the one or more processors are configured to: compare the proximity distance to a threshold proximity distance; and select, when the proximity distance is greater than a threshold proximity distance, a smaller number of the plurality of audio streams compared to when the proximity distance is less than or equal to the threshold proximity distance to obtain the subset of the plurality of audio streams.

Example 6A. The device of any combination of examples 1A-5A, wherein the one or more processors are further configured to: obtain a new audio stream and corresponding new audio metadata, the new audio metadata including capture location information representative of a capture coordinates in a displayed world at which the new audio streams is captured; and update the plurality of audio streams to include the new audio stream.

Example 7A. The device of any combination of examples 1A-6A, wherein the one or more processors are configured to: determine, based on the plurality of audio streams, an energy map representative of an energy of a common soundfield represented by the plurality of audio streams; and determine, based on the energy map, the virtual location information and the capture location information, the subset of the plurality of audio streams.

Example 8A. The device of example 7A, wherein the one or more processors are configured to: analyze the energy map to determine audio stream coordinates of an audio source in the common soundfield; and determine, based on the audio source location, the location information and the capture location information, a subset of the plurality of audio streams.

Example 9A. The device of example 8A, wherein the one or more processors are configured to: determine an audio source distance as a distance between the audio stream coordinates and the device coordinates of the device; compare the audio source distance to an audio source distance threshold; and select, when the audio source distance is greater than the audio source distance threshold, a single audio stream of the plurality of audio streams as the subset of the plurality of audio streams, the single audio stream being the one of the plurality of audio streams having the closest capture location to the virtual location of the device.

Example 10A. The device of example 8A, wherein the one or more processors are configured to: determine an audio source distance as a distance between the audio stream coordinates and the device coordinates of the device; compare the audio source distance to an audio source distance threshold; and select, when the audio source distance is less than or equal to the audio source distance threshold, multiple audio streams of the plurality of audio streams as the subset of the plurality of audio streams, the multiple audio streams being the subset of the plurality of audio streams with the respective capture locations surrounding the virtual location of the device.

Example 11A. The device of any combination of examples 1A-10A, wherein the device comprises an extended reality headset, and wherein the displayed world comprises a scene represented by video data captured by a camera.

Example 12A. The device of any combination of example 1A-10A, wherein the device comprises an extended reality headset, and wherein the displayed world comprises a virtual world.

Example 13A. The device of any combination of examples 1A-12A, further comprising a head-mounted display configured to present the displayed world.

Example 14A. The device of any combination of examples 1A-12A, wherein the device comprises a mobile handset.

Example 15A. The device of any combination of examples 1A-14A, further comprising a receiver configured to receive the plurality of audio streams.

Example 16A. The device of example 15A, wherein the receiver includes a receiver configured to receive the plurality of audio streams in accordance with a fifth generation (5G) cellular standard.

Example 17A. The device of example 15A, wherein the receiver includes a receiver configured to receive the plurality of audio streams in accordance with a personal area network standard.

Example 18A. The device of any combination of examples 1A-17A, wherein the device comprises one or more speakers configured to reproduce, based on the speaker feeds, one or more of the soundfields represented by the subset of the audio streams.

Example 19A. A method of playing one or more of a plurality of audio streams, the method comprising: storing, by a memory, the plurality of audio streams and corresponding audio metadata, each of the audio streams representative of a soundfield, and the audio metadata includes capture location information representative of a capture location in a displayed world at which the corresponding one of the plurality of audio streams was captured; and determining, by one or more processors, virtual location information representative of a virtual location of the device in the displayed world; selecting, by the one or more processors and based on the virtual location information and the capture location information, a subset of the plurality of audio streams, the subset of the plurality of audio streams excluding at least one of the plurality of audio streams; and reproducing, by the one or more processors and based on the subset of the plurality of audio streams, the corresponding soundfields.

Example 20A. The method of example 19A, wherein selecting the subset of the plurality of audio streams comprises: determining a proximity distance based on the location information and the capture location information included in the metadata for at least one of the plurality of audio streams; and selecting, based on the proximity distance, the subset of the plurality of audio streams.

Example 21A. The method of any combination of examples 19A and 20A, wherein selecting the subset of the plurality of audio streams comprises: determining a proximity distance between the device coordinates of the device in the displayed world represented by the location information and each of the capture coordinates represented by the capture location information to obtain a plurality of proximity distances; and selecting, based on the plurality of proximity distances, the subset of the plurality of audio streams.

Example 22A. The method of any combination of examples 20A and 21A, wherein selecting the subset of the plurality of audio streams comprises: comparing the proximity distance to a threshold proximity distance; and selecting, when the proximity distance is less than or equal to a threshold proximity distance, a larger number of the plurality of audio streams compared to when the proximity distance is greater than the threshold proximity distance to obtain the subset of the plurality of audio streams.

Example 23A. The method of any combination of examples 20A and 21A, wherein selecting the subset of the plurality of audio streams comprises: comparing the proximity distance to a threshold proximity distance; and selecting, when the proximity distance is greater than a threshold proximity distance, a smaller number of the plurality of audio streams compared to when the proximity distance is less than or equal to the threshold proximity distance to obtain the subset of the plurality of audio streams.

Example 24A. The method of any combination of examples 19A-23A, further comprising: obtaining a new audio stream and corresponding new audio metadata, the new audio metadata including capture location information representative of a capture coordinates in a displayed world at which the new audio streams is captured; and updating the plurality of audio streams to include the new audio stream.

Example 25A. The method of any combination of examples 19A-24A, wherein determining the virtual location information comprises: determining, based on the plurality of audio streams, an energy map representative of an energy of a common soundfield represented by the plurality of audio streams; and determining, based on the energy map, the virtual location information and the capture location information, a subset of the plurality of audio streams.

Example 26A. The method of example 25A, wherein selecting the subset of the plurality of audio streams comprises: analyzing the energy map to determine audio stream coordinates of an audio source in the common soundfield; and determining, based on the audio source location, the location information and the capture location information, the subset of the plurality of audio streams.

Example 27A. The method of example 26A, wherein selecting the subset of the plurality of audio streams comprises: determining an audio source distance as a distance between the audio stream coordinates and the device coordinates of the device; comparing the audio source distance to an audio source distance threshold; and selecting, when the audio source distance is greater than the audio source distance threshold, a single audio stream of the plurality of audio streams as the subset of the plurality of audio streams, the single audio stream being the one of the plurality of audio streams having the closest capture location to the virtual location of the device.

Example 28A. The method of example 26A, wherein selecting the subset of the plurality of audio streams comprises: determining an audio source distance as a distance between the audio stream coordinates and the device coordinates of the device; comparing the audio source distance to an audio source distance threshold; and selecting, when the audio source distance is less than or equal to the audio source distance threshold, multiple audio streams of the plurality of audio streams as the subset of the plurality of audio streams, the multiple audio streams being the subset of the plurality of audio streams with the respective capture locations surrounding the virtual location of the device.

Example 29A. The method of any combination of examples 19A-28A, wherein the method is performed by an extended reality headset, and wherein the displayed world comprises a scene represented by video data captured by a camera.

Example 30A. The method of any combination of example 19A-28A, wherein the method is performed by an extended reality headset, and wherein the displayed world comprises a virtual world.

Example 31A. The method of any combination of examples 19A-30A, further comprising present, via a head mounted display, the displayed world.

Example 32A. The method of any combination of examples 19A-30A, wherein the one or more processors are included in a mobile handset.

Example 33A. The method of any combination of examples 19A-32A, further comprising receiving the plurality of audio streams.

Example 34A. The method of example 33A, wherein receiving the plurality of audio streams comprises receiving the plurality of audio streams in accordance with a fifth generation (23G) cellular standard.

Example 35A. The method of example 33A, wherein receiving the plurality of audio streams comprises receiving the plurality of audio streams in accordance with a personal area network standard.

Example 36A. The method of any combination of examples 19A-35A, further comprising reproducing, based on the speaker feeds, one or more of the soundfields represented by the subset of the audio streams.

Example 37A. A device configured to play one or more of a plurality of audio streams, the device comprising: means for storing the plurality of audio streams and corresponding audio metadata, each of the audio streams representative of a soundfield, and the audio metadata includes capture location information representative of a capture location in a displayed world at which the corresponding one of the plurality of audio streams was captured; and means for determining virtual location information representative of a virtual location of the device in the displayed world; means for selecting, based on the virtual location information and the capture location information, a subset of the plurality of audio streams, the subset of the plurality of audio streams excluding at least one of the plurality of audio streams; and means for reproducing, based on the subset of the plurality of audio streams, the corresponding soundfields.

Example 38A. The device of example 37A, wherein the means for selecting the subset of the plurality of audio streams comprises: means for determining a proximity distance based on the location information and the capture location information included in the metadata for at least one of the plurality of audio streams; and means for selecting, based on the proximity distance, the subset of the plurality of audio streams.

Example 39A. The device of any combination of examples 37A and 38A, wherein the means for selecting the subset of the plurality of audio streams comprises: means for determining a proximity distance between the device coordinates of the device in the displayed world represented by the location information and each of the capture coordinates represented by the capture location information to obtain a plurality of proximity distances; and means for selecting, based on the plurality of proximity distances, the subset of the plurality of audio streams.

Example 40A. The device of any combination of examples 38A and 39A, wherein the means for selecting the subset of the plurality of audio streams comprises: means for comparing the proximity distance to a threshold proximity distance; and means for selecting, when the proximity distance is less than or equal to a threshold proximity distance, a larger number of the plurality of audio streams compared to when the proximity distance is greater than the threshold proximity distance to obtain the subset of the plurality of audio streams.

Example 41A. The device of any combination of examples 38A and 39A, wherein the means for selecting the subset of the plurality of audio streams comprises: means for comparing the proximity distance to a threshold proximity distance; and means for selecting, when the proximity distance is greater than a threshold proximity distance, a smaller number of the plurality of audio streams compared to when the proximity distance is less than or equal to than the threshold proximity distance to obtain the subset of the plurality of audio streams.

Example 42A. The device of any combination of examples 37A-41A, further comprising: means for obtaining a new audio stream and corresponding new audio metadata, the new audio metadata including capture location information representative of a capture coordinates in a displayed world at which the new audio streams is captured; and means for updating the plurality of audio streams to include the new audio stream.

Example 43A. The device of any combination of examples 37A-42A, wherein the means for determining the virtual location information comprises: means for determining, based on the plurality of audio streams, an energy map representative of an energy of a common soundfield represented by the plurality of audio streams; and means for determining, based on the energy map, the virtual location information and the capture location information, a subset of the plurality of audio streams.

Example 44. The device of example 43A, wherein the means for selecting the subset of the plurality of audio streams comprises: means for analyzing the energy map to determine audio stream coordinates of an audio source in the common soundfield; and means for determining, based on the audio source location, the location information and the capture location information, the subset of the plurality of audio streams.

Example 45A. The device of example 44, wherein the means for selecting the subset of the plurality of audio streams comprises: means for determining an audio source distance as a distance between the audio stream coordinates and the device coordinates of the device; means for comparing the audio source distance to an audio source distance threshold; and means for selecting, when the audio source distance is greater than the audio source distance threshold, a single audio stream of the plurality of audio streams as the subset of the plurality of audio streams, the single audio stream being the one of the plurality of audio streams having the closest capture location to the virtual location of the device.

Example 46A. The device of example 44, wherein the means for selecting the subset of the plurality of audio streams comprises: means for determining an audio source distance as a distance between the audio stream coordinates and the device coordinates of the device; means for comparing the audio source distance to an audio source distance threshold; and means for selecting, when the audio source distance is less than or equal to the audio source distance threshold, multiple audio streams of the plurality of audio streams as the subset of the plurality of audio streams, the multiple audio streams being the subset of the plurality of audio streams with the respective capture locations surrounding the virtual location of the device.

Example 47A. The device of any combination of examples 37A-46A, wherein the device comprises an extended reality headset, and wherein the displayed world comprises a scene represented by video data captured by a camera.

Example 48A. The device of any combination of example 37A-46A, wherein the device comprises an extended reality headset, and wherein the displayed world comprises a virtual world.

Example 49A. The device of any combination of examples 37A-48A, further comprising means for presenting the displayed world.

Example 50A. The device of any combination of examples 37A-48A, wherein the device comprises a mobile handset.

Example 51A. The device of any combination of examples 37A-50A, further comprising means for receiving the plurality of audio streams.

Example 52A. The device of example 51A, wherein the means for receiving the plurality of audio streams comprises means for receiving the plurality of audio streams in accordance with a fifth generation (5G) cellular standard.

Example 53A. The device of example 51A, wherein the means for receiving the plurality of audio streams comprises means for receiving the plurality of audio streams in accordance with a personal area network standard.

Example 54A. The device of any combination of examples 37A-53A, further comprising means for reproducing, based on the speaker feeds, one or more of the soundfields represented by the subset of the audio streams.

Example 55A. A non-transitory computer-readable storage medium having stored thereon instructions that, when executed, cause one or more processors to: store the plurality of audio streams and corresponding audio metadata, each of the audio streams representative of a soundfield, and the audio metadata includes capture location information representative of a capture location in a displayed world at which the corresponding one of the plurality of audio streams was captured; and interface with a head-mounted display to present the displayed world; determine virtual location information representative of a virtual location of the device in the displayed world; select, based on the virtual location information and the capture location information, a subset of the plurality of audio streams, the subset of the plurality of audio streams excluding at least one of the plurality of audio streams; and reproduce, based on the subset of the plurality of audio streams, the corresponding soundfields.

Example 1B. A device configured to play one or more of a plurality of audio streams, the device comprising: a memory configured to store the plurality of audio streams and corresponding audio metadata, each of the audio streams representative of a soundfield, and the audio metadata includes capture location information representative of capture coordinates in a displayed world at which the corresponding one of the plurality of audio streams was captured; and one or more processors coupled to the memory, and configured to: determine virtual location information representative of a device coordinates of the device in the displayed world; determine an audio source distance as a distance between the audio stream coordinates and the device coordinates of the device; compare the audio source distance to an audio source distance threshold; select, when the audio source distance is greater than the audio source distance threshold, a single audio stream of the plurality of audio streams; and output, based on the single audio stream, one or more speaker feeds.

Example 2B. The device of example 1B, wherein the audio source distance threshold is provided by a user.

Example 3B. The device of example 1B, wherein the audio source distance threshold is predetermined.

Example 4B. The device of example 1B, wherein the audio source distance threshold is received in a bitstream.

Example 5B. The device of any combination of examples 1B-4B, wherein the audio source distance is a first audio source distance, the audio stream coordinates are first audio stream coordinates, the audio source distance threshold is a first audio source distance threshold, and the single audio stream is a first single audio stream, and the one or more processors are further configured to: determine a second audio source distance as a distance between second audio stream coordinates and the device coordinates of the device; compare the second audio source distance to a second audio source distance threshold; select, when the audio source distance is between the first audio source distance threshold and the second audio source threshold, the first single audio stream of the plurality of audio streams and a second single audio stream of the plurality of audio streams; and output, based on the first single audio stream and the second single audio stream, one or more speaker feeds.

Example 6B. The device of example 5B, wherein the one or more processors are further configured to combine the first single audio stream and the second single audio stream.

Example 7B. The device of example 6B, wherein the one or more processors are configured to combine the first single audio stream and the second single audio stream by at least one of adaptive mixing the first single audio stream and the second single audio stream or interpolating a third audio stream based on the first single audio stream and the second single audio stream.

Example 8B. The device of example 6B or 7B, wherein the one or more processors is configured to combine the first single audio stream and the second single audio stream by applying a function F(x) to the first single audio stream and the second single audio stream.

Example 9B. The device of any combination of examples 6B-8B, wherein the one or more processors are further configured to: determine whether the virtual location information has been steady relative to the first audio source distance threshold and the second audio source distance threshold for a predetermined period of time; and based on the virtual location being steady relative to the first audio source distance threshold and the second audio source distance threshold for a predetermined period of time, select the first single audio stream, the first single audio stream and the second single audio stream, or the second single audio stream.

Example 10B. The device of example 5B, wherein the one or more processors are further configured to: select, when the second audio source distance is greater than the second audio source threshold, the second single audio stream of the plurality of audio streams; and output, based on the second single audio stream, one or more speaker feeds.

Example 11B. The device of any combination of examples 1B-10B, wherein the one or more processors are further configured to select a different audio stream based the virtual location information changing.

Example 12B. The device of any combination of examples 1B-4B, wherein the one or more processors are further configured to provide an alert to a user based on the virtual location information representative equaling the audio source distance threshold.

Example 13B. The device of example 12B, wherein the alert is at least one of a visual alert or an auditory alert.

Example 14B. The device of any combination of example 1B-13B, wherein the device comprises an extended reality headset, and wherein the displayed world comprises a virtual world.

Example 15B. The device of any combination of examples 1B-13B, further comprising a head-mounted display configured to present the displayed world and the graphical user interface.

Example 16B. The device of any combination of examples 1B-13B, wherein the device comprises a mobile handset.

Example 17B. The device of any combination of examples 1B-16B, further comprising a receiver configured to receive the plurality of audio streams.

Example 18B. The device of example 17B, wherein the receiver includes a receiver configured to receive the plurality of audio streams in accordance with a fifth generation (5G) cellular standard.

Example 19B. The device of example 17B, wherein the receiver includes a receiver configured to receive the plurality of audio streams in accordance with a personal area network standard.

Example 20B. A method comprising: storing, by a memory, the plurality of audio streams and corresponding audio metadata, each of the audio streams representative of a soundfield, and the audio metadata includes capture location information representative of capture coordinates in a displayed world at which the corresponding one of the plurality of audio streams was captured; determining, by one or more processors, virtual location information representative of device coordinates of the device in the displayed world; comparing, by the one or more processors, the virtual location information to audio source distance threshold; selecting, by the one or more processors, when the audio source distance is greater than the audio source distance threshold, a single audio stream of the plurality of audio streams; and outputting, by the one or more processors and based on the single audio stream, one or more speaker feeds.

Example 21B. The method of example 20B, wherein the audio source distance threshold is provided by a user.

Example 22B. The method of example 20B, wherein the audio source distance threshold is predetermined.

Example 23B. The method of example 20B, wherein the audio source distance threshold is received in a bitstream.

Example 24B. The method of any combination of examples 20B-23B, wherein the audio source distance is a first audio source distance, the audio stream coordinates are first audio stream coordinates, the audio source distance threshold is a first audio source distance threshold, and the single audio stream is a first single audio stream, and method further comprising: determining, by the one or more processors, a second audio source distance as a distance between second audio stream coordinates and the device coordinates of the device; comparing, by the one or more processors, the second audio source distance to a second audio source distance threshold; selecting, by the one or more processors and when the audio source distance is between the first audio source distance threshold and the second audio source threshold, the first single audio stream of the plurality of audio streams and a second single audio stream of the plurality of audio streams; and outputting, by the one or more processors and based on the first single audio stream and the second single audio stream, one or more speaker feeds.

Example 25B. The method of example 24B, further comprising combining, by the one or more processors, the first single audio stream and the second single audio stream.

Example 26B. The method of example 25B, wherein the combining comprises at least one of adaptive mixing the first single audio stream and the second single audio stream or interpolating a third audio stream based on the first single audio stream and the second single audio stream.

Example 27B. The method of example 25B or 26B, wherein the combining comprises applying a function F(x) to the first single audio stream and the second single audio stream.

Example 28B. The method of any combination of examples 24B-27B, further comprising: determining, by the one or more processors, whether the virtual location information has been steady relative to the first audio source distance threshold and the second audio source distance threshold for a predetermined period of time; and based on the virtual location being steady relative to the first audio source distance threshold and the second audio source distance threshold for a predetermined period of time, selecting, by the one or more processors, the first single audio stream, or the first single audio stream and the second single audio stream, or second single audio stream.

Example 29B. The method of example 24B, further comprising: selecting, when the second audio source distance is greater than the second audio source threshold, the second single audio stream of the plurality of audio streams; and outputting, based on the second single audio stream, one or more speaker feeds.

Example 30B. The method of any combination of examples 20B-29B, further comprising selecting, by the one or more processors, a different audio stream based the virtual location information changing.

Example 31B. The method of any combination of examples 20B-30B, further comprising providing an alert to a user based on the virtual location information equaling the audio source distance threshold.

Example 32B. The method of example 31B, wherein the alert is at least one of a visual alert or an auditory alert.

Example 33B. A non-transitory computer-readable storage medium having stored thereon instructions that, when executed, cause one or more processors to: store a plurality of audio streams and corresponding audio metadata, each of the audio streams representative of a soundfield, and the audio metadata includes capture location information representative of capture coordinates in a displayed world at which the corresponding one of the plurality of audio streams was captured; determine virtual location information representative of a device coordinates of the device in the displayed world; determine an audio source distance as a distance between the audio stream coordinates and the device coordinates of the device; compare the audio source distance to an audio source distance threshold; select, when the audio source distance is greater than the audio source distance threshold, a single audio stream of the plurality of audio streams; and output, based on the single audio stream, one or more speaker feeds.

Example 34B. A device comprising: means for storing a plurality of audio streams and corresponding audio metadata, each of the audio streams representative of a soundfield, and the audio metadata includes capture location information representative of capture coordinates in a displayed world at which the corresponding one of the plurality of audio streams was captured; means for determining virtual location information representative of a device coordinates of the device in the displayed world; means for comparing the virtual location information to audio source distance threshold; means for selecting when the audio source distance is greater than the audio source distance threshold, a single audio stream of the plurality of audio streams; and means for outputting, based on the single audio stream, one or more speaker feeds.

Example 1C. A content consumer device configured to play one or more of a plurality of audio streams, the content consumer device comprising: a memory configured to store the plurality of audio streams and audio location information associated with the plurality of audio streams and representative of audio stream coordinates in an acoustical space where an audio stream was captured or audio stream coordinates in a virtual acoustical space where an audio stream was synthesized, each of the audio streams representative of a soundfield or both; and one or more processors coupled to the memory, and configured to: determine device location information representative of device coordinates of the content consumer device in the acoustical space; select, based on the device location information and the audio location information, a subset of the plurality of audio streams, the subset of the plurality of audio streams excluding at least one of the plurality of audio streams; and output, based on the subset of the plurality of audio streams, one or more speaker feeds.

Example 2C. The content consumer device of example 1C, wherein the one or more processors are further configured to: determine a proximity distance based on the device location information and the audio location information for at least one of the plurality of audio streams; and select, based on the proximity distance, the subset of the plurality of audio streams.

Example 3C. The content consumer device of example 2C, wherein the one or more processors are configured to: compare the proximity distance to a threshold proximity distance; and select, when the proximity distance is less than or equal to a threshold proximity distance, a larger number of the plurality of audio streams compared to when the proximity distance is greater than the threshold proximity distance to obtain the subset of the plurality of audio streams.

Example 4C. The content consumer device of any combination of examples 2C-3C, wherein the one or more processors are configured to: compare the proximity distance to a threshold proximity distance; and select, when the proximity distance is greater than a threshold proximity distance, a smaller number of the plurality of audio streams compared to when the proximity distance is less than or equal to the threshold proximity distance to obtain the subset of the plurality of audio streams.

Example 5C. The content consumer device of any combination of examples 1C-4C, wherein the one or more processors are further configured to: obtain a new audio stream and corresponding new audio location information; and update the subset of the plurality of audio streams to include the new audio stream.

Example 6C. The content consumer device of any combination of examples 1C-5C, wherein the one or more processors are further configured to: determine, based on the plurality of audio streams, an energy map representative of an energy of a common soundfield represented by the plurality of audio streams; and determine, based on the energy map, the device location information and the audio location information, the subset of the plurality of audio streams.

Example 7C. The content consumer device of example 6C, wherein the one or more processors are further configured to: analyze the energy map to determine an audio source location of an audio stream in the common soundfield; and determine, based on the audio source location, the device location information and the audio location information, a subset of the plurality of audio streams.

Example 8C. The content consumer device of example 7C, wherein the one or more processors are further configured to: determine an audio source distance as a distance between the audio source location and the device coordinates; compare the audio source distance to an audio source distance threshold; and select, when the audio source distance is greater than the audio source distance threshold, a single audio stream of the plurality of audio streams as the subset of the plurality of audio streams, the single audio stream associated with the audio stream coordinates having a shortest distance to the device coordinates.

Example 9C. The content consumer device of example 7C, wherein the one or more processors are configured to: determine an audio source distance as a distance between the audio source location and the device coordinates; compare the audio source distance to an audio source distance threshold; and select, when the audio source distance is less than or equal to the audio source distance threshold, multiple audio streams of the plurality of audio streams as the subset of the plurality of audio streams, the multiple audio streams being the subset of the plurality of audio streams with the audio stream coordinates surrounding the device coordinates.

Example 10C. The content consumer device of any combination of examples 1C-9C, wherein the one or more processors are further configured to: determine a first audio source distance as a distance between first audio stream coordinates for a first audio stream and the device coordinates; compare the first audio source distance to a first audio source distance threshold; select, when the first audio source distance is less than or equal to the first audio source distance threshold, the first audio stream of the plurality of audio streams; and output, based on the first audio stream, one or more speaker feeds, wherein the first audio stream is an only audio stream selected.

Example 11C. The content consumer device of example 10C, wherein the one or more processors are further configured to: determine a second audio source distance as a distance between second audio stream coordinates for a second audio stream and the device coordinates; compare the second audio source distance to a second audio source distance threshold; select, when both the first audio source distance is greater than the first audio source distance threshold and the second audio source distance is greater than the second audio source distance threshold, the first audio stream of the plurality of audio streams and the second audio stream of the plurality of audio streams; and output, based on the first audio stream and the second audio stream, one or more speaker feeds.

Example 12C. The content consumer device of example 11C, wherein the one or more processors are configured to combine the first audio stream and the second audio stream by at least one of adaptive mixing the first audio stream and the second audio stream or interpolating a third audio stream based on the first audio stream and the second audio stream.

Example 13C. The content consumer device of example 12C, wherein the one or more processors are configured to combine the first audio stream and the second audio stream by applying a function F(x) to the first audio stream and the second audio stream.

Example 14C. The content consumer device of any combination of examples 11C-13C, wherein the one or more processors are further configured to: determine whether the device coordinates have been steady relative to the first audio source distance threshold and the second audio source distance threshold for a predetermined period of time; and based on the device coordinates being steady relative to the first audio source distance threshold and the second audio source distance threshold for a predetermined period of time, select the first audio stream, the first audio stream and the second audio stream, or the second audio stream.

Example 15C. The content consumer device of any combination of examples 11C-14C, wherein the one or more processors are further configured to: select, when the second audio source distance is less than or equal to the second audio source threshold, the second audio stream of the plurality of audio streams; and output, based on the second audio stream, one or more speaker feeds, wherein the second audio stream is an only audio stream selected.

Example 16C. The content consumer device of any combination of examples 11C-15C, wherein the one or more processors are further configured to select a different audio stream based the device coordinates changing.

Example 17C. The content consumer device of any combination of examples 10C-16C, wherein the one or more processors are further configured to provide an alert to a user based on the first audio source distance equaling the first audio source distance threshold, wherein the alert is at least one of a visual alert, an auditory alert, or a haptic alert.

Example 18C. The content consumer device of any combination of examples 1C-17C, wherein the audio stream coordinates in the acoustical space or the audio stream coordinates in the virtual acoustical space are coordinates in a displayed world in relation to which the corresponding audio stream was captured or synthesized.

Example 19C. The content consumer device of example 18C, wherein the content consumer device comprises an extended reality headset, and wherein the displayed world comprises a scene represented by video data captured by a camera.

Example 20C. The content consumer device of example 19C, wherein the content consumer device comprises an extended reality headset, and wherein the displayed world comprises a virtual world.

Example 21C. The content consumer device of any combination of examples 1C-20C, wherein the content consumer device comprises a mobile handset.

Example 22C. The content consumer device of any combination of examples 1C-21C, further comprising a transceiver configured to wirelessly receive the plurality of audio streams, wherein the transceiver is configured to wirelessly receive the plurality of audio streams in accordance with at least one of a fifth generation (5G) cellular standard, a personal area network standard or a local area network standard.

Example 23C. The content consumer device of any combination of examples 1C-22C, wherein the one or more processors are further configured to only decode the subset of the plurality of audio streams, in response to the selection.

Example 24C. The content consumer device of any combination of examples 1C-23C, wherein the one or more processors are further configured to: determine an audio source distance as a distance between an audio source in the acoustical space and the device coordinates; compare the audio source distance to an audio source distance threshold; and select, when the audio source distance is greater than the audio source distance threshold, a single audio stream of the plurality of audio streams as the subset of the plurality of audio streams, the single audio stream having a shortest audio source distance.

Example 25C. A method of playing one or more of a plurality of audio streams, the method comprising: storing, by a memory of a content consumer device, the plurality of audio streams and audio location information associated with the plurality of audio streams and representative of audio stream coordinates in an acoustical space where an audio stream was captured or audio stream coordinates in a virtual acoustical space where an audio stream was synthesized or both, each of the audio streams representative of a soundfield; and determining, by one or more processors of the content consumer device, device location information representative of device coordinates of the content consumer device in the acoustical space; selecting, by the one or more processors and based on the device location information and the audio location information, a subset of the plurality of audio streams, the subset of the plurality of audio streams excluding at least one of the plurality of audio streams; and outputting, by the one or more processors and based on the subset of the plurality of audio streams, one or more speaker feeds.

Example 26C. The method of example 25C, wherein selecting the subset of the plurality of audio streams comprises: determining a proximity distance based on the device location information and the audio location information for at least one of the plurality of audio streams; and selecting, based on the proximity distance, the subset of the plurality of audio streams.

Example 27C. The method of example 26C, wherein selecting the subset of the plurality of audio streams comprises: comparing the proximity distance to a threshold proximity distance; and Selecting, when the proximity distance is less than or equal to a threshold proximity distance, a larger number of the plurality of audio streams compared to when the proximity distance is greater than the threshold proximity distance to obtain the subset of the plurality of audio streams.

Example 28C. The method of any combination of examples 25C-27C, wherein selecting the subset of the plurality of audio streams comprises: comparing the proximity distance to a threshold proximity distance; and Selecting, when the proximity distance is greater than a threshold proximity distance, a smaller number of the plurality of audio streams compared to when the proximity distance is less than or equal to the threshold proximity distance to obtain the subset of the plurality of audio streams.

Example 29C. The method of any combination of examples 25C-28C, further comprising: obtaining a new audio stream and corresponding new audio location information; and updating the subset of the plurality of audio streams to include the new audio stream.

Example 30C. The method of any combination of examples 25C-29C, further comprising: determining, by the one or more processors and based on the plurality of audio streams, an energy map representative of an energy of a common soundfield represented by the plurality of audio streams; and determining, by the one or more processors and based on the energy map, the device location information and the audio location information, a subset of the plurality of audio streams.

Example 31C. The method of example 30C, wherein selecting the subset of the plurality of audio streams comprises: analyzing the energy map to determine audio stream coordinates of an audio source in the common soundfield; and determining, based on the audio source coordinates, the device location information and the audio location information, the subset of the plurality of audio streams.

Example 32C. The method of example 31C, wherein selecting the subset of the plurality of audio streams comprises: determining an audio source distance as a distance between the audio stream coordinates and the device coordinates; comparing the audio source distance to an audio source distance threshold; and selecting, when the audio source distance is greater than the audio source distance threshold, a single audio stream of the plurality of audio streams as the subset of the plurality of audio streams, the single audio stream having a shortest audio source distance.

Example 33C. The method of example 31C, wherein selecting the subset of the plurality of audio streams comprises: determining an audio source distance as a distance between the audio stream coordinates and the device coordinates; comparing the audio source distance to an audio source distance threshold; and selecting, when the audio source distance is less than or equal to the audio source distance threshold, multiple audio streams of the plurality of audio streams as the subset of the plurality of audio streams, the multiple audio streams being the subset of the plurality of audio streams with audio stream coordinates surrounding the device coordinates.

Example 34C. The method of any combination of examples 25C-33C, further comprising: determining, by the one or more processors, a first audio source distance as a distance between first audio stream coordinates for a first audio stream and the device coordinates; comparing, by the one or more processors, the first audio source distance to a first audio source distance threshold; selecting, by the one or more processors and when the first audio source distance is less than or equal to the first audio source distance threshold, the first audio stream of the plurality of audio streams; and outputting, by the one or more processors, based on the first audio stream, one or more speaker feeds, wherein the first audio stream is an only audio stream selected.

Example 35C. The method of example 34C, further comprising: determining, by the one or more processors, a second audio source distance as a distance between second audio stream coordinates for a second audio stream and the device coordinates; comparing, by the one or more processors, the second audio source distance to a second audio source distance threshold; selecting, by the one or more processors and when both the first audio source distance is greater than the first audio source distance threshold and the second audio source distance is greater than the second audio source distance threshold, the first audio stream of the plurality of audio streams and the second audio stream of the plurality of audio streams; and outputting, by the one or more processors and based on the first audio stream and the second audio stream, one or more speaker feeds.

Example 36C. The method of example 35C, further comprising combining, by the one or more processors, the first audio stream and the second audio stream by at least one of adaptive mixing the first audio stream and the second audio stream or interpolating a third audio stream based on the first audio stream and the second audio stream.

Example 37C. The method of example 35C, wherein the combining comprises applying a function $F(x)$ to the first audio stream and the second audio stream.

Example 38C. The method of any combination of examples 35C-37C, further comprising: determining, by the one or more processors, whether the device coordinates have been steady relative to the first audio source distance threshold and the second audio source distance threshold for a predetermined period of time; and based on the device coordinates being steady relative to the first audio source distance threshold and the second audio source distance threshold for a predetermined period of time, selecting, by the one or more processors, the first single audio stream, or the first single audio stream and the second single audio stream, or second single audio stream.

Example 39C. The method of any combination of examples 35C-38C, further comprising: selecting, by the one or more processors and when the second audio source distance is less than or equal to the second audio source distance threshold, the second audio stream of the plurality of audio streams; and outputting, based on the second single audio stream, one or more speaker feeds, wherein the second audio stream is an only audio stream selected.

Example 40C. The method of any combination of examples 35C-39C, further comprising selecting, by the one or more processors, a different audio stream based the device coordinates changing.

Example 41C. The method of any combination of examples 34C-40C, further comprising providing an alert to a user based on the first audio source distance equaling the first audio source distance threshold, wherein the alert is at least one of a visual alert, an auditory alert, or a haptic alert.

Example 42C. The method of any combination of examples 25C-41C, wherein the content consumer device comprises an extended reality headset, and wherein a displayed world comprises a scene represented by video data captured by a camera.

Example 43C. The method of any combination of examples 25C-41C, wherein the content consumer device comprises an extended reality headset, and wherein a displayed world comprises a virtual world.

Example 44C. The method of any combination of examples 25C-43C, wherein the content consumer device comprises a mobile handset.

Example 45C. The method of any combination of examples 25C-44C, further comprising wirelessly receiving, by a transceiver module of the content consumer device, the plurality of audio streams, wherein wirelessly receiving the plurality of audio streams comprises wirelessly receiving the plurality of audio streams in accordance with a fifth generation (5G) cellular standard, a personal area network standard, or a local area network standard.

Example 46C. The method of any combination of examples 25C-45C, further comprising only decoding, by the one or more processors, the subset of the plurality of audio streams, in response to the selection.

Example 47C. The method of any combination of examples 25C-46C, further comprising: determining, by the one or more processors, an audio source distance as a distance between an audio source in the acoustical space and the device coordinates; comparing, by the one or more processors, the audio source distance to an audio source distance threshold; and selecting, by the one or more processors and when the audio source distance is greater than the audio source distance threshold, a single audio stream of the plurality of audio streams as the subset of the plurality of audio streams, the single audio stream having a shortest audio source distance.

Example 48C. A content consumer device configured to play one or more of a plurality of audio streams, the content consumer device comprising: means for storing the plurality of audio streams and audio location information associated with the plurality of audio streams and representative of audio stream coordinates in an acoustical space where an audio stream was captured or audio stream coordinates in a virtual acoustical space where an audio stream was synthesized or both, each of the audio streams representative of a soundfield; and means for determining device location information representative of device coordinates of the content consumer device in the acoustical space; means for selecting, based on the device location information and the audio location information, a subset of the plurality of audio streams, the subset of the plurality of audio streams excluding at least one of the plurality of audio streams; and means for outputting, based on the subset of the plurality of audio streams, one or more speaker feeds.

Example 49C. A non-transitory computer-readable storage medium having stored thereon instructions that, when executed, cause one or more processors of a content consumer device to: store a plurality of audio streams and audio location information associated with the plurality of audio streams and representative of audio stream coordinates in an acoustical space where an audio stream was captured or audio stream coordinates in a virtual acoustical space where an audio stream was synthesized or both, each of the audio streams representative of a soundfield; and determine device location information representative of device coordinates of the content consumer device in the acoustical space; select, based on the device location information and the audio location information, a subset of the plurality of audio streams, the subset of the plurality of audio streams excluding at least one of the plurality of audio streams; and output, based on the subset of the plurality of audio streams, one or more speaker feeds.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In some examples, the VR device (or the streaming device) may communicate, using a network interface coupled to a memory of the VR/streaming device, exchange messages to an external device, where the exchange messages are associated with the multiple available representations of the soundfield. In some examples, the VR device may receive, using an antenna coupled to the network interface, wireless signals including data packets, audio packets, video pacts, or transport protocol data associated with the multiple available representations of the soundfield. In some examples, one or more microphone arrays may capture the soundfield.

In some examples, the multiple available representations of the soundfield stored to the memory device may include a plurality of object-based representations of the soundfield, higher order ambisonic representations of the soundfield, mixed order ambisonic representations of the soundfield, a combination of object-based representations of the soundfield with higher order ambisonic representations of the soundfield, a combination of object-based representations of the soundfield with mixed order ambisonic representations of the soundfield, or a combination of mixed order representations of the soundfield with higher order ambisonic representations of the soundfield.

In some examples, one or more of the soundfield representations of the multiple available representations of the soundfield may include at least one high-resolution region and at least one lower-resolution region, and wherein the selected presentation based on the steering angle provides a greater spatial precision with respect to the at least one high-resolution region and a lesser spatial precision with respect to the lower-resolution region.

In one or more examples, the functions described may be implemented in hardware, software, firmware, or any combination thereof. When implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A content consumer device configured to play one or more of a plurality of audio streams, the content consumer device comprising:
a memory configured to store the plurality of audio streams and audio location information associated with the plurality of audio streams and representative of audio stream coordinates in an acoustical space where an audio stream was captured or audio stream coordinates in a virtual acoustical space where an audio stream was synthesized or both, each of the audio streams representative of a soundfield; and
one or more processors coupled to the memory, and configured to:
determine device location information representative of device coordinates of the content consumer device in the acoustical space;
determine an audio source distance based on the audio location information as a distance between an audio source in the acoustical space and the device coordinates;
compare the audio source distance to an audio source distance threshold, the audio source distance threshold being definable by a user of the content consumer device via a user interface;
select, when the audio source distance is greater than the audio source distance threshold, a single audio stream of the plurality of audio streams as a subset of the plurality of audio stream; and
output, based on the subset of the plurality of audio streams, one or more speaker feeds.

2. The content consumer device of claim 1, wherein the one or more processors are further configured to:
obtain a new audio stream and corresponding new audio location information; and
update the subset of the plurality of audio streams to include the new audio stream.

3. The content consumer device of claim 1, wherein the one or more processors are further configured to:
determine, based on the plurality of audio streams, an energy map representative of an energy of a common soundfield represented by the plurality of audio streams,
wherein the selection of the single audio stream is further based on the energy map.

4. The content consumer device of claim 3, wherein the one or more processors are further configured to:
analyze the energy map to determine the audio source location information.

5. The content consumer device of claim 1, wherein the one or more processors are configured to:
select, when the audio source distance is less than or equal to the audio source distance threshold, multiple audio streams of the plurality of audio streams as the subset of the plurality of audio streams, the multiple audio streams being the subset of the plurality of audio streams with the audio stream coordinates surrounding the device coordinates.

6. A content consumer device configured to play one or more of a plurality of audio streams, the content consumer device comprising:
a memory configured to store the plurality of audio streams and audio location information associated with the plurality of audio streams and representative of audio stream coordinates in an acoustical space where an audio stream was captured or audio stream coordinates in a virtual acoustical space where an audio stream was synthesized or both, each of the audio streams representative of a soundfield; and
one or more processors coupled to the memory, and configured to:
determine device location information representative of device coordinates of the content consumer device in the acoustical space;
determine first audio stream coordinates for a first audio stream based on the audio location information;
determine a first audio source distance as a distance between the first audio stream coordinates and the device coordinates;
compare the first audio source distance to a first audio source distance threshold the first audio source distance threshold being moveable by a user of the content consumer device via a user interface;
select, when the first audio source distance is less than or equal to the first audio source distance threshold, the first audio stream of the plurality of audio streams; and
output, based on the first audio stream, one or more speaker feeds,
wherein the first audio stream is an only audio stream selected.

7. The content consumer device of claim 6, wherein the one or more processors are further configured to:
determine a second audio source distance as a distance between second audio stream coordinates for a second audio stream and the device coordinates;
compare the second audio source distance to a second audio source distance threshold;
select, when both the first audio source distance is greater than the first audio source distance threshold and the second audio source distance is greater than the second audio source distance threshold, the first audio stream of the plurality of audio streams and the second audio stream of the plurality of audio streams; and
output, based on the first audio stream and the second audio stream, one or more speaker feeds.

8. The content consumer device of claim 7, wherein the one or more processors are configured to combine the first audio stream and the second audio stream by at least one of adaptive mixing the first audio stream and the second audio stream or interpolating a third audio stream based on the first audio stream and the second audio stream.

9. The content consumer device of claim 8, wherein the one or more processors are configured to combine the first audio stream and the second audio stream by applying a function $F(x)$ to the first audio stream and the second audio stream.

10. The content consumer device of claim 7, wherein the device location information is first device location information and the device coordinates are first device coordinates, and wherein the one or more processors are further configured to:
  determine second device location information representative of second device coordinates of the content consumer device in the acoustical space the second device coordinates being different than the first device coordinates due to movement of the user of the content consumer device;
  determine a third audio source distance as a distance between the first audio stream coordinates and the second device coordinates;
  determine a fourth audio source distance as a distance between the second audio stream coordinates and the second device coordinates;
  compare the third audio source distance to the first audio source distance threshold;
  compare the fourth audio source distance to the second audio source distance threshold;
  determine whether the second device coordinates have been steady relative to the first audio source distance threshold and the second audio source distance threshold for a predetermined period of time;
  based on the second device coordinates being steady relative to the first audio source distance threshold and the second audio source distance threshold for a predetermined period of time, the comparison of the third audio source distance to the first audio source distance threshold, and the comparison of the fourth audio source distance to the second audio source distance threshold, select the first audio stream or the second audio stream; and
  output, based on the first audio stream or the second audio stream, one or more speaker feeds.

11. The content consumer device of claim 7, wherein the one or more processors are further configured to:
  select, when the second audio source distance is less than or equal to the second audio source threshold, the second audio stream of the plurality of audio streams; and
  output, based on the second audio stream, one or more speaker feeds,
  wherein the second audio stream is an only audio stream selected.

12. The content consumer device of claim 7, wherein the one or more processors are further configured to select a different audio stream based the device coordinates changing.

13. The content consumer device of claim 6, wherein the one or more processors are further configured to provide an alert to a user based on the first audio source distance equaling the first audio source distance threshold, wherein the alert is at least one of a visual alert, an auditory alert other than a change from selecting the first audio source to selecting a different audio source, or a haptic alert.

14. The content consumer device of claim 1, wherein the audio stream coordinates in the acoustical space or the audio stream coordinates in the virtual acoustical space are coordinates in a displayed world in relation to which the corresponding audio stream was captured or synthesized.

15. The content consumer device of claim 14,
  wherein the content consumer device comprises an extended reality headset, and
  wherein the displayed world comprises a scene represented by video data captured by a camera.

16. The content consumer device of claim 14,
  wherein the content consumer device comprises an extended reality headset, and
  wherein the displayed world comprises a virtual world.

17. The content consumer device of claim 1, wherein the content consumer device comprises a mobile handset.

18. The content consumer device of claim 1, further comprising a transceiver configured to wirelessly receive the plurality of audio streams, wherein the transceiver is configured to wirelessly receive the plurality of audio streams in accordance with at least one of a fifth generation (5G) cellular standard, a personal area network standard or a local area network standard.

19. The content consumer device of claim 1, wherein the one or more processors are further configured to only decode the subset of the plurality of audio streams, in response to the selection.

20. A method of playing one or more of a plurality of audio streams, the method comprising:
  storing, by a memory of a content consumer device, the plurality of audio streams and audio location information associated with the plurality of audio streams and representative of audio stream coordinates in an acoustical space where an audio stream was captured or audio stream coordinates in a virtual acoustical space where an audio stream was synthesized or both, each of the audio streams representative of a soundfield; and
  determining, by one or more processors of the content consumer device, device location information representative of device coordinates of the content consumer device in the acoustical space;
  determining, by the one or more processors, an audio source distance based on the audio location information as a distance between an audio source in the acoustical space and the device coordinates; and
  comparing, by the one or more processors, the audio source distance to an audio source distance threshold, the audio source distance threshold being definable by a user of the content consumer device via a user interface;
  selecting, when the audio source distance is greater than the audio source distance threshold, a single audio stream of the plurality of audio streams as a subset of the plurality of audio streams, the single audio stream having a shortest audio source distance; and
  outputting, by the one or more processors and based on the subset of the plurality of audio streams, one or more speaker feeds.

21. The method of claim 20, further comprising:
  obtaining, by the one or more processors, a new audio stream and corresponding new audio location information; and
  updating, by the one or more processors, the subset of the plurality of audio streams to include the new audio stream.

22. The method of claim 20, further comprising:
  determining, by the one or more processors and based on the plurality of audio streams, an energy map representative of an energy of a common soundfield represented by the plurality of audio streams,
  wherein the selection of the single audio stream is further based on the energy map.

23. The method of claim 22, wherein selecting the subset of the plurality of audio streams comprises:
  analyzing, by the one or more processors, the energy map to determine the audio source location information.

24. The method of claim 20, wherein selecting the subset of the plurality of audio streams comprises:
selecting, by the one or more processors and when the audio source distance is less than or equal to the audio source distance threshold, multiple audio streams of the plurality of audio streams as the subset of the plurality of audio streams, the multiple audio streams being the subset of the plurality of audio streams with audio stream coordinates surrounding the device coordinates.

25. The method of claim 20,
wherein the content consumer device comprises an extended reality headset, and
wherein a displayed world comprises a scene represented by video data captured by a camera.

26. The method of claim 20,
wherein the content consumer device comprises an extended reality headset, and
wherein a displayed world comprises a virtual world.

27. The method of claim 20, wherein the content consumer device comprises a mobile handset.

28. The method of claim 20, further comprising wirelessly receiving, by a transceiver module of the content consumer device, the plurality of audio streams, wherein wirelessly receiving the plurality of audio streams comprises wirelessly receiving the plurality of audio streams in accordance with a fifth generation (5G) cellular standard, a personal area network standard, or a local area network standard.

29. The method of claim 20, further comprising only decoding, by the one or more processors, the subset of the plurality of audio streams, in response to the selection.

30. A non-transitory computer-readable storage medium having stored thereon instructions that, when executed, cause one or more processors of a content consumer device to:
store a plurality of audio streams and audio location information associated with the plurality of audio streams and representative of audio stream coordinates in an acoustical space where an audio stream was captured or audio stream coordinates in a virtual acoustical space where an audio stream was synthesized or both, each of the audio streams representative of a soundfield; and
determine device location information representative of device coordinates of the content consumer device in the acoustical space;
determine first audio stream coordinates for a first audio stream based on the audio location information;
determine a first audio source distance as a distance between the first audio stream coordinates and the device coordinates;
compare the first audio source distance to a first audio source distance threshold, the first audio source distance threshold being moveable by a user of the content consumer device via a user interface;
select, when the first audio source distance is less than or equal to the first audio source distance threshold, the first audio stream of the plurality of audio streams; and
output, based on the first audio stream, one or more speaker feeds,
wherein the first audio stream is an only audio stream selected.

31. The non-transitory computer readable storage medium of claim 30, wherein the instructions further cause the one or more processors to:
determine a second audio source distance as a distance between second audio stream coordinates for a second audio stream and the device coordinates;
compare the second audio source distance to a second audio source distance threshold;
select, when both the first audio source distance is greater than the first audio source distance threshold and the second audio source distance is greater than the second audio source distance threshold, the first audio stream of the plurality of audio streams and the second audio stream of the plurality of audio streams; and
output, based on the first audio stream and the second audio stream, one or more speaker feeds.

32. The non-transitory computer readable storage medium of claim 31, wherein the instructions further cause the one or more processors to combine the first audio stream and the second audio stream by at least one of adaptive mixing the first audio stream and the second audio stream or interpolating a third audio stream based on the first audio stream and the second audio stream.

33. The non-transitory computer readable storage medium of claim 32, wherein to combine the first audio stream and the second audio stream, the instructions cause the one or more processors to apply a function F(x) to the first audio stream and the second audio stream.

34. The non-transitory computer readable storage medium of claim 31, wherein the device location information is first device location information and the device coordinates are first device coordinates, and wherein the instructions further cause the one or more processors to:
determine second device location information representative of second device coordinates of the content consumer device in the acoustical space the second device coordinates being different than the first device coordinates due to movement of the user of the content consumer device;
determine a third audio source distance as a distance between the first audio stream coordinates and the second device coordinates;
determine a fourth audio source distance as a distance between the second audio stream coordinates and the second device coordinates;
compare the third audio source distance to the first audio source distance threshold;
compare the fourth audio source distance to the second audio source distance threshold;
determine whether the second device coordinates have been steady relative to the first audio source distance threshold and the second audio source distance threshold for a predetermined period of time;
based on the second device coordinates being steady relative to the first audio source distance threshold and the second audio source distance threshold for a predetermined period of time, the comparison of the third audio source distance to the first audio source distance threshold, and the comparison of the fourth audio source distance to the second audio source distance threshold, select the first single audio stream or second single audio stream; and
output, based on the first audio stream or the second audio stream, one or more speaker feeds.

35. The non-transitory computer readable storage medium of claim 31, wherein the instructions further cause the one or more processors to:
select, when the second audio source distance is less than or equal to the second audio source threshold, the second audio stream of the plurality of audio streams; and
output, based on the second single audio stream, one or more speaker feeds, wherein the second audio stream is an only audio stream selected.

36. The non-transitory computer readable storage medium of claim 30, wherein the instructions further cause the one or more processors to select a different audio stream based the device coordinates changing.

37. The non-transitory computer readable storage medium of claim 30, wherein the instructions further cause the one or more processors to provide an alert to a user based on the first audio source distance equaling the first audio source distance threshold, wherein the alert is at least one of a visual alert, an auditory alert other than a change from selecting the first audio source to selecting a different audio source, or a haptic alert.

* * * * *